(12) United States Patent
Okayama et al.

(10) Patent No.: US 9,001,080 B2
(45) Date of Patent: Apr. 7, 2015

(54) TOUCH-PANEL DEVICE

(71) Applicant: Panasonic Corporation, Osaka (JP)

(72) Inventors: Motoyuki Okayama, Osaka (JP);
Hidenori Kitamura, Osaka (JP);
Susumu Fukushima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/234,573

(22) PCT Filed: Nov. 8, 2012

(86) PCT No.: PCT/JP2012/007181
§ 371 (c)(1),
(2) Date: Jan. 23, 2014

(87) PCT Pub. No.: WO2013/069289
PCT Pub. Date: May 16, 2013

(65) Prior Publication Data
US 2014/0152621 A1 Jun. 5, 2014

(30) Foreign Application Priority Data

Nov. 11, 2011 (JP) .................................. 2011-247176
Aug. 7, 2012 (JP) .................................. 2012-174654

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04107* (2013.01)

(58) Field of Classification Search
CPC ........................................................ G06F 3/044
USPC .................................................. 345/173–178
See application file for complete search history.

(56) References Cited

U.S. PATENT DOCUMENTS

| 3,749,977 | A | * | 7/1973 | Sliker | 315/276 |
| 2010/0033437 | A1 | * | 2/2010 | Matsubara | 345/173 |
| 2010/0085322 | A1 | * | 4/2010 | Mamba et al. | 345/173 |
| 2010/0182273 | A1 | | 7/2010 | Noguchi et al. | |

(Continued)

FOREIGN PATENT DOCUMENTS

| JP | 58-182744 A | 10/1983 |
| JP | 60-005324 A | 1/1985 |

(Continued)

OTHER PUBLICATIONS

International Search Report issued in PCT/JP2012/007181, dated Jan. 29, 2013, with English translation, 4 pages.

*Primary Examiner* — Gerald Johnson
*Assistant Examiner* — Christopher Kohlman
(74) *Attorney, Agent, or Firm* — McDermott Will & Emery LLP

(57) ABSTRACT

A touch panel device includes a touch panel including first and second electrodes, an alternating-current (AC) signal source operable to input an AC signal into the first electrode, an inductive element electrically connected in series between the AC signal source and the first electrode, and a detection circuit operable to detect a change of a capacitance between the first electrode and the second electrode upon a touch of an object on the touch panel, based on a change of a signal output from the second electrode. This touch panel device can enhance detection sensitivity with a simple configuration.

95 Claims, 33 Drawing Sheets

(56) References Cited

U.S. PATENT DOCUMENTS

| | | | |
|---|---|---|---|
| 2011/0074731 A1* | 3/2011 | Inoue et al. | 345/174 |
| 2011/0109577 A1* | 5/2011 | Lee et al. | 345/173 |
| 2011/0254795 A1 | 10/2011 | Chen et al. | |
| 2012/0075220 A1* | 3/2012 | Matsui et al. | 345/173 |
| 2012/0075238 A1* | 3/2012 | Minami et al. | 345/174 |
| 2012/0268142 A1* | 10/2012 | Kremin et al. | 324/658 |
| 2013/0015868 A1* | 1/2013 | Peng | 324/688 |
| 2013/0057503 A1* | 3/2013 | Hristov et al. | 345/174 |

FOREIGN PATENT DOCUMENTS

| | | |
|---|---|---|
| JP | 11-143626 A | 5/1999 |
| JP | 2008-153025 A | 7/2008 |
| JP | 2009-192306 A | 8/2009 |
| JP | 2009-244958 A | 10/2009 |
| WO | 2010-133070 A1 | 11/2010 |

* cited by examiner

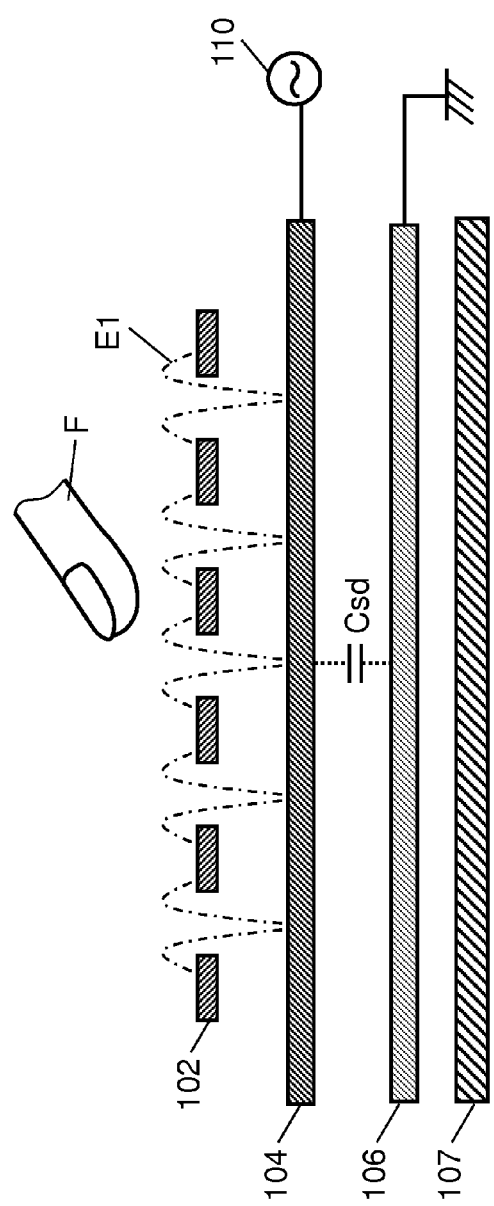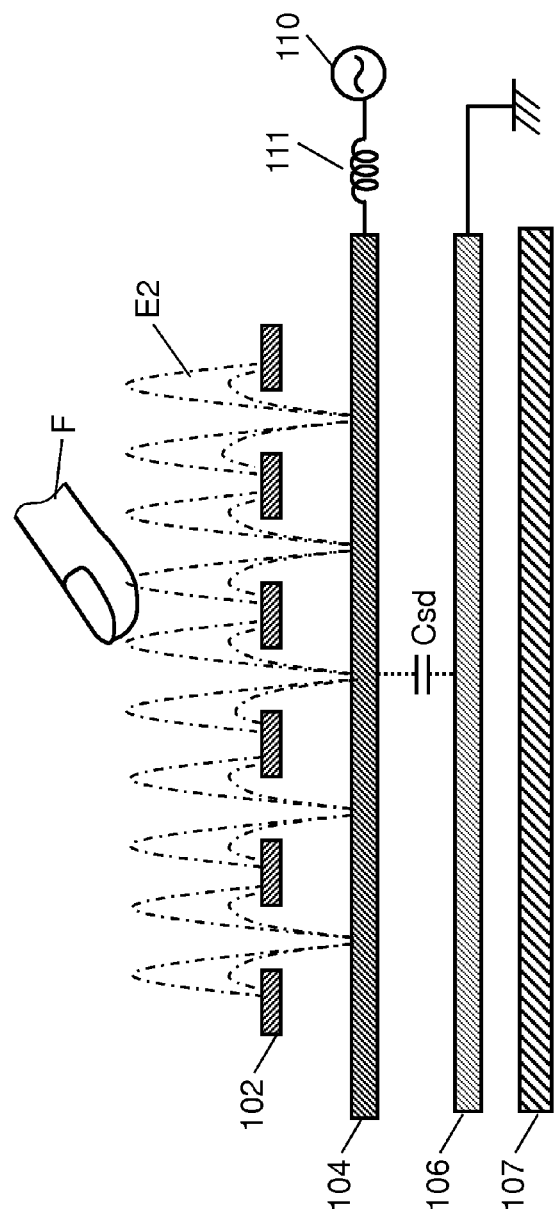

TOUCH-PANEL DEVICE

RELATED APPLICATIONS

This application is the U.S. National Phase under 35 U.S.C. §371 of International Application No. PCT/JP2012/007181, filed on Nov. 8, 2012, which in turn claims the benefit of Japanese Application No. 2012-174654, filed on Aug. 7, 2012, and Japanese Application No. 2011-247176, filed on Nov. 11, 2011, the disclosures of which Applications are incorporated by reference herein.

TECHNICAL FIELD

The present invention relates to a capacitive type touch panel device.

BACKGROUND ART

In recent years, touch panel devices have been widely used for, e.g. mobile terminals, personal computers, and Automatic Teller Machine (ATM) terminals in banks. Such touch panel device is used for inputting necessary information by touching an image displayed on a display with a finger. The touch panel device detects a position of an object, such as a finger, touched on its surface, with high accuracy and high sensitivity.

The touch panel may be a resistive thin-film type and a capacitive type. The capacitive type touch panel device has been widely used since the capacitive type touch panel device is more excellent than a resistive thin-film touch panel device in its lifetime, responsiveness, and detection accuracy. The capacitive type touch panel device monitors a change in a capacitance when the object touches a surface of the touch panel device, and detects the touched position.

Patent Literature 1 describes a touch panel device including plural detection electrodes that are electrically coupled to one another in order to increase a change in the detected capacitance. This structure may enhance detection sensitivity.

However, the detection electrodes coupled to one another have a position detection accuracy deteriorated.

CITATION LIST

Patent Literature

Patent Literature 1: Japanese Patent Laid-Open Publication No. 2008-153025

SUMMARY

A touch panel device includes a touch panel including first and second electrodes, an alternating-current (AC) signal source operable to input an AC signal into the first electrode, an inductive element electrically connected in series between the AC signal source and the first electrode, and a detection circuit operable to detect a change of a capacitance between the first electrode and the second electrode upon a touch of an object on the touch panel, based on a change of a signal output from the second electrode.

This touch panel device can enhance detection sensitivity with a simple configuration.

BRIEF DESCRIPTION OF DRAWINGS

FIG. 6A is a schematic cross-sectional view of a comparative example of a touch panel device.

FIG. 6B is a schematic cross-sectional view of the touch panel device according to Embodiment 1.

DETAIL DESCRIPTION OF PREFERRED EMBODIMENTS

A capacitive type touch panel device is configured to detect a capacitance change between transparent electrodes which facing each other across an insulation layer, such as a dielectric material, and which are arranged in a matrix. The capacitive type touch panel device includes two types: a self-capacitive type that detects a capacitance change of the electrodes (a capacitance change between a ground and each of the electrode); and a mutual-capacitive type that detects a capacitance change between electrodes facing each other. A touch panel device according to exemplary embodiments described below is applicable to both the self-capacitive type and the mutual-capacitive type.

Exemplary Embodiment 1

Figure 1:
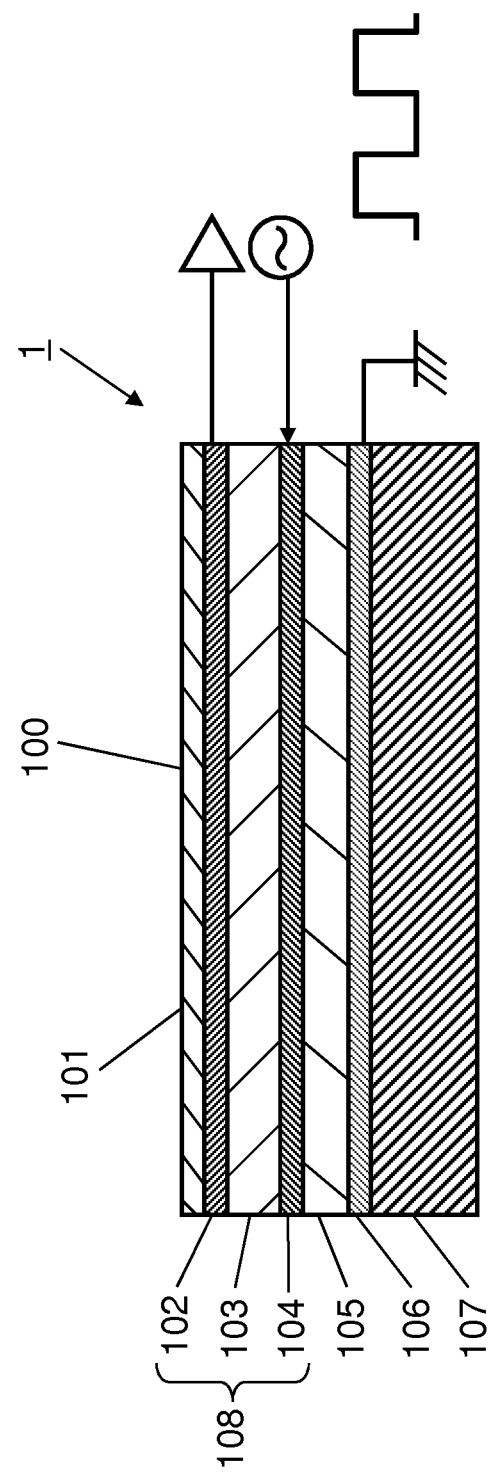
FIG. 1 is a schematic cross-sectional view of a touch panel of a touch panel device according to Exemplary Embodiment 1.

FIG. 1 is a schematic cross-sectional view of touch panel 100 mounted to touch panel device 1 according to Exemplary Embodiment 1. Touch panel device 1 is a mutual-capacitive type touch panel device. Touch panel device 100 includes liquid crystal display (LCD) 107 functioning as an image display element, electrode layer 108, glass layer 105, shield layer 106, and protection layer 101. Electrode layer 108, glass layer 105, shield layer 106, and protection layer 101 are transparent. LCD 107 and electrode layer 108 faces each other across glass layer 105 and shield layer 106. Protection layer 101 covers (a front surface of) electrode layer 108 which is configured to be touched with an object, such as a finger of an operator, from above. Electrode layer 108 includes drive electrodes 104, glass layer 103 functioning as an insulation layer, and detection electrodes 102 facing drive electrodes 104 across glass layer 103. Drive electrodes 104 and detection electrodes 102 are formed by arranging transparent electrodes, such as indium tin oxide (ITO) electrodes, perpendicularly to each other. Alternating-current (AC) signals are input to drive electrodes 104, and output from detection electrodes 102. A change of capacitances between drive electrodes 104 and detection electrodes 102 is detected by detecting the AC signals. The capacitance change shows that an object, such as a finger, touches touch panel 100. Transparent shield layer 106 is connected to a ground, and prevents touch panel 100 from having malfunctions due to noises which are generated upon driving LCD 107 and put into drive electrodes 104 and detection electrodes 102. An LCD substrate having LCD 107 mounted thereon is also connected to the ground. In the description below, shield layer 106 and the LCD substrate are referred to as a panel ground. The touch panel device according to the embodiment does not necessarily include shield layer 106.

Figure 2A:
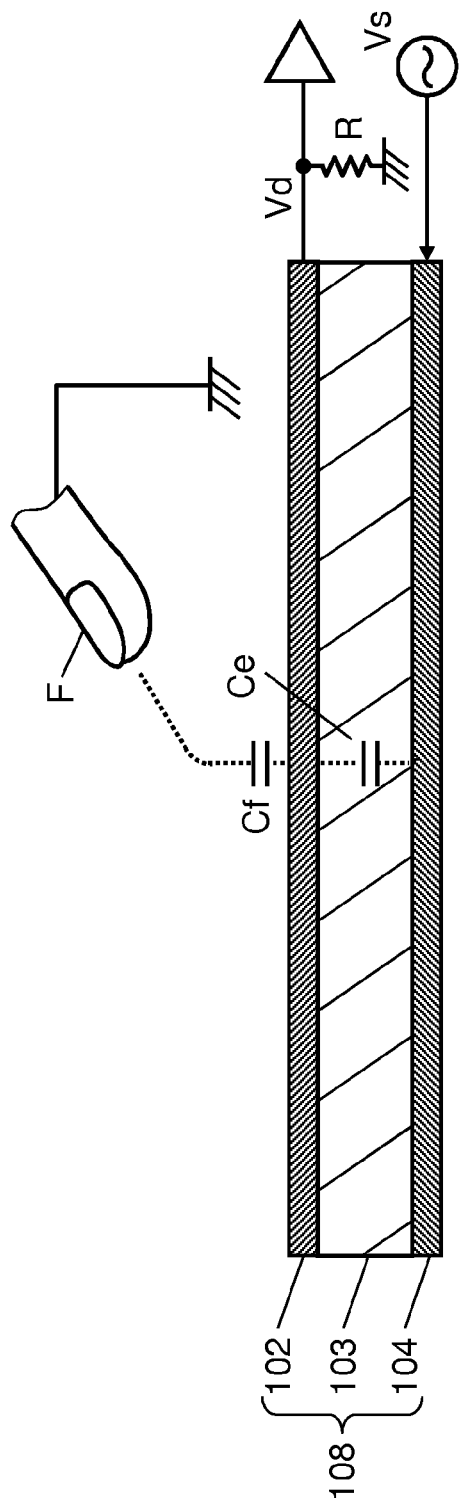
FIG. 2A is a schematic cross-sectional view of a mutual-capacitive type touch panel device for illustrating an operation of the mutual-capacitive type touch panel device.
Figure 2D:
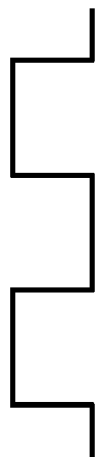
FIG. 2D illustrates a voltage waveform of an electrode in the touch panel device illustrated in FIG. 2A.
Figure 2E:
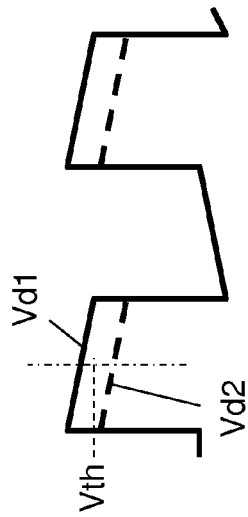
FIG. 2E illustrates a voltage waveform of an electrode in the touch panel device illustrated in FIG. 2A.
Figure 2C:
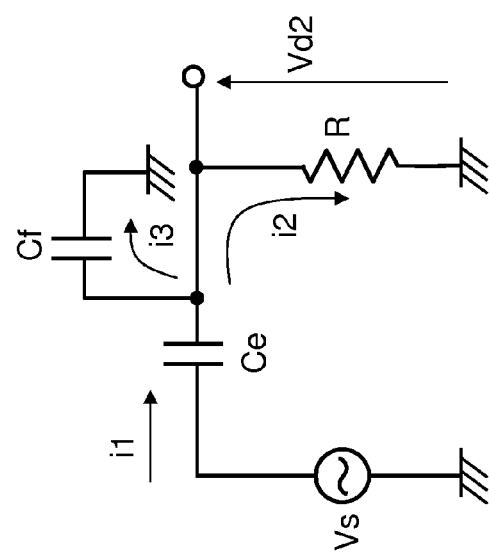
FIG. 2C is an equivalent circuit diagram of the touch panel device illustrated in FIG. 2A.
Figure 2B:
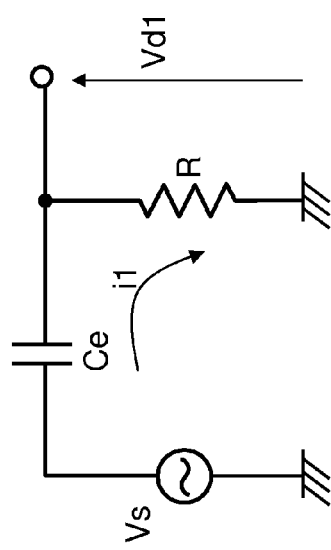
FIG. 2B is an equivalent circuit diagram of the touch panel device illustrated in FIG. 2A.

FIG. 2A is a schematic cross-sectional view of mutual-capacitive type touch panel device 1 for illustrating an operation of touch panel device 1, and particularly, is an enlarged view of electrode layer 108. FIG. 2B is an equivalent circuit diagram of touch panel device 1 including touch panel 100 which is not touched with object F, such as a finger of an operator. FIG. 2C is an equivalent circuit diagram of touch panel device 1 including touch panel 100 touched with object F. FIG. 2D illustrates a waveform of drive voltage Vs, an AC signal applied to drive electrode 104. FIG. 2E illustrates a waveform of detection voltage Vd, an AC signal detected from detection electrode 102. In the equivalent circuit diagrams shown in FIGS. 2B and 2C, a stray capacitance between detection electrode 102 and the ground and a stray capacitance between drive electrode 104 and the ground are not considered for understanding of the operation of mutual-capacitive type touch panel device 1. As illustrated in FIG. 2A, coupling capacitance Ce is provided between drive electrode 104 and detection electrode 102 at a crossing portion where drive electrode 104 and detection electrode 102 cross each other across insulation layer 103. Upon drive voltage Vs, an AC signal, being applied to drive electrode 104, AC signal current i1 flows through detection electrode 102 through coupling capacitance Ce, and is converted into detection voltage Vd by resistance R.

When touch panel 100 is not touched with object F, AC signal current i1 entirely flows through resistance R, thereby generating detection electrode Vd1 on resistance R as illustrated in FIG. 2B.

On the other hand, when touch panel 100 is touched with object F, capacitance Cf is connected in parallel with coupling capacitance Ce between object F and detection electrode 102. In this case, a part of a charge stored in coupling capacitance Ce is released to the ground via capacitance Cf. Accordingly, a part (current i3) of AC signal current i1 flows through capacitance Cf, so that current i2 flowing through resistance R becomes smaller than current i1, as illustrated in FIG. 2C. Therefore, detection voltage Vd2 generated on resistance R is smaller than detection voltage Vd1 that is generated when touch panel 100 is not touched with object F. Predetermined threshold voltage Vth is determined to be between detection voltage Vd1 and detection voltage Vd2. Detection circuit 114 compares detection voltage Vd with threshold voltage Vth. If detection voltage Vd is higher than threshold voltage Vth, detection circuit 114 determines that touch panel 10 is not touched with object F. If detection voltage Vd is lower than threshold voltage Vth, detection circuit 114 determines that touch panel 100 is touched with object F.

Figure 3:
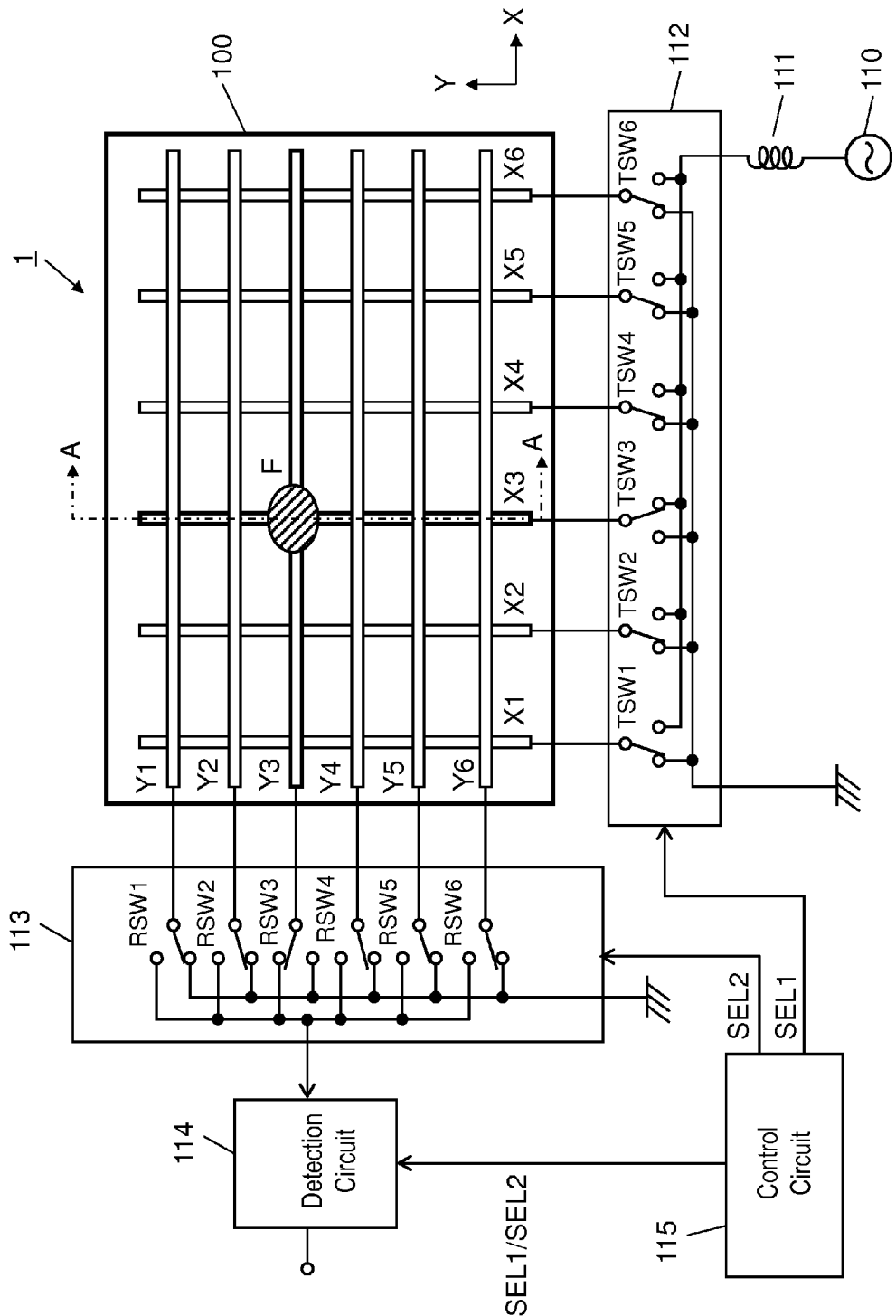
FIG. 3 is a schematic view of the touch panel device according to Embodiment 1.

FIG. 3 is a schematic view of touch panel device 1 according to Embodiment 1. Touch panel device 1 includes touch panel 100, AC signal source 110, drive electrode switch 112, detection electrode switch 113, detection circuit 114, and control circuit 115. Inductive element 111 functioning as a matching element is connected in series between AC signal source 110 and drive electrode switch 112.

As shown in FIG. 3, a longitudinal direction of touch panel 100 is defined as an X-axis while a direction perpendicular to the X-axis is defined as a Y-axis. Touch panel 100 includes drive electrodes 104 (first electrodes) and detection electrodes 102 (second electrodes). Drive electrodes 104 are arranged in a direction of the X-axis (a first direction) at almost regular intervals and extend in a direction of the Y-axis (a second direction). Detection electrodes 102 are arranged in the direction of the Y-axis at almost regular intervals and extend in the direction of the X-axis. In figures, drive electrode 104 includes six drive electrodes X1 to X6 while detection electrode 102 includes six detection electrodes Y1 to Y6 according to the embodiment. Drive electrodes X1 to X6 are arranged perpendicularly to detection electrodes Y1 to Y6 to form a grid.

AC signal source 110 is operable to generate an AC signal having a frequency ranging from, e.g. about 1.0 MHz to 1.5 MHz. Drive electrode switch 112 (first electrode switch) includes switches TSW1 to TSW6 electrically connected to drive electrodes X1 to X6, respectively. Drive electrode switch 112 selects drive electrode Xm (where m is an integer satisfying $1 \le m \le 6$) electrically connected to inductive element 111, and connects the other drive electrodes that are not selected to the ground. Terminals of drive electrode switch 112 are electrically connected to drive electrodes X1 to X6 while the other terminal is electrically connected to inductive element 111. Drive electrode switch 112 changes the connection status of connecting and disconnecting between inductive element 111 and each of drive electrodes X1 to X6. The drive electrode that is disconnected is connected to the ground.

As shown in FIG. 3, for example, when drive electrode X3 is selected, drive electrodes X1, X2, X4, X5, and X6 which are not connected are connected to the ground. AC signal source 110 inputs an AC signal via inductive element 111 to drive electrode X3 selected by drive electrode switch 112. Thus, if the connection status between inductive element 111 and drive electrode X3 is changed to connecting between inductive element 111 and drive electrode X3, drive electrodes X1, X2, X4, X5, and X6 that are disconnected are connected to the ground.

Detection electrode switch 113 (second electrode switch) includes switches RSW1 to RSW6 electrically connected to detection electrodes Y1 to Y6, respectively. Detection electrode switch 113 selects detection electrode Yn (where n is an integer satisfying $1 \le n \le 6$) to electrically connect detection electrode Yn to detection circuit 114, and connects the other detection electrodes that are not selected to the ground. In other words, terminals of detection electrode switch 113 are electrically connected to detection electrodes Y1 to Y6 while the other terminal is electrically connected to an input port of detection circuit 114. Detection electrode switch 113 changes the connection status of connecting and disconnecting between detection circuit 114 and each of detection electrodes Y1 to Y6. A detection electrode that is disconnected is connected to the ground.

As shown in FIG. 3, for example, when detection electrode Y3 is selected, detection electrodes Y1, Y2, Y4, Y5, and Y6 which are not selected are connected to the ground. When the connection status between detection electrode Y3 and detection circuit 114 is changed to connecting between detection electrode Y3 and detection circuit 114, detection electrodes Y1, Y2, Y4, Y5, and Y6 that are disconnected are connected to the ground, as described above.

A reason each drive electrode that is disconnected from AC signal source 110 and each detection electrode that is disconnected from detection circuit 114 are connected to the ground is to reduce an influence of noise generated on the drive electrode that is connected to AC signal source 110 and the detection electrode that is connected to detection circuit 114 when LCD 107 is driven. This configuration can reduce the influence of noise generated upon driving LCD 107 even if the touch panel device does not include shield layer 106 shown in FIG. 1. The drive electrode that is disconnected from AC signal source 110 and the detection electrode that is disconnected from detection circuit 114 are not necessarily connected to the ground. The electrodes that are disconnected may be connected to the ground according to the amount of noise generated from LCD 107 or the presence of shield layer 106.

Control circuit 115 outputs switching-control signal SEL1 to drive electrode switch 112 for controlling switches TSW1 to TSW6. Similarly, control circuit 115 outputs switching-control signal SEL2 to detection electrode switch 113 for controlling switches RSW1 to RSW6.

Detection circuit 114 generates detection voltage Vd based on the AC signal output from detection electrode Yn ($1 \le n \le 6$) selected by detection electrode switch 113 (i.e., connected to detection circuit 114), and compares detection voltage Vd with threshold voltage Vth so as to detect whether touch panel 100 is touched with object F or not.

In the description below, the electrode that is connected to the AC signal source, the inductive element, and the detection circuit with the drive electrode switch and the detection electrode switch is referred to as the "selected electrode", and the electrode that is disconnected is referred to as the "non-selected electrode".

Figure 4:
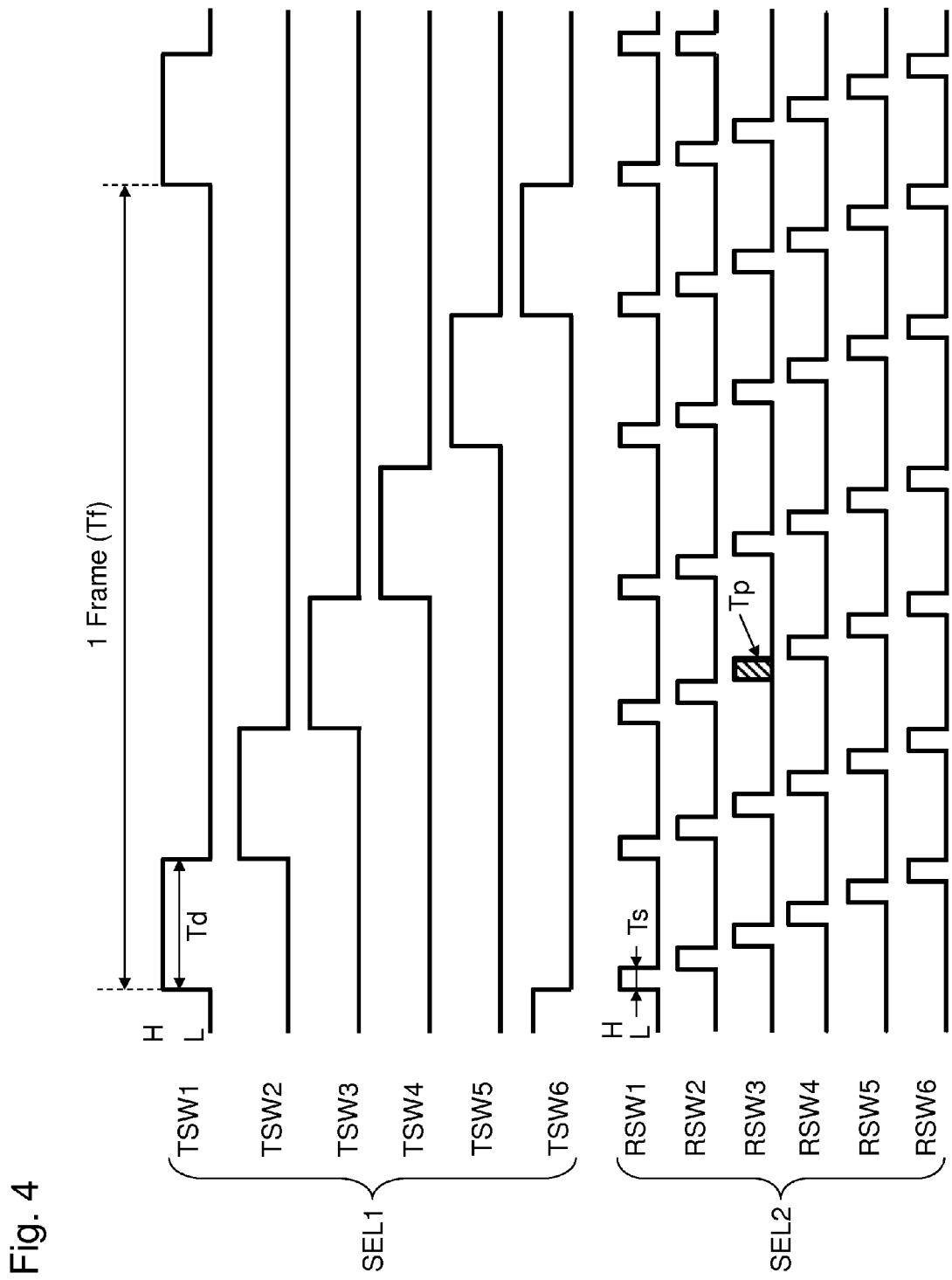
FIG. 4 is a timing chart illustrating a switching-control signal of the touch panel device according to Embodiment 1.

An operation of the touch panel device detecting the touch position on touch panel 100 will be described. FIG. 4 is a timing chart illustrating a timing of switching-control signal SEL1 controlling switches TSW1 to TSW6 of n drive electrode switch 112 and a timing of switching-control signal SEL2 controlling switches RSW1 to RSW6 of detection electrode switch 113.

As shown in FIG. 4, drive electrodes X1 to X6 are connected to AC signal source 110 via inductive element 111 during a period (Td) when switching-control signal SEL1 for switches TSW1 to TSW6 is at a high level "H", while drive electrodes X1 to X6 are connected to the ground during a period when switching-control signal SEL1 is at a low lever "L". Similarly, detection electrodes Y1 to Y6 are connected to detection circuit 114 during a period (Ts) when switching-control signal SEL2 for switches RSW1 to RSW6 are at a high level "H", while detection electrodes Y1 to Y6 are connected to the ground during a period when switching-control signal SEL2 is at a low level "L".

As illustrated in FIG. 4, drive electrode switch 112 scans drive electrodes X1 to X6 to successively select drive electrodes X1 to X6 to be connected to AC signal source 110 in a fixed time interval Td. During the period when specific drive electrode Xm ($1 \le m \le 6$) is connected to AC signal source 110 (during when the AC signal is input), detection electrode switch 113 scans to successively select all detection electrodes Y1 to Y6 in a fixed time interval Ts, and outputs the AC signal to detection circuit 114 from selected detection electrode Yn ($1 \le n \le 6$). After the selection of drive electrode X6 is ended, drive electrode switch 112 returns to first drive electrode X1 to repeat this scan. The scan of all drive electrodes X1 to X6 and the scan of all detection electrodes Y1 to Y6 are ended in frame time Tf, and the scan for the subsequent frame is started. This scanning operation is sequentially repeated under the control of control circuit 115.

Since the scanning speed for this frame is sufficiently higher than the motion of object F (frame time Tf is sufficiently small), the touch position of object F can be detected with a resolution determined by a space between the crossing points of the drive electrode and the detection electrode. Detection circuit 114 detects the position on touch panel 100 where object F touches, based on switching-control signals SEL1 and SEL2 input from control circuit 115 and the comparison result between detection voltage Vd and threshold voltage Vth.

For example, when object F touches the position where drive electrode X3 and detection electrode Y3 cross each other on touch panel 100 shown in FIG. 3, detection circuit 114 detects detection voltage Vd smaller than threshold voltage Vth on the timing (on timing Tp shown in FIG. 4) when switching-control signal SEL1 for switch TSW3 is at the high level "H", and switching-control signal SEL2 for switch RSW3 is at the high level "H".

In other words, detection circuit 114 detects the touch of object F on the timing when drive electrode X3 is connected to AC signal source 110, and detection electrode Y3 is connected to detection circuit 114.

Figures 5A, 5B:
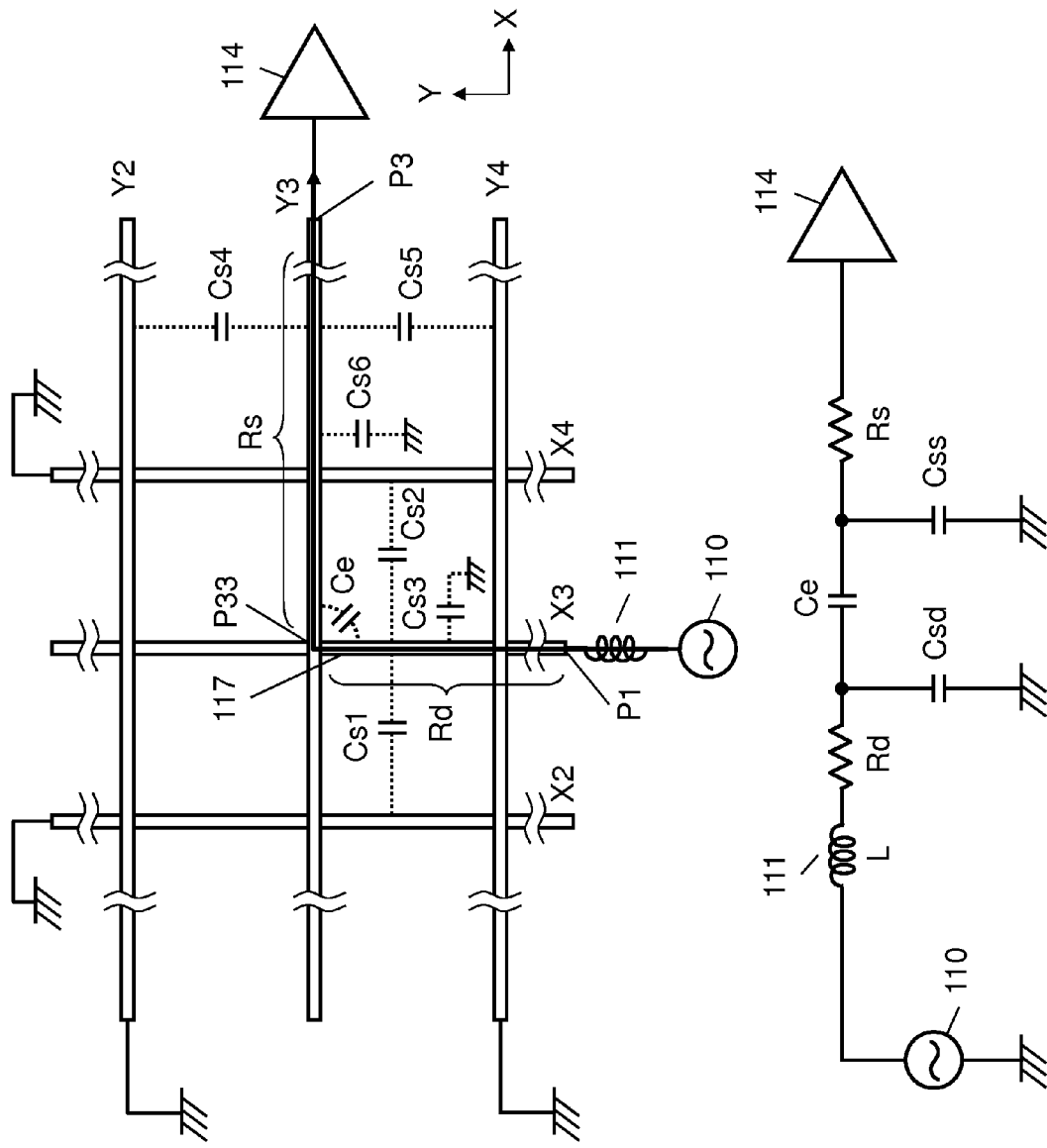
FIG. 5A is a schematic view of the touch panel device according to Embodiment 1.
FIG. 5B is an equivalent circuit diagram of the touch panel device illustrated in FIG. 5A.

In touch panel device 1 according to this embodiment, inductive element 111 is connected between AC signal source 110 and drive electrodes X1 to X6. An effect of inductive element 111 will be described below. FIG. 5A is a schematic view of touch panel device 1 illustrated in FIG. 3 in the case that object F touches the touch panel device. FIG. 5B is an equivalent circuit diagram of a transmission path from AC signal source 110 to detection circuit 114.

When drive electrode X3 and detection electrode Y3 of touch panel device 1 are selected, transmission path 117 into which AC signal current flows is formed from AC signal source 110 to detection circuit 114 via inductive element 111, input terminal P1 of drive electrode X3, crossing point P33 between drive electrode X3 and detection electrode Y3, and output terminal P3 of detection electrode Y3.

Resistance Rd exists between input terminal P1 of drive electrode X3 and crossing point P33 between drive electrode X3 and detection electrode Y3 while resistance Rs exists between crossing point P33 and output terminal P3 of detection electrode Y3.

Drive electrodes X2 and X4 adjacent to drive electrode X3 are connected to the ground. Therefore, stray capacitance Cs1 exists between drive electrodes X3 and X2 while stray capacitance Cs2 exists between drive electrodes X3 and X4. Stray capacitance Cs3 exists between drive electrode X3 and the panel ground.

Similarly, detection electrodes Y2 and Y4 adjacent to detection electrode Y3 are connected to the ground. Therefore, stray capacitance Cs4 exists between detection electrodes Y3 and Y2 while stray capacitance Cs5 exists between detection electrodes Y3 and Y4. Stray capacitance Cs6 exists between detection electrode Y3 and the panel ground.

As illustrated in FIG. 5B, transmission path 117 includes a serial resonance circuit including inductance L of inductive element 111 and a capacitance determined by stray capacitance Csd (=Cs1+Cs2+Cs3) of drive electrode X3, coupling capacitance Ce, and stray capacitance Css (=Cs4+Cs5+Cs6) of detection electrode Y3. Since coupling capacitance Ce is much smaller than stray capacitances Csd and Css, resonance frequency fres of this serial resonance circuit is represented by Formula (1).

$$fres \approx \frac{1}{2\pi\sqrt{L \times Csd}} \quad (1)$$

Stray capacitance Csd is determined by the width of drive electrode X3, and distances to adjacent drive electrodes X2 and X4, the panel ground, shied layer 106. Inductive element 111 electrically connected between the drive electrode and AC signal source 110 allows the drive electrode to resonate at the frequency of the AC signal, consequently increasing the amplitude of the AC signal flowing through the drive electrode. This increases the intensity of electric field and the intensity of magnetic field near the drive electrode, thereby enhancing sensitivity of touch panel 100.

In a touch panel which does not include inductive element 111 electrically connected between the drive electrode and AC signal source 110 mounted to an ordinary information terminal, such as a smartphone or a tablet PC, the resonance frequency of the drive electrode is high, tens of megahertz. On the other hand, the frequency of the AC signal output from AC signal source 110 of the touch panel device mounted on the ordinary information terminal ranges from tens of kilohertz to about 500 kilohertz. This arrangement prevents the drive electrode from resonating at the frequency of the AC signal unless inductive element 111 is electrically connected between the drive electrode and AC signal source 110. Inductive element 111 is electrically connected between the drive electrode and AC signal source 110 of touch panel device 1 according to Embodiment 1. This configuration reduces the resonance frequency of the drive electrode, and hence, allows the drive electrode to resonate at the frequency of the AC signal. Thus, the sensitivity of touch panel 100 can be enhanced.

A reason why the frequency of the AC signal output from AC signal source 110 in the touch panel device mounted on the ordinary information terminal ranges from tens of kilohertz to about 500 kilohertz will be described below. Specifically, the drive electrode and the detection electrode function as a low-pass filter when the AC signal transmits through the drive electrode and the detection electrode. When the AC signal having a high frequency higher than 500 kHz is input, the AC signal is significantly attenuated during the transmission through the electrodes. Therefore, the frequency of the AC signal is often determined to be lower than a cutoff frequency of a low-pass filter implemented by the drive electrode and the detection electrode in order to reduce a power loss during the transmission of the signal through each electrode. According to Embodiment 1, the resonance frequency of the drive electrode and the other electrodes can be reduced by increasing the inductance of inductive element 111. The configuration according to Embodiment 1 allows the drive electrode or other electrodes to resonate at a frequency not higher than 500 kHz, for example, thus, providing touch panel device 1 with high sensitivity.

However, if the inductance of inductive element 111 increases so as to decrease the resonance frequency of the electrodes to a frequency lower than the cutoff frequency of the drive electrode and the other electrodes, a resistance loss of inductive element 111 accordingly increases in proportion to the increase of the inductance. If the inductance excessively increases, the sensitivity of touch panel device 1 might be deteriorated due to the power loss on inductive element 111. In view of this, the structure of the drive electrode and the other electrodes may be designed to have a cutoff frequency as high as possible. A target value of the resonance frequency provided by inductive element 111 and the drive electrode is about the cutoff frequency (e.g., about 1.0 MHz to about 1.5 MHz in a touch panel device for an ordinary communication device) of the drive electrode or other electrodes in order to prevent the excessive increase of the inductance of inductive element 111. The frequency of the AC signal output from AC signal source 110 is set to be around resonance frequency fres determined by inductive element 111 and the drive electrode or other electrodes.

As illustrated in the equivalent circuit diagram shown in FIG. 5, cutoff frequency fc of transmission path 117 has a relationship represented in Formula (2) with time constant (Rd×Csd) of the low-pass filter implemented by drive electrode X3 and time constant (Rs×Css) of the low-pass filter implemented by detection electrode Y3.

$$fc \propto \frac{1}{Rd \times Csd} \times \frac{1}{Rs \times Css} \quad (2)$$

In order to increase cutoff frequency fc, at least any one of resistance Rd of drive electrode X3, stray capacitance Csd, resistance Rs of detection electrode Y3, and stray capacitance Css is decreased.

FIG. 6A illustrates an intensity of an electric field reaching the detection electrode from the drive electrode in a comparative sample of a touch panel device in which inductive element 111 is not provided. FIG. 6B illustrates an intensity of an electric field reaching the detection electrodes from the drive electrode in touch panel device 1 according to Embodiment 1 in which the drive electrode or other electrodes resonate with inductive element 111 at the frequency of the AC signal output from AC signal source 110.

When an AC signal voltage having resonance frequency fres determined by inductance L of inductive element 111 and stray capacitance Csd is applied to drive electrode 104, a resonance current having a large amplitude flows through drive electrode 104, as illustrated in FIG. 6B. The resonance current causes the intensity of electric field E2 reaching detection electrode 102 from drive electrode 104 to become larger than the intensity of electric field E1 near the electrode of the comparative example of the touch panel device illustrated in FIG. 6A. As a result, electric field E2 reaches a position far from the surface of touch panel 100. When object F approaches a region where electric field E2 can reach, capacitance Cf described above is formed between object F and detection electrode 102. Accordingly, the longer distance to the region where the electric field reaches is enhances the detection sensitivity of touch panel 100 to object F.

In touch panel device 1 illustrated in FIG. 3, single inductive element 111 is connected to each of drive electrodes X1 to X6. Since resistance Rd and stray capacitance Csd of drive electrodes X1 to X6 have variations, the input impedances of the drive electrodes are not identical to each other, but are different from one another. Therefore, in the case that drive electrodes X1 to X6 resonate with single inductive element 111, the resonance frequencies of drive electrodes X1 to X6 may be different from one another. Consequently, the AC signal having only a single frequency may prevent a large resonance current from flowing through all drive electrodes X1 to X6.

Figure 7A:
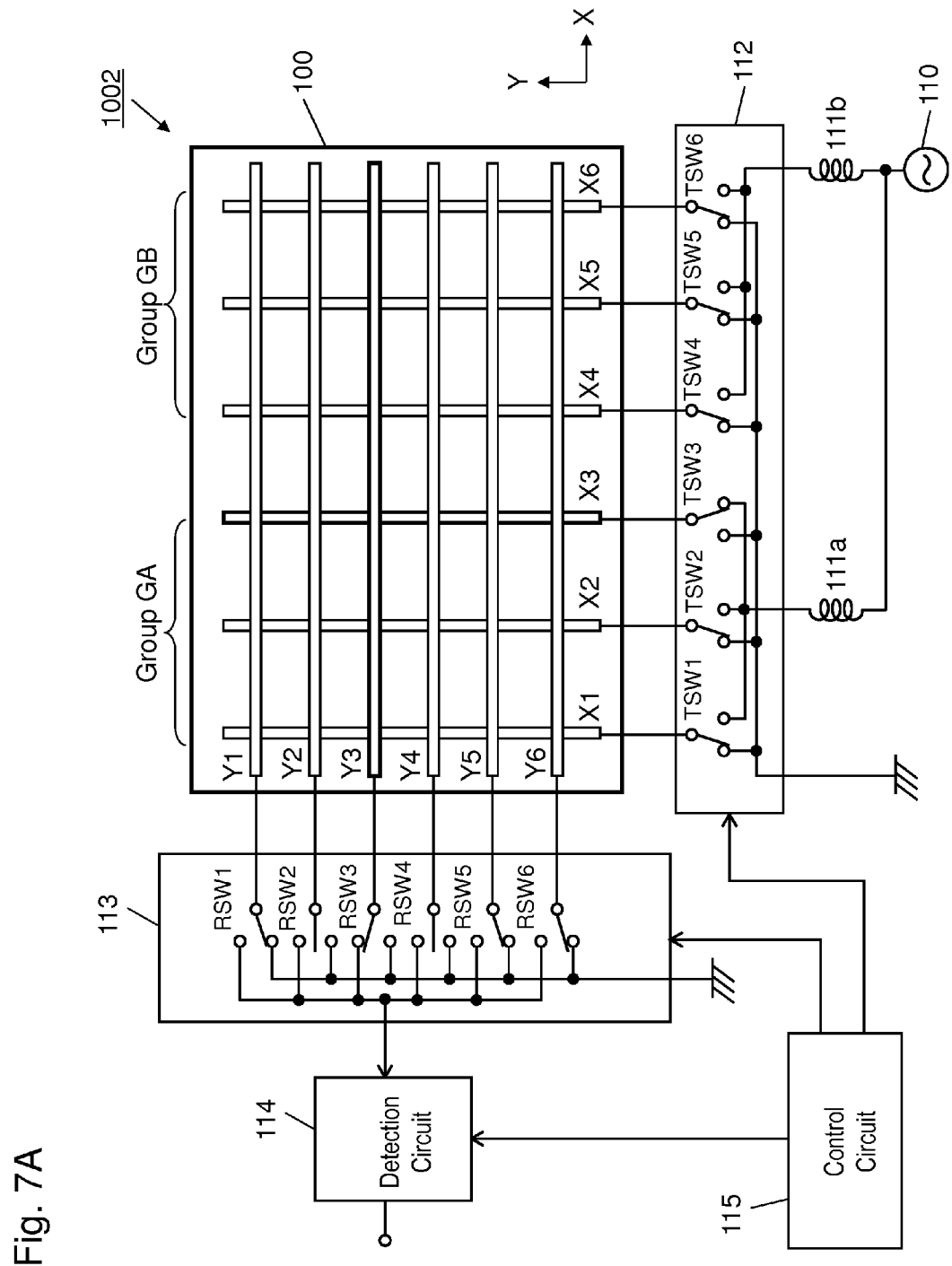
FIG. 7A is a schematic view of another touch panel device according to Embodiment 1.

Instead of inductive element 111, the touch panel device may include a switch and plural inductive elements having different inductances. The switch selects an inductive element out of the inductive elements having an optimum inductance according to the electrode to which the AC signal is input. FIG. 7A is a schematic view of another touch panel device 1002 according to Embodiment 1. In FIG. 7A, components identical to those of touch panel device 1 shown in FIG. 1 are denoted by the same reference numerals. In touch panel device 1002 illustrated in FIG. 7A, drive electrodes X1 to X6 are divided into group GA including drive electrodes X1 to X3 that have input impedances substantially identical to each other, and group GB including drive electrodes X4 to X6 having input impedances substantially identical to each other. Inductive element 111a having inductance La is configured to be connected in series to each of drive electrodes X1 to X3 belonging to group GA. Inductive element 111b having inductance Lb is configured to be connected in series to drive electrodes X4 to X6 belonging to group GB. This configuration allows an inductive element having optimum inductance L is connected to each group including the electrodes having input impedances substantially identical to each other, thereby reducing the variation of the resonance frequency between the groups. Thus, a resonance current having large amplitude flows upon driving each electrode, thereby enhancing the sensitivity of touch panel device 1002.

Figure 7B:
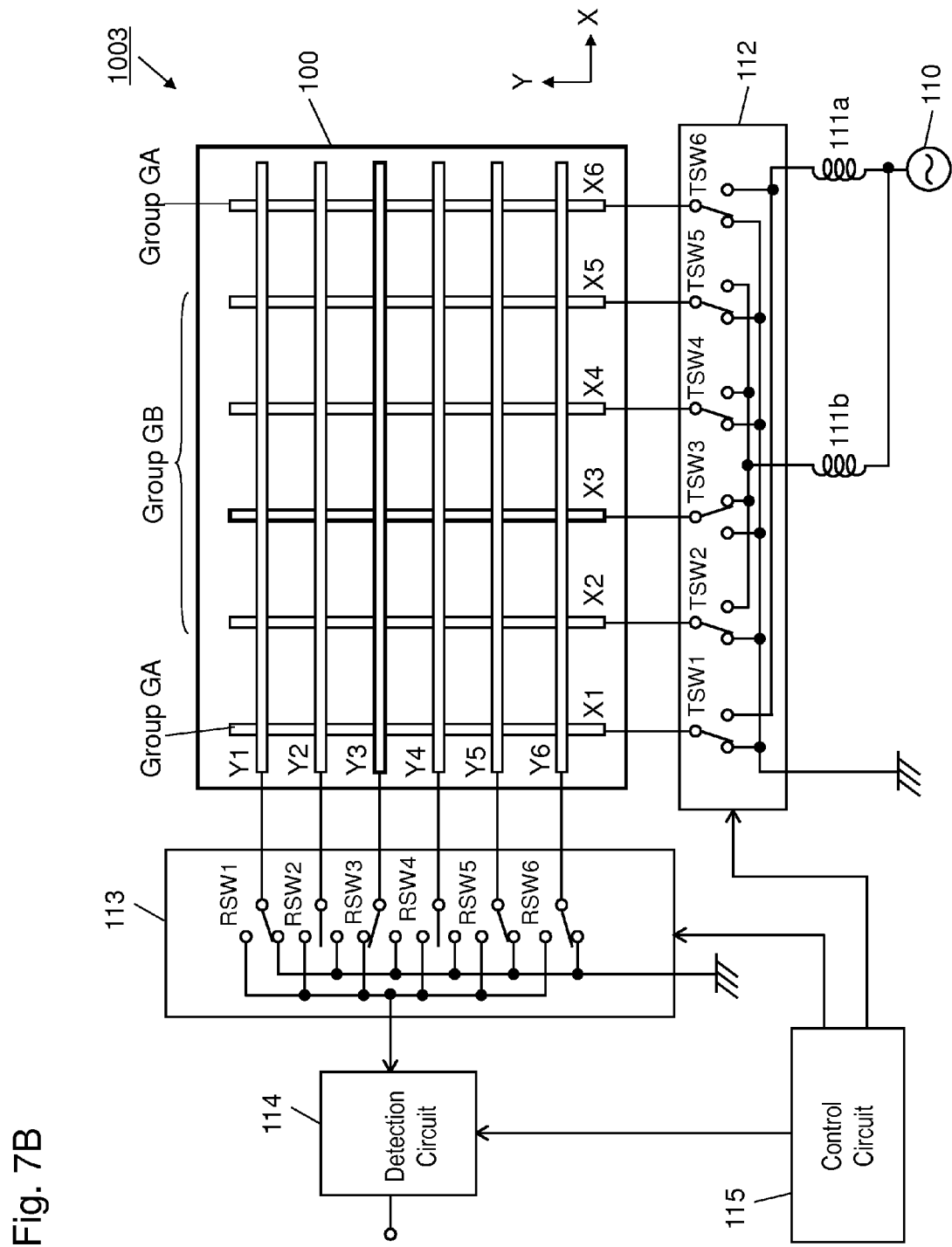
FIG. 7B is a schematic view of still another touch panel device according to Embodiment 1.

The drive electrodes may be grouped as follows. Specifically, an ambient condition (the positional relationship with the ground or other electrodes) of each drive electrode is confirmed, and the drive electrodes having the similar ambient condition are grouped. In other words, the drive electrodes may be grouped into plural groups with almost the same stray capacitance Csd. If the ambient condition is similar, the stray capacitance of the drive electrode becomes similar. Therefore, the variation of the input impedances of the grouped electrodes can be reduced. FIG. 7B is a schematic view of still another touch panel device 1003 according to Embodiment 1. In FIG. 7B, components identical to those of touch panel device 1002 shown in FIG. 7A are denoted by the same reference numerals. In touch panel device 1003 illustrated in FIG. 7B, drive electrodes X1 and X6 arranged at both ends are grouped as group GA while drive electrodes X2, X3, X4, and X5 between drive electrodes X1 and X6 are grouped into group GB. The drive electrodes X1 and X6 at both ends have an ambient surrounding condition different from that of drive electrodes X2, X3, X4, and X5 between drive electrodes X1 and X6. Therefore, the stray capacitance may be different. On the other hand, drive electrodes X1 and X6 belonging to group GA have similar ambient conditions, and thus, have similar stray capacitances. Drive electrodes X2, X3, X4, and X5 belonging to group GB have similar ambient conditions, and thus, have similar stray capacitances. This configuration reduces the variation of the input impedances of drive electrodes in group GA and drive electrodes in group GB.

Instead of inductive element 111 shown in FIG. 3, inductive elements each causing respective one of drive electrodes X1 to X6 may be electrically connected between drive electrode switch 112 and respective one of drive electrodes X1 to X6. This configuration can select the optimum inductance that resonates each electrode, thereby enhancing the intensity of the electric field and the intensity of the magnetic field around the electrode.

Figure 8:
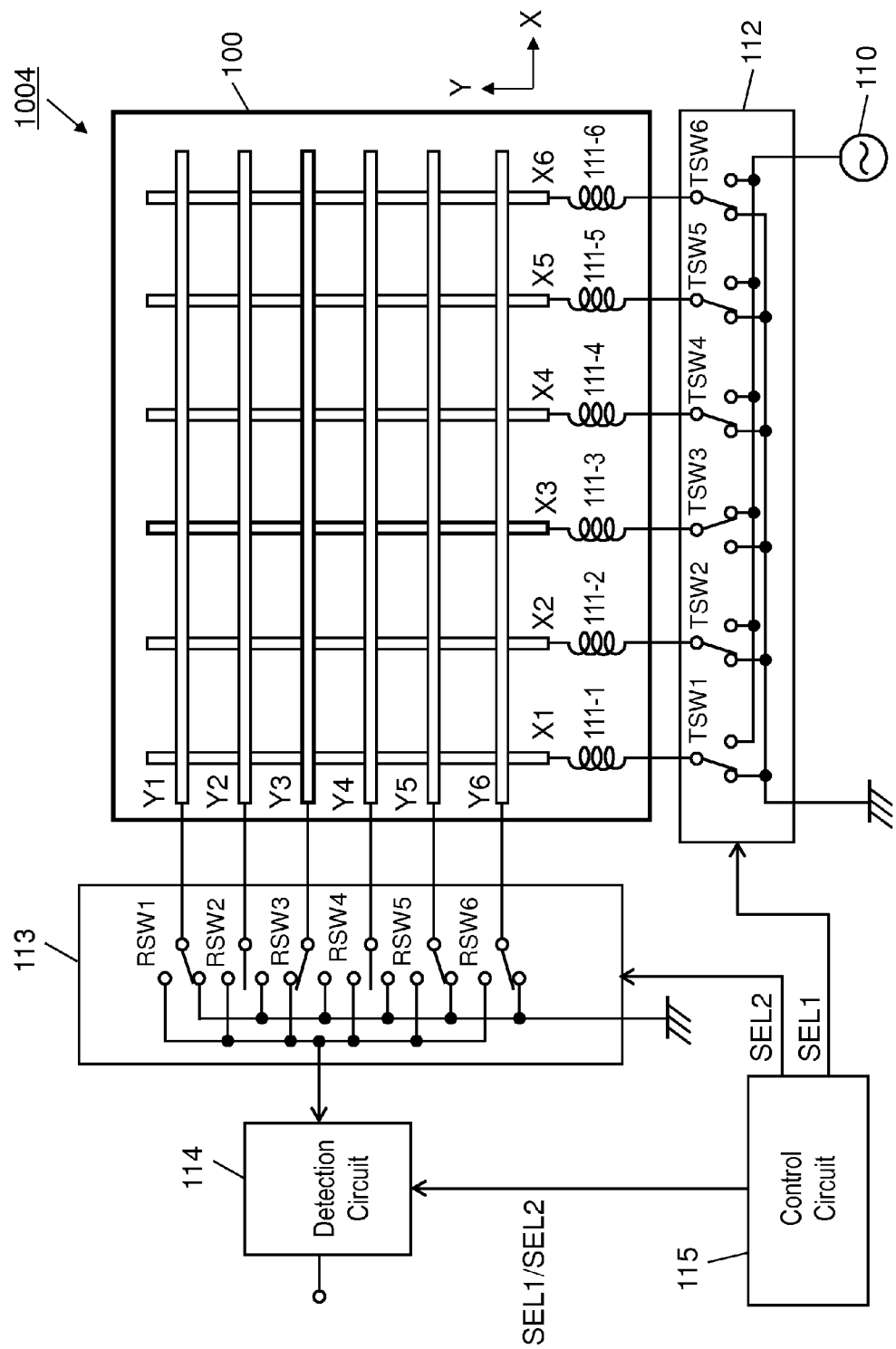
FIG. 8 is a schematic view of a further touch panel device according to Embodiment 1.

FIG. 8 is a schematic view of further touch panel device 1004 according to Embodiment 1. In FIG. 8, components identical to those of touch panel device 1 shown in FIG. 1 are denoted by the same reference numerals. In touch panel device 1004 illustrated in FIG. 8, inductive elements 111-1 to 111-6 are connected between drive electrode switch 112 and drive electrodes X1 to X6, respectively. Specifically, inductive elements 111-1 to 111-6 having different inductances are connected to respective one of drive electrodes X1 to X6. In FIG. 8, terminals of drive electrode switch 112 are connected to inductive elements 111-1 to 111-6 while the other terminal is connected to AC signal source 110. Drive electrode switch 112 changes the connection status of connecting and disconnecting between AC signal source 110 and inductive elements 111-1 to 111-6.

This configuration can adjust the inductances of the inductive elements for each drive electrode, thereby matching resonance frequency fres more correctly. Consequently, the detection sensitivity can be adjusted to be the same for drive electrodes X1 to X6.

In the case described above, the number of the inductive elements increases to reduce the variation of the input impedances of the drive electrodes or other electrodes. However, the frequency of the output signal from the AC signal source may be changed to a frequency allowing each electrode to resonate with the input impedance of each electrode and the inductance shown in FIG. 3, for each electrode that is to be driven. This configuration causes a resonance on each electrode without an increase of the number of the inductive elements, thereby providing inexpensive touch panel device with a small size.

In touch panel device 1 according to Embodiment 1, an inductive element for resonating detection electrodes Y1 to Y6 may not electrically connected between detection circuit 114 and detection electrodes Y1 to Y6 (second electrodes). This configuration can avoid excessively high detection sensitivity of detection electrodes Y1 to Y6, since the resonance frequency of each of detection electrodes Y1 to Y6 and the frequency of the AC signal are different from each other. Accordingly, this configuration can avoid the situation preventing detection circuit 114 from detecting the AC signal. This situation is caused by a sensitive reception of noises emitted from a noise source, such as a liquid crystal panel, which is mounted near the touch panel device, by detection electrodes Y1 to Y6.

The "resonance frequency" according to Embodiment 1 means a frequency providing an imaginary component of 0 of an input impedance at a target electrode viewed from a node between the inductive element and the AC signal source or an input point of a detection signal of the detection circuit, across a first electrode switch (representing the drive electrode switch or an X-electrode switch) or a second electrode switch (representing the detection electrode switch or a Y-electrode switch).

Exemplary Embodiment 2

Figure 9:
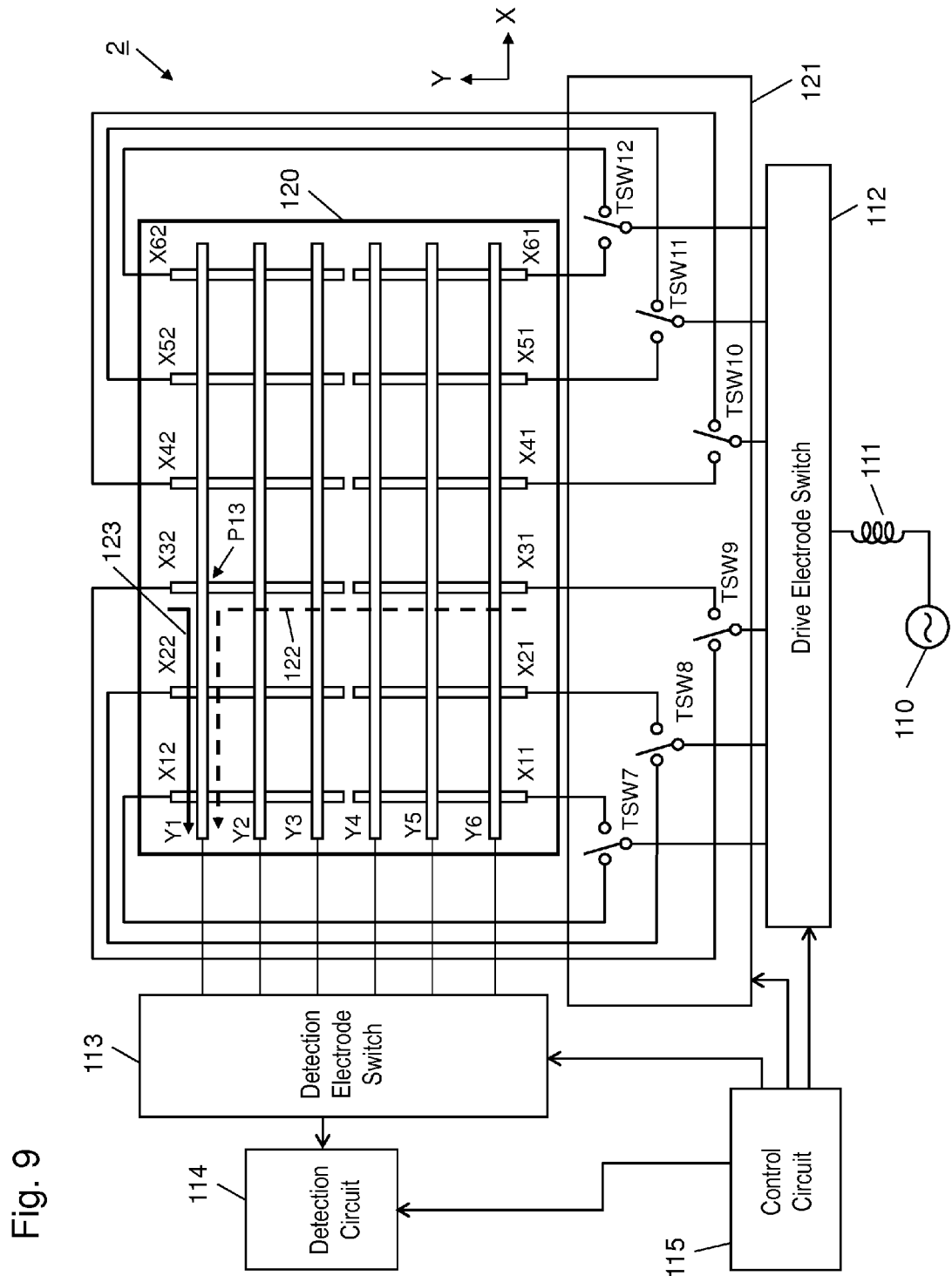
FIG. 9 is a schematic view of a touch panel device according to Exemplary Embodiment 2.

FIG. 9 is a schematic view of touch panel device 2 according to Exemplary Embodiment 2. In FIG. 9, components identical to those of touch panel device 1 according to Embodiment 1 shown in FIG. 1 are denoted by the same reference numerals. Touch panel device 2 according to Embodiment 2 includes touch panel 120 instead of touch panel 100, and further includes divisional electrode switch 127.

As illustrated in FIG. 9, on touch panel 120, drive electrode Xm ($1 \leq m \leq 6$) is divided into drive electrode Xm1 ($1 \leq m \leq 6$) (third electrode) and drive electrode Xm2 ($1 \leq m \leq 6$) (fourth electrode) at a central part of drive electrode Xm in the Y-axis direction.

In order to input the AC signal from single AC signal source 110 to drive electrodes Xm1 ($1 \leq m \leq 6$) and drive electrodes Xm2 ($1 \leq m \leq 6$), divisional electrode switch 127 is serially connected to drive electrode switch 112. Divisional electrode switch 127 includes switches TSW7 to TSW12. Control circuit 115 controls divisional electrode switch 127 to connect drive electrode Xm2 ($1 \leq m \leq 6$) to AC signal source 110 during the scan of detection electrodes Y1 to Y3 by detection electrode switch 113, and to connect drive electrode Xm1 ($1 \leq m \leq 6$) to AC signal source 110 during the scan of detection electrodes Y4 to Y6 by detection electrode switch 113, thereby inputting the AC signal to the drive electrodes. The structure of drive electrodes X1 to X6 that are divided into two allows the effective length of each of the divisional drive electrodes to be shorter than that of each of non-divisional drive electrodes (almost ½ of that of each of non-divisional drive electrodes shown in FIG. 9A). Consequently, resistance Rd and stray capacitance Csd of each of the divisional drive electrodes become smaller than those of the non-divisional drive electrodes. This configuration can increase cutoff frequency fc in the case that the drive electrode is regarded as the transmission path more than cutoff frequency fc of the drive electrode that is not divided. Therefore, the frequency of the AC signal can be higher than the frequency of the AC signal for the drive electrode that is not divided. Thus, the inductance of inductive element 111 can be reduced, thereby reducing the resistance loss on inductive element 111. Accordingly, the intensities of the electric field and the magnetic field generated from the drive electrode can be increased.

When the position where the touch is detected is crossing point P13 shown in FIG. 9, the AC signal input from AC signal source 110 passes through path 122 according to Embodiment 1 in which the drive electrode is not divided. On the other hand, the AC signal input from AC signal source 110 passes through path 123 according to Embodiment 2 in which the drive electrode is divided into two. The length of drive electrode X32 on path 123 is shorter than the length of drive electrode (X3) on path 122. This configuration reduces energy loss caused on the drive electrode upon transmitting the AC signal through the drive electrode, thereby providing the touch panel device with high sensitivity.

The configuration in which inductive element 111 is electrically connected between drive electrode switch 112 and AC signal source 110 of touch panel device 2 illustrated in FIG. 9 requires only one inductive element 111. This configuration simplifies the circuit structure, and provides an inexpensive touch panel device with a small size. Touch panel device 2 illustrated in FIG. 9 includes only one AC signal source 110, thus having a simple circuit structure and small power consumption.

As shown in FIG. 9, divisional electrode switch 127 is configured as a switch separate from drive electrode switch 112. However, drive electrode switch 112 may include divisional electrode switch 127.

As shown in FIG. 9, the drive electrode is divided into two substantially at a central part of the drive electrode in the Y-axis direction. Since the electrode is divided into two substantially at the central part, the input impedances of a pair of the divisional electrodes (e.g., a pair of drive electrodes X11 and X12) are similar to each other. Therefore, it is unnecessary to prepare the inductive element for each of the divisional electrodes, hence providing the touch panel device with a small size.

Modifications 1 to 7 according to Embodiment 7 will be described below with reference to FIGS. 10 to 15B. In FIGS. 10 to 15B, components identical to those of touch panel device 2 shown in FIG. 9 are denoted by the same reference numerals.

Modification 1

Figure 10:
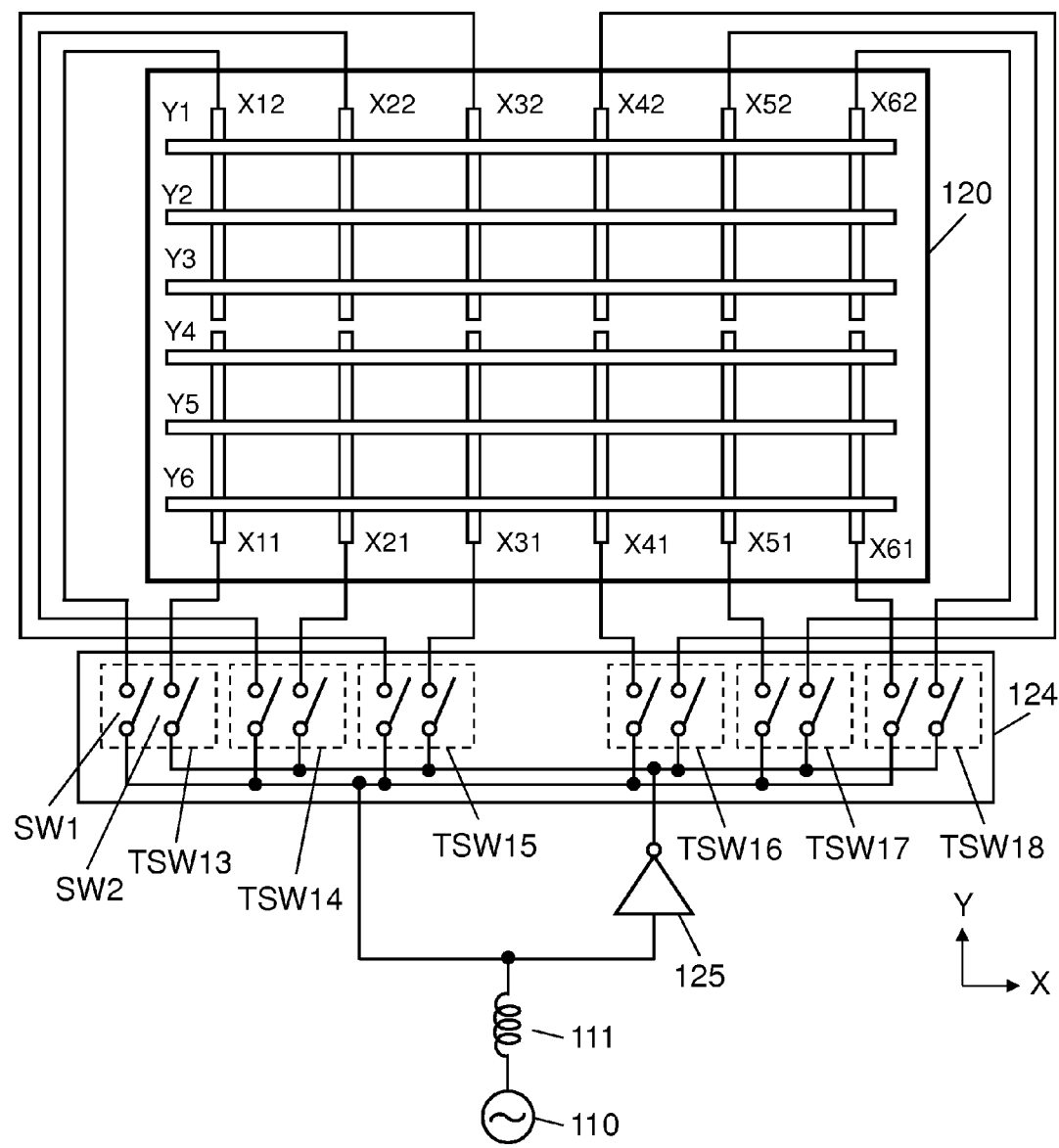
FIG. 10 is a schematic view of Modification 1 of the touch panel device according to Embodiment 2.

FIG. 10 is a schematic view of Modification 1 of touch panel device 2 according to Embodiment 2. In this modification, AC signals having reverse phases are simultaneously input from one AC signal source 110 to each of divisional drive electrode Xm1 ($1 \leq m \leq 6$) and drive electrode Xm2 ($1 \leq m \leq 6$).

Inductive element 111 is connected to AC signal source 110. Inductive element 111 is connected to drive electrode switch 124 directly or via phase inverter circuit 125. Drive electrode switch 124 includes six switches TSW13 to TSW18 which are sequentially switched. Each of switches TSW13 to TSW18 includes two switches SW1 and SW2 that are simultaneously turned on and off. Therefore, the AC signals having the reverse phases are simultaneously input from AC signal source 110 to two drive electrode Xm1 (1≤m≤6) and drive electrode Xm2 (1≤m≤6) selected by drive electrode switch 124.

Thus, this modification does not require divisional electrode switch 127 shown in FIG. 9, hence simplifying the circuit structure.

Modification 2

Figure 11:
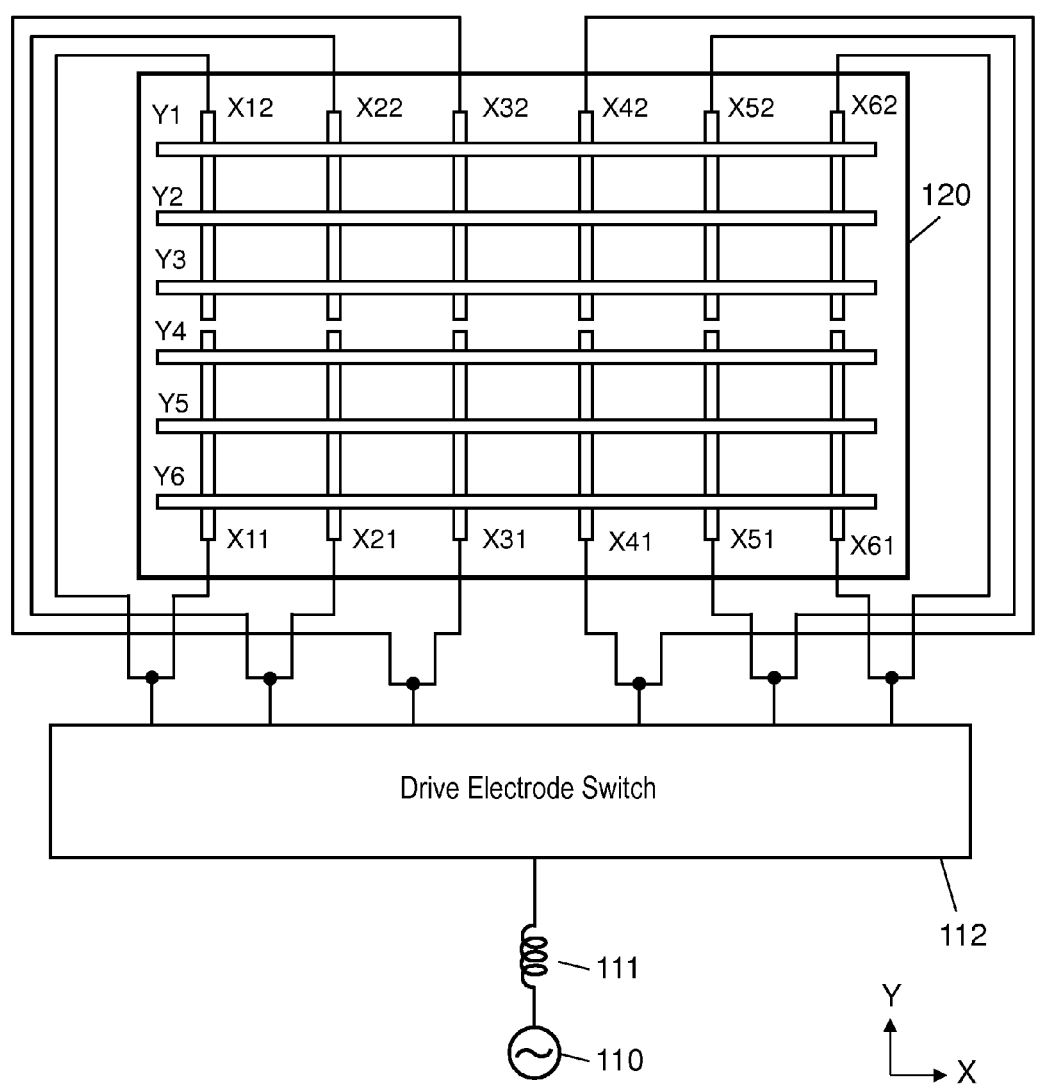
FIG. 11 is a schematic view of Modification 2 of the touch panel device according to Embodiment 2.

FIG. 11 is a schematic view of Modification 2 of touch panel device 2 according to Embodiment 2. In this present modification, AC signals having same phases, are simultaneously input from one AC signal source 110 to divisional drive electrode Xm1 (1≤m≤6) and divisional drive electrode Xm2 (1≤m≤6). The touch panel device of this modification is different from touch panel device 2 in that drive electrode Xm1 and drive electrode Xm2 are connected to same AC signal source 110 without being switched to simultaneously input the AC signal having the same phases to the respective drive electrodes.

Thus, this modification requires neither the divisional electrode switch 127 shown in FIG. 9 nor phase inverter circuit 125 shown in FIG. 10, hence simplifying the circuit structure.

Modification 3

Figure 12:
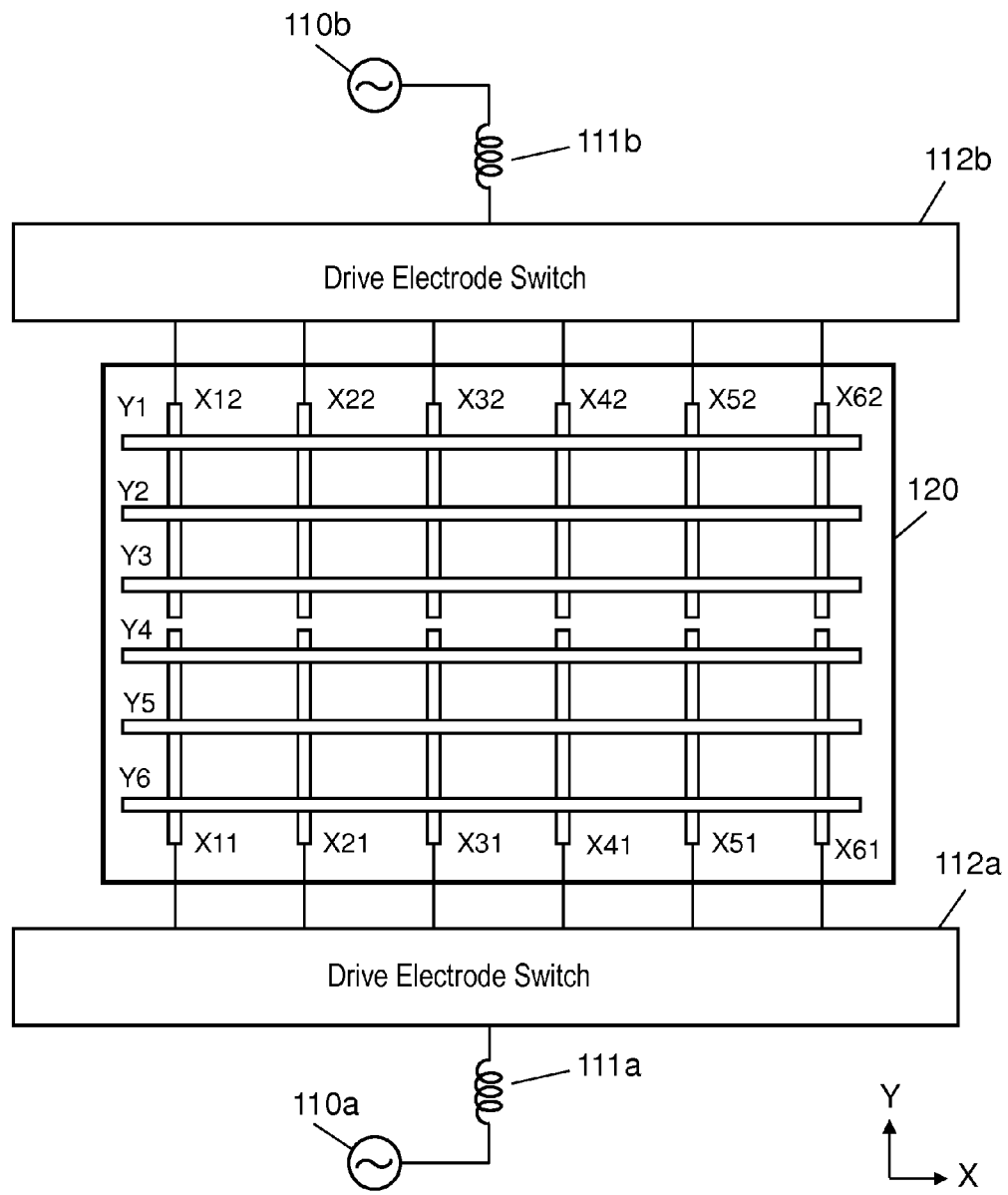
FIG. 12 is a schematic view of Modification 3 of the touch panel device according to Embodiment 2.

FIG. 12 is a schematic view of Modification 3 of touch panel device according to Embodiment 2. In this modification, the AC signals are simultaneously input to each of the divisional drive electrodes from different AC signal sources.

The AC signals are input from two different AC signal sources 110a and 110b to divisional drive electrodes Xm1 (1≤m≤6) and divisional drive electrodes Xm2 (1≤m≤6), respectively. Drive electrodes Xm1 (1≤m≤6) are connected to AC signal source 110a via drive electrode switch 112a and inductive element 111a. Drive electrodes Xm2 (1≤m≤6) are connected to AC signal source 110b via drive electrode switch 112b and inductive element 111b. Drive electrode switch 112a and drive electrode switch 112b perform a switching operation for simultaneously selecting drive electrodes Xm1 and Xm2 having same integer m.

The configuration in which the AC signals are input from two different AC signal sources to the divisional drive electrodes does not require a bridging of a wiring from the AC signal source to the drive electrode for electrical insulation. This configuration reduces the number of wiring layers on a wiring board.

Modification 4

Figure 13:
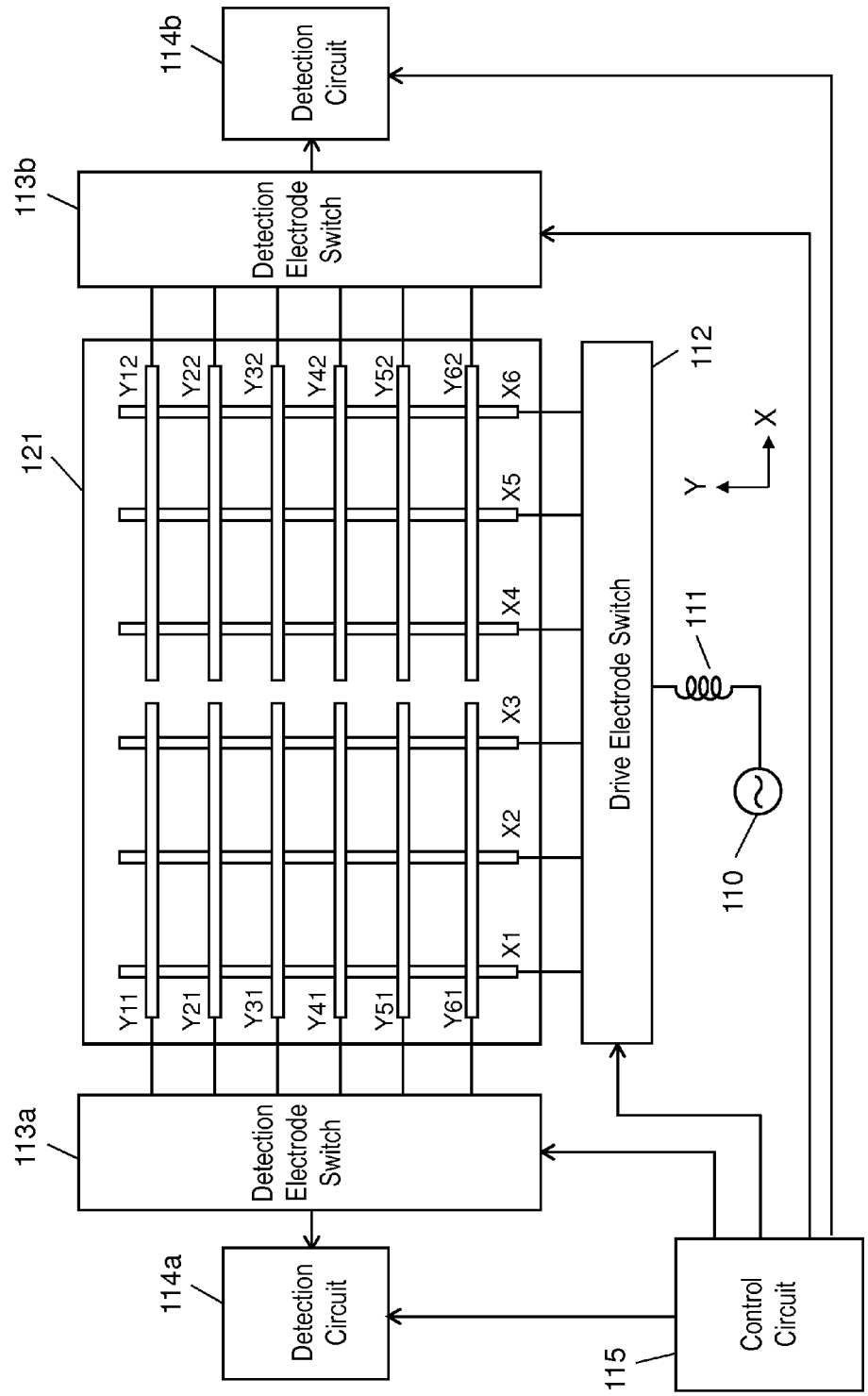
FIG. 13 is a schematic view of Modification 4 of the touch panel device according to Embodiment 2.

FIG. 13 is a schematic view of Modification 4 of the touch panel device according to Embodiment 2. In Modifications 1 to 3, drive electrodes X1 to X6 are divided. However, similar effects can be obtained by dividing detection electrodes Y1 to Y6. In this modification, each of detection electrodes Y1 to Y6 is divided into two substantially at a center part thereof in the X-axis direction. The AC signal is separately output from divided detection electrodes Yn1 (1≤n≤6) (fifth electrodes) and divided detection electrodes Yn2 (1≤n≤6) (sixth electrodes).

On touch panel 121 of to this modification, each of detection electrodes Y1 to Y6 is divided into two, detection electrode Yn1 (1≤n≤6) and detection electrode Yn2 (1≤n≤6). Detection electrode Yn1 (1≤n≤6) is connected to detection circuit 114a via detection electrode switch 113a. Detection electrode Yn2 (1≤n≤6) is connected to detection circuit 114b via detection electrode switch 113b. Detection electrode switch 113a scans detection electrodes Yn1 (1≤n≤6) for sequentially connecting detection electrodes Yn1 (1≤n≤6) to detection circuit 114a while drive electrode switch 112 selects each of drive electrodes X1 to X3. Detection electrode switch 113b scans detection electrodes Yn2 (1≤n≤6) for sequentially connecting detection electrodes Yn2 (1≤n≤6) to detection circuit 114b while drive electrode switch 112 selects each of drive electrodes X4 to X6.

The detection electrode divided into two shortens the average effective length of the detection electrode in the transmission path from AC signal source 110 to detection circuit 114a or 114b. Consequently, the average effective values of resistance Rs and stray capacitance Css of the detection electrode can be made smaller than those in the case where the detection electrode is not divided. This configuration increases cutoff frequency fc in the transmission path more than cutoff frequency fc in the case where the detection electrode is not divided. On touch panel 121 according to Embodiment 2, the electrode (Y-electrode) longer than the X-electrode is used as the detection electrode. Therefore, the configuration in which the detection electrode is divided provides the effect of increasing the cutoff frequency becomes more significant. From this technical idea, it may be configured such that the longer electrode is preferentially divided.

Drive electrode switch 112 may be controlled to input the AC signal from AC signal source 110 to one of drive electrodes (in FIG. 13, drive electrodes Xn (1≤n≤3)) facing detection electrodes Yn1 (1≤n≤6) and to one of drive electrodes (in FIG. 13, drive electrodes Xn (4≤n≤6)) facing detection electrodes Yn2 (1≤n≤6). In this configuration, two electrodes out of drive electrodes X1 to X6 can simultaneously be scanned, thereby reducing shortening the scanning time of drive electrodes X1 to X6.

This effect is obtained, because the detection electrode is divided.

In FIG. 13, detection circuits 114a and 114b are connected to the divided detection electrodes respectively. However, a single detection electrode switch and a single detection circuit can be switched by the divisional electrode switch similarly to touch panel device 2 illustrated in FIG. 9 in the case that detection electrode switch 113a and detection circuit 114a are not simultaneously driven, as well as detection electrode switch 113b and detection circuit 114b are not simultaneously driven. This configuration requires a single detection circuit, hence simplifying the circuit structure and reducing the power consumption.

Modification 5

Figure 14:
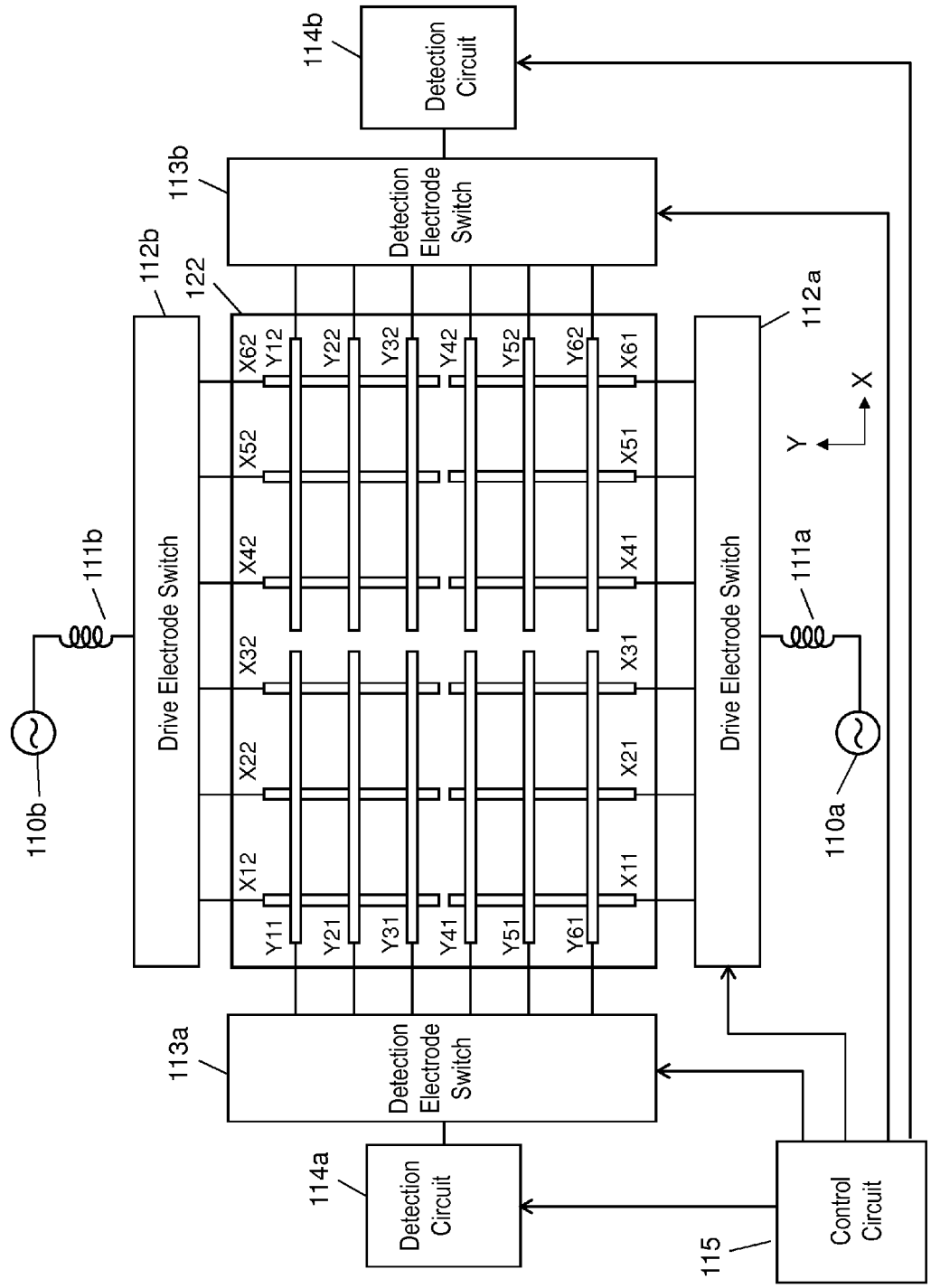
FIG. 14 is a schematic view of Modification 5 of the touch panel device according to Embodiment 2.

FIG. 14 is a schematic view of Modification 5 of the touch panel device according to Embodiment 2. In this modification, each of the drive electrodes and the detection electrodes is divided into two substantially at the center part thereof. Drive electrode Xm (1≤m≤6) is divided into drive electrode Xm1 (1≤m≤6) and drive electrode Xm2 (1≤m≤6), while detection electrode Yn (1≤n≤6) is divided into detection electrode Yn1 (1≤n≤6) and detection electrode Yn2 (1≤n≤6). The other configuration is the same as those shown in FIGS. 12 and 13, and their redundant description will be omitted.

This configuration reduces the average effective lengths of the drive electrodes and the detection electrodes in the transmission path from AC signal source 110a to detection circuit 114a and in the transmission path from AC signal source 110b to detection circuit 114b. As a result, the average effective values of resistance Rd of the drive electrode, resistance Rs of the detection electrode, stray capacitance Csd of the drive electrode, and stray capacitance Css of the detection electrode become smaller than those of the touch panel device having non-divisional electrodes. This configuration can increase cutoff frequency fc in the transmission path more than cutoff frequency fc in the case where the electrode is not divided.

Similarly to Modification 4, the AC signal source, the drive electrode switch, and the detection electrode switch may be required in one way, and the divisional drive electrodes and the detection electrodes may be switched respectively. Similarly to Modification 4, drive electrode switches 112a and 112b may be controlled to apply the AC signal from AC signal sources 110a and 110b to one of the drive electrodes (in FIG. 14, a pair of one of drive electrodes Xn1 ($1 \leq n \leq 3$) and one of drive electrodes Xn2 ($1 \leq n \leq 3$)) which face detection electrode Yn1 ($1 \leq n \leq 6$), and one of the drive electrodes (in FIG. 14, a pair of one of drive electrodes Xn1 ($4 \leq n \leq 6$) and one of drive electrodes Xn2 ($4 \leq n \leq 6$)) which face detection electrode Yn2 ($1 \leq n \leq 6$).

In the modifications described above, the electrode along a shorter axis (X-electrode) is used as the drive electrode. However, the electrode with a longer axis (Y-electrode) may be used as the drive electrode. When the Y-electrode is used as the drive electrode, resistance Rd and stray capacitance Csd of the drive electrode become larger than those in the case where the X-electrode is used as the drive electrode. Therefore, the effect obtained by dividing the electrode increases.

Modification 6

Figure 15B:
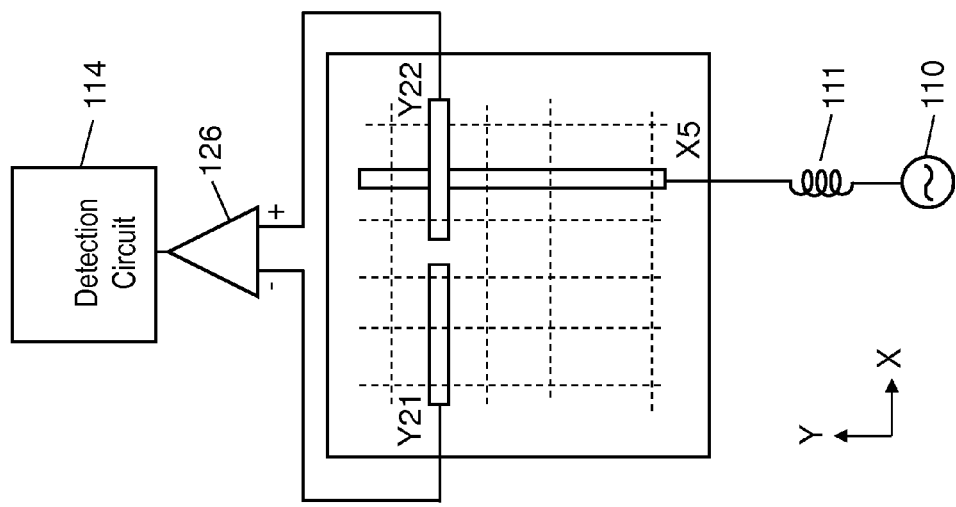
FIG. 15B is a schematic view of Modification 7 of the touch panel device according to Embodiment 2.
Figure 15A:
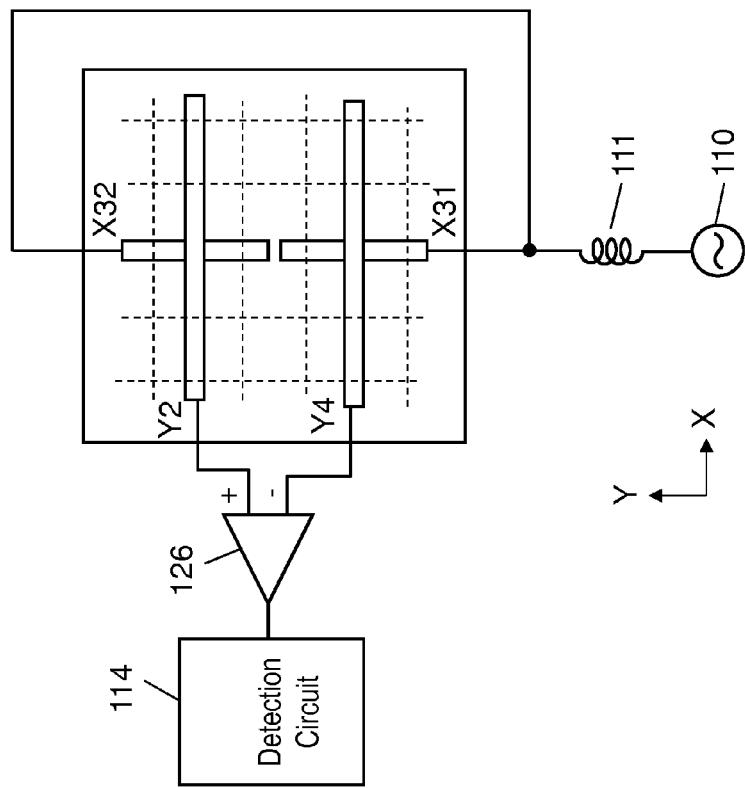
FIG. 15A is a schematic view of Modification 6 of the touch panel device according to Embodiment 2.

FIG. 15A is a schematic view of Modification 6 of the touch panel device according to Embodiment 2. In this modification, the AC signal is detected by a differential amplifier connected to two detection electrodes. In FIG. 15A, only the selected electrodes are indicated by a solid line, and the non-selected electrodes are indicated by a broken line.

FIG. 15A relates to the detection of Modification 2 illustrated in FIG. 10. Differential amplifier 126 has non-inverting input terminal (+), inverting input terminal (−), and an output terminal. The output terminal of differential amplifier 126 outputs the difference obtained by subtracting a signal input to the inverting input terminal from a signal input to the non-inverting input terminal. Drive electrode X3 is divided into drive electrode X31 and drive electrode X32. The detection signal from detection electrode Y2 crossing drive electrode X32 is connected to the non-inverting input terminal of differential amplifier 126. On the other hand, the detection signal from detection electrode Y4 crossing drive electrode X31 is connected to the inverting input terminal of differential amplifier 126. Differential amplifier 126 outputs the difference between the detection signal of detection electrode Y2 and the detection signal from detection electrode Y4 to detection circuit 114. This configuration eliminates noises, from, e.g., LCD 107, with the same phase which is picked up by detection electrode Y2 and detection electrode Y4, from LCD and the like 107, accordingly enhancing the detection sensitivity of touch panel device 2. In the circuit shown in FIG. 15A, the polarity of the detection signal of differential amplifier 126 indicates which one of detection electrodes Y2 and Y4 is touched. The voltage of the signal output from the detection electrode closer to object F decreases, as illustrated in FIG. 2E. Therefore, in the circuit illustrated in FIG. 15A, when the signal output from differential amplifier 126 is positive, and the absolute value of this signal is not less than a predetermined threshold value, detection circuit 114 can determine that the touch panel is touched on the position closer to detection electrode Y4. When the signal output from differential amplifier 126 is negative, and the absolute value of this signal is not less than a predetermined threshold value, detection circuit 114 can determine that the touch panel is touched on the position closer to detection electrode Y2. When the signal output from differential amplifier 126 has an absolute value less than a predetermined threshold value, detection circuit 114 can determine that neither the position close to detection electrode Y2 nor the position close to detection electrode Y4 is touched.

Modification 7

FIG. 15B is a schematic view of Modification 7 of the touch panel device according to Embodiment 2. FIG. 15B relates to the detection in Modification 4 illustrated in FIG. 13. Detection electrode Y2 is divided into two, detection electrode Y21 and detection electrode Y22. The detection signal from detection electrode Y22 crossing drive electrode X5 is connected to the non-inverting input terminal of differential amplifier 126. On the other hand, the detection signal from detection electrode Y21 not crossing drive electrode X5 is connected to the inverting input terminal of differential amplifier 126. Differential amplifier 126 supplies the difference between the detection signal of detection electrode Y22 and the detection signal of detection electrode Y21 to detection circuit 114. This configuration eliminates noise, from, e.g. LCD 107, with the same phase picked up by detection electrode Y21 and detection electrode Y22, accordingly enhancing the detection sensitivity of touch panel device 2. In FIG. 15B, the polarity of the detection signal of differential amplifier 126 indicates which one of detection electrodes Y21 and Y22 is touched. Therefore, similarly to the circuit illustrated in FIG. 15A, when the signal output from differential amplifier 126 is positive, and the absolute value of this signal is not less than a predetermined threshold value in the circuit illustrated in FIG. 15B, detection circuit 114 can determine that the position closer to detection electrode Y21 is touched. When the signal output from differential amplifier 126 is negative, and the absolute value of this signal is not less than a predetermined threshold value, detection circuit 114 can determine that the position closer to detection electrode Y22 is touched. When the signal output from differential amplifier 126 has an absolute value less than a predetermined threshold value, detection circuit 114 can determine that neither the position close to detection electrode Y21 nor the position close to detection electrode Y22 is touched.

In Modifications 6 and 7, even if the detection electrode connected to the inverting input terminal and the detection electrode connected to the non-inverting input terminal of differential amplifier 126 are reverse to those illustrated in FIGS. 15A and 15B, the detection electrode close to the touch position can be detected.

Exemplary Embodiment 3

Figure 16:
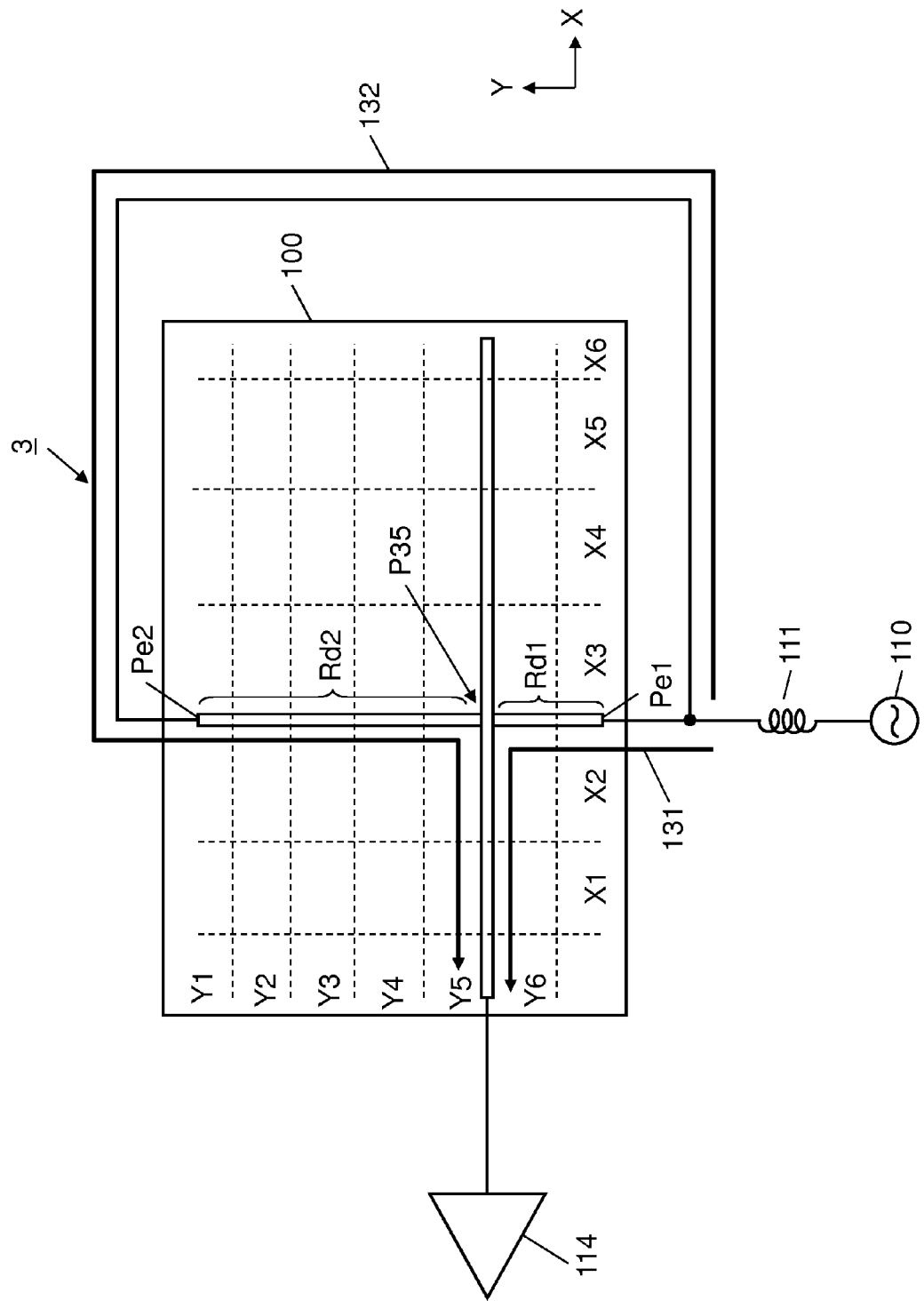
FIG. 16 is a schematic view of a touch panel device according to Exemplary Embodiment 3.
Figure 17:
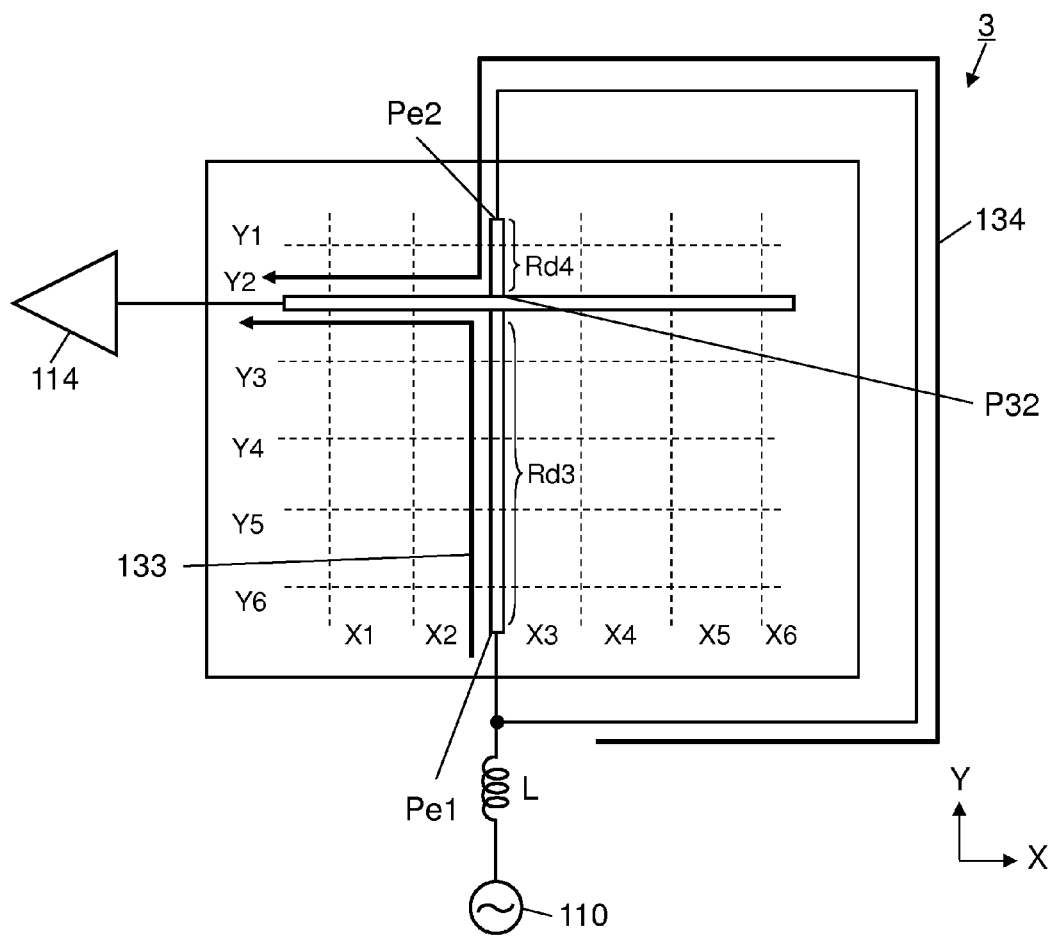
FIG. 17 is a schematic view of the touch panel device illustrated in FIG. 16.

FIGS. 16 and 17 are schematic views of touch panel device 3 according to Exemplary Embodiment 3. In FIG. 16, components identical to those of touch panel device 1 according to Embodiment 1 shown in FIG. 3 are denoted by the same reference numerals. In touch panel device 3 according to Embodiment 3, unlike the touch panel device according to Embodiment 1, the AC signal is input from both ends of each drive electrode.

In FIG. 16, single AC signal source 110 inputs the AC signal to one end Pe1 of drive electrode X3 and the other end Pe2 while drive electrode X3 and detection electrode Y5 are selected (i.e., while the touch on a crossing point P35 is detected). In this case, both ends (end Pe1 and end Pe2) of drive electrode X3 are electrically connected to each other. Specifically, one terminal of the drive electrode switch electrically connected to drive electrode X3 is electrically connected to two terminals of drive electrode X3 in the direction of the Y-axis. In this case, a path through which the AC signal flows from AC signal source 110 to detection circuit 114 includes path 131 and path 132 illustrated in FIG. 16. Path 131 reaches detection circuit 114 via crossing point P35 and end Pe1 of drive electrode X3. Path 132 reaches detection circuit 114 via crossing point P35 and end Pe2 of drive electrode X3. The length of drive electrode X3 included in path 131 is shorter than the length of drive electrode X3 included in path 132. Therefore, resistance Rd1 of drive electrode X3 included in path 131 is smaller than resistance Rd2 of drive electrode X3 included in path 132, accordingly, allowing a larger AC signal current to flow through path 131.

In FIG. 17, single AC signal source 110 inputs the AC signal from one end Pe1 of drive electrode X3 and the other end Pe2 while drive electrode X3 and detection electrode Y2 are selected (while the touch on a crossing point P32 is detected). In this case, both ends (end Pe1 and end Pe2) of drive electrode X3 are electrically connected to each other. In this case, a path through which the AC signal current flows from AC signal source 110 to detection circuit 114 includes path 133 and path 134. Path 133 reaches detection circuit 114 via crossing point P32 and end Pe1 of drive electrode X3. Path 134 reaches detection circuit 114 via crossing point P32 and end Pe2 of drive electrode X3. The length of drive electrode X3 included in path 134 is shorter than the length of drive electrode X3 included in path 133. Therefore, resistance Rd4 of drive electrode X3 included in path 134 is smaller than resistance Rd3 of drive electrode X3 included in path 13, accordingly allowing a larger AC signal current to flow through path 134.

When both ends of one drive electrode are electrically connected each other, and the AC signal voltage is applied from both ends, as described above, a larger AC signal current flows through the shorter path (the path with a smaller resistance) from AC signal source 110 to detection circuit 114. This configuration allows the effective resistance of the transmission path to be smaller than that in the case where the AC signal voltage is applied only from one end Pe1 of the drive electrode. This increases cutoff frequency fc of the transmission path. Similarly, since the effective resistance of the transmission path can be reduced, the transmission loss of the AC signal can be reduced, thereby providing touch panel device 3 with low power consumption.

In touch panel device 3 illustrated in FIGS. 16 and 17, the AC signal is input from both ends of one drive electrode. When the detection signal is output from both ends of one detection electrode based on the same idea, the resistance of the detection electrode can be reduced, so that cutoff frequency fc can be increased.

Figure 18:
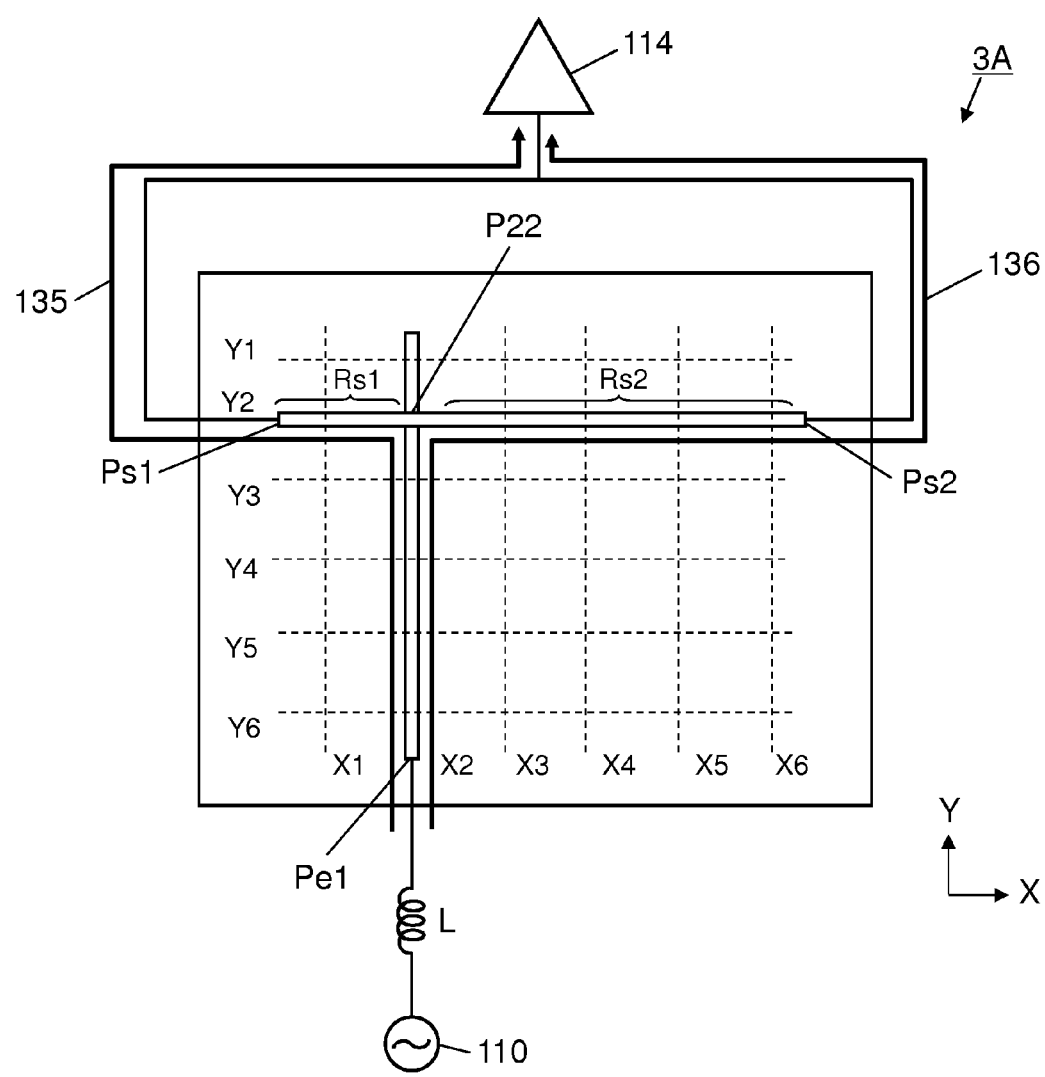
FIG. 18 is a schematic view of another touch panel device according to Embodiment 3.
Figure 19:
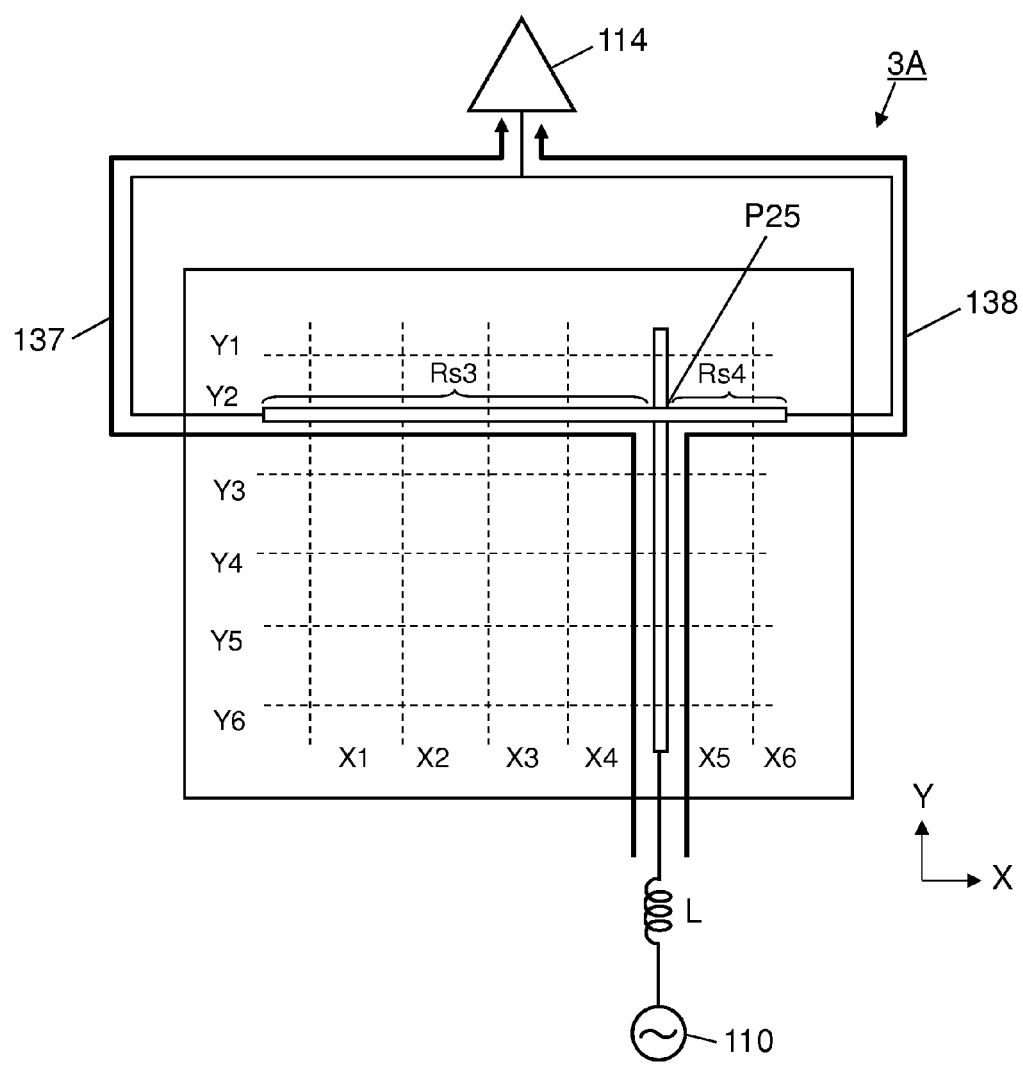
FIG. 19 is a schematic view of the touch panel device illustrated in FIG. 18.

FIGS. 18 and 19 are schematic views of another touch panel device 3A according to Embodiment 3. In FIGS. 18 and 19, components identical to those of touch panel device 1 according to Embodiment 1 shown in FIG. 3 are denoted by the same reference numerals. In touch panel device 3A illustrated in FIG. 18, the AC signal is input from AC signal source 110 to drive electrode X2, and one end Ps1 and other end Ps2 of detection electrode Y2 are connected to single detection circuit 114 while drive electrode X2 and detection electrode Y2 are selected (while the touch on a crossing point P22 is detected). In this case, both ends (end Ps1 and end Ps2) of detection electrode Y2 are electrically connected to each other. Specifically, one terminal of detection electrode switch electrically connected to detection electrode Y2 is electrically connected to two ends of detection electrode Y2 extending in a direction of the X-axis. In this case, a path through which the AC signal current flows from AC signal source 110 to detection circuit 114 includes path 135 and path 136. Path 135 reaches detection circuit 114 via AC signal source 110, crossing point P22, and end Ps1. Path 136 reaches detection circuit 114 via AC signal source 110, crossing point P22, and end Ps2. The length of detection electrode Y2 included in path 135 is shorter than the length of detection electrode Y2 included in path 136. Therefore, resistance Rs1 of detection electrode Y2 included in path 135 is smaller than resistance Rs2 of detection electrode Y2 included in path 136, accordingly allowing a larger AC signal current to flow through path 135.

In FIG. 19, the AC signal is input from AC signal source 110 to drive electrode X5, and one end Ps1 and other end Ps2 of detection electrode Y2 are connected to single detection circuit 114 while drive electrode X5 and detection electrode Y2 are selected (while the touch on a crossing point P25 is detected). In this case, both ends (end Ps1 and end Ps2) of detection electrode Y2 are electrically connected to each other. In this case, a path through which the AC signal current flows from AC signal source 110 to detection circuit 114 includes path 137 and path 138. Path 137 reaches detection circuit 114 via AC signal source 110, crossing point P25, and end Ps1. Path 138 reaches detection circuit 114 via AC signal source 110, crossing point P25, and end Ps2. The length of detection electrode Y2 included in path 138 is shorter than the length of detection electrode Y2 included in path 137. Therefore, resistance Rs4 of detection electrode Y2 included in path 138 is smaller than resistance Rs3 of detection electrode Y2 included in path 137, accordingly allowing a larger AC signal current to flow through path 138.

When both ends of one detection electrode are electrically connected to each other, and the AC signal is output from the both ends, as described above, the AC signal current flows through the shortest path (the path with smaller resistance) from the AC signal source to the detection circuit. This configuration allows the effective resistance of the transmission path to be smaller than that in the case where the AC signal current is extracted only from one end Ps1 of the detection electrode, hence increasing cutoff frequency fc of the transmission path. Similarly, since the effective resistance of the transmission path can be reduced, the transmission loss of the AC signal can be reduced, hence providing touch panel device 3A with low power consumption.

Exemplary Embodiment 4

Figure 20A:
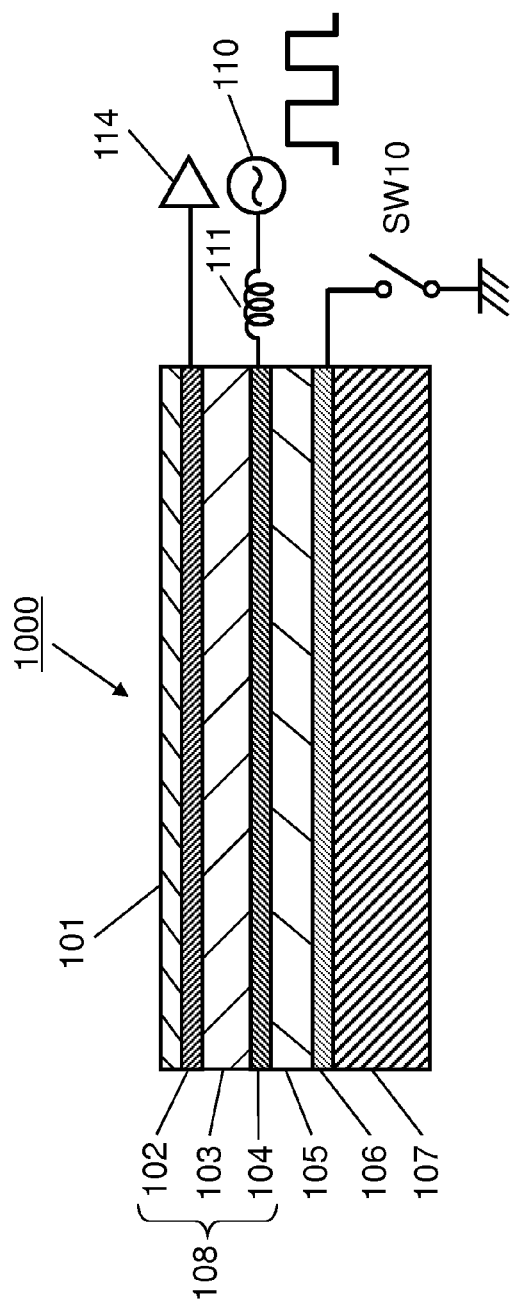
FIG. 20A is a schematic cross-sectional view of a touch panel device according to exemplary Embodiment 4.
Figure 20B:
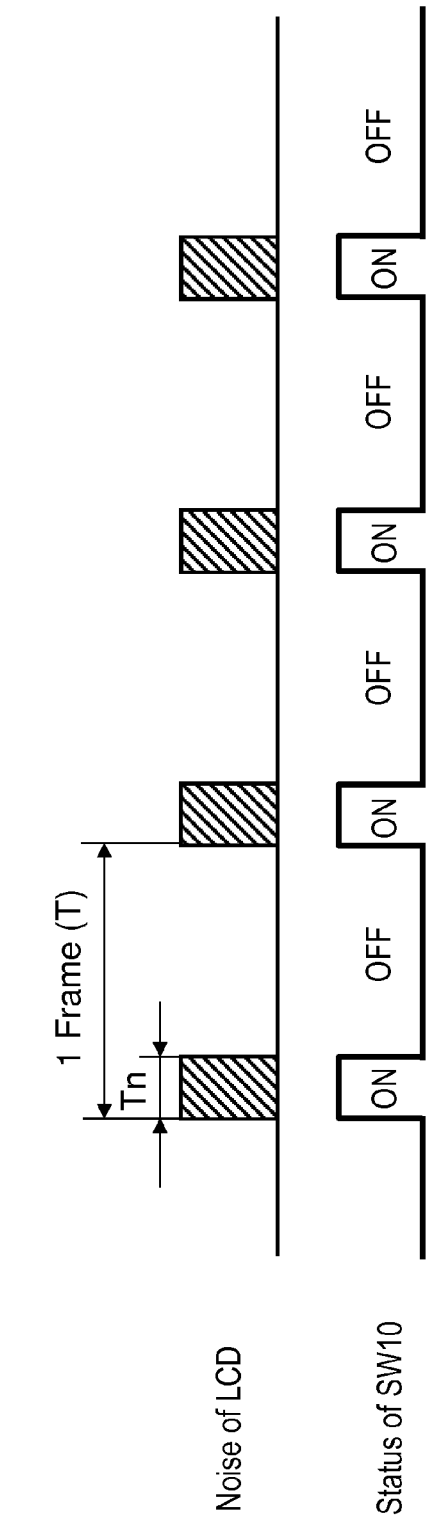
FIG. 20B illustrates a waveform of a signal of the touch panel device according to Embodiment 4.

FIG. 20A is a schematic cross-sectional view of touch panel device 1000 according to Exemplary Embodiment 4. FIG. 20B illustrates a waveform of a signal of touch panel device 1000 according to Embodiment 4. In FIG. 20A, components identical to those of touch panel device 1 according to Embodiment 1 shown in FIG. 1 are dented by the same reference numerals. The touch panel device according to Embodiment 4 efficiently shields noises generated from LCD 107.

As illustrated in FIG. 20A, touch panel 100 includes shield layer 106 provided between LCD 107 and electrode layer 108. In the case that shield layer 106 disposed close to electrode layer 108 generates a stray capacitance (stray capacitances Cs3 and Cs6 shown in FIG. 5A) between shield layer 106 and each of drive electrode 104 and detection electrode 102, hence reducing cutoff frequency fc in the transmission path. Touch panel device 1000 according to Embodiment 4 further includes grounding switch SW10 connected between shield layer 106 and the ground and controlled by control circuit 115. The stray capacitance can be reduced while shielding noises from LCD 107 under the control of grounding switch SW10.

LCD 107 periodically inverts the polarity of the drive signal of LCD 107 in order to prevent damages on LCD 107. Spike noise is generated during predetermined period Tn (referred to as noise period Tn below) upon the polarity inversion. Noise period Tn is a predetermined period in image display frame period T (e.g., 1/60 Hz) displaying an image. The noise picked up on drive electrode 104 and detection electrode 102 of touch panel 100 causes erroneous detection. LCD 107 generates larger noise in noise period Tn than the noise in any other period.

As illustrated in FIG. 20B, control circuit 115 controls grounding switch SW10 such that shield layer 106 is connected to the ground during noise period Tn while shield layer 106 is disconnected from the ground during some or all periods other than noise period Tn.

This control can prevent the noise generated by LCD 107 from entering into drive electrode 104 and detection electrode 102, and can reduce the stray capacitance between shield layer 106 and each of drive electrode 104 and detection electrode 102.

During noise period Tn when shield layer 106 is connected to the ground under the control of grounding switch SW10, the stray capacitance increases to reduce the cutoff frequency. Therefore, control circuit 115 may control AC signal source 110 to lower the frequency of the AC signal to be not higher than the cutoff frequency only during noise period Tn, i.e., to lower the frequency than the frequency during the period other than noise period Tn.

Figure 20C:
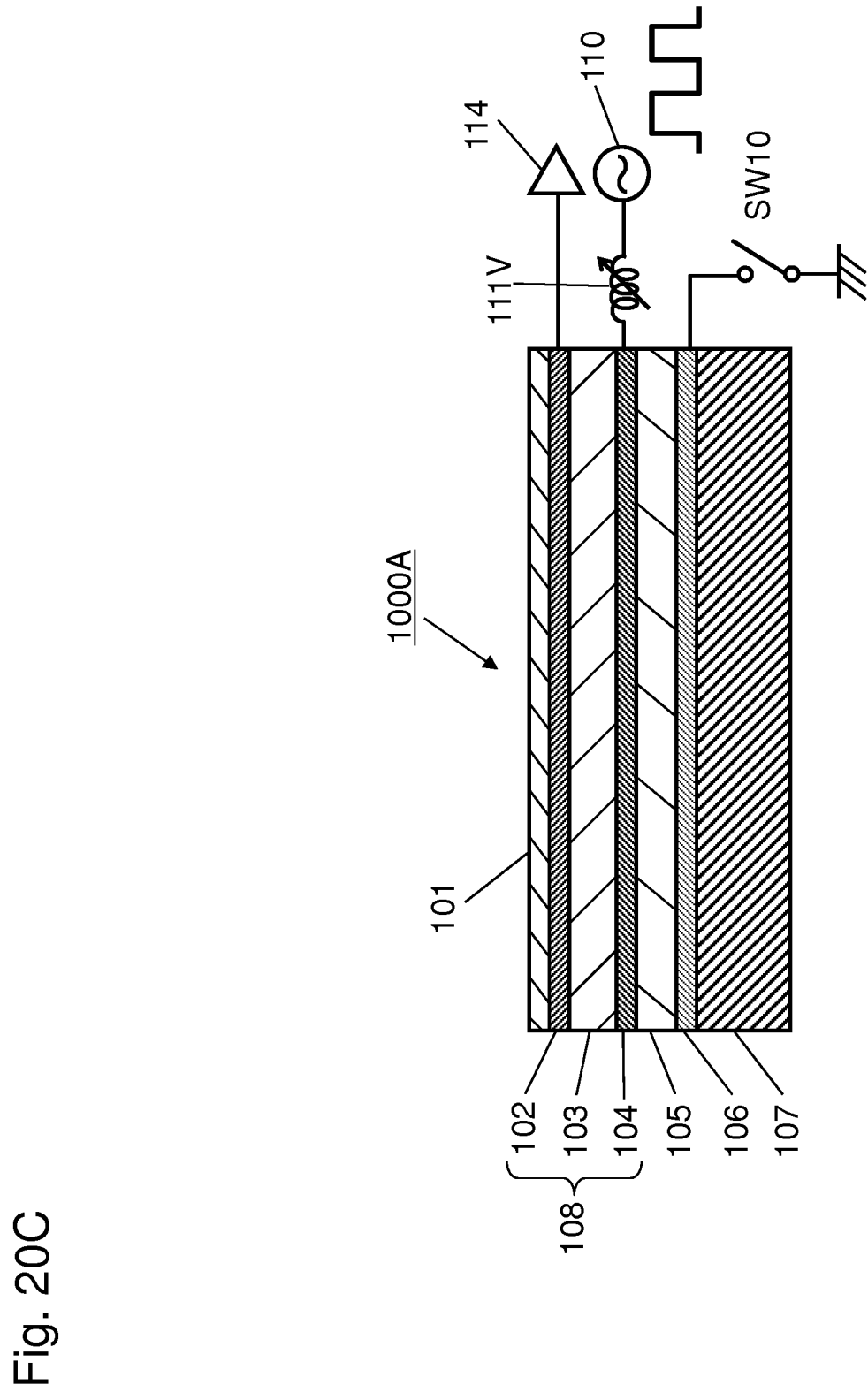
FIG. 20C is a schematic cross-sectional view of another touch panel device according to Embodiment 4.

FIG. 20C is a schematic cross-sectional view of another touch panel device 1000A according to Embodiment 4. In FIG. 20C, components identical to those of touch panel device 1000 shown in FIG. 20A are denoted by the same reference numerals. Touch panel device 1000A illustrated in FIG. 20C includes variable inductive element 111V having a variable inductance instead of inductive element 111. In touch panel device 1000A, control circuit 115 switches the inductance of variable inductive element 111V to lowering the resonance frequency when lowering the frequency of the AC signal. Specifically, control circuit 115 increases the inductance of variable inductive element 111V during noise period Tn to be the inductance of variable inductive element 111V more than the inductance during the period other than noise period Tn. This operation allows the resonance frequency to match the frequency of the AC signal even when the stray capacitance increases due to the status of grounding switch SW10, thereby providing touch panel device 1000A with high sensitivity. Variable inductive element 111V may be implemented by, e.g. plural inductive elements selected by control circuit 115. Alternatively, variable inductive element 111V may includes plural inductive elements connected in series to each other and plural switches each connected in parallel to respective one of the inductive elements.

Exemplary Embodiment 5

Figure 21:
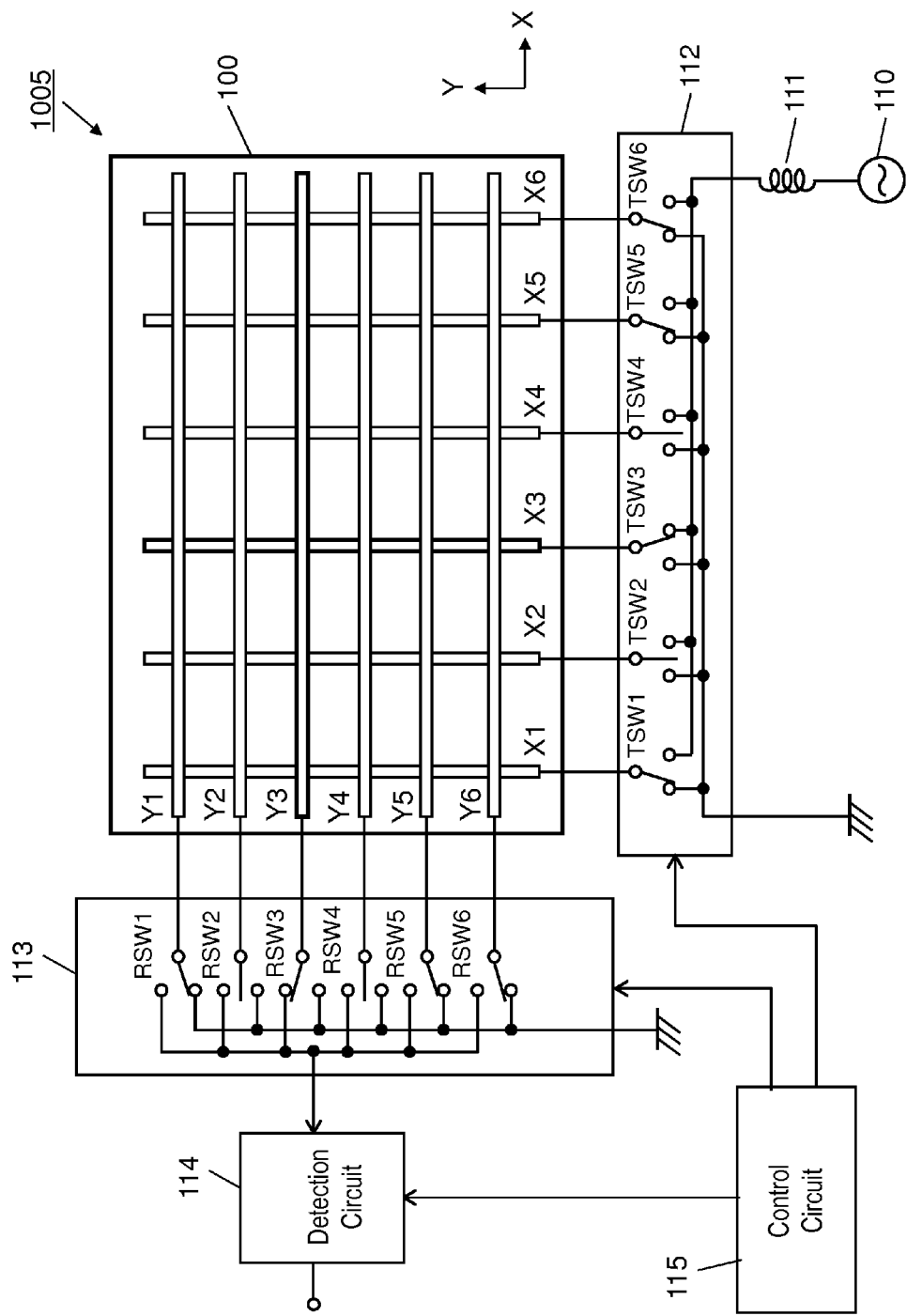
FIG. 21 is a schematic of a touch panel device according to Exemplary Embodiment 5.

FIG. 21 is a schematic view of touch panel device 1005 according to Exemplary Embodiment 5. In FIG. 21, components identical to those of touch panel device 1 shown in FIG. 3 according to Embodiment 1 are denoted by the same reference numerals. Touch panel device 1005 according to Embodiment 5 efficiently shields noises generated from, e.g. LCD 107 (FIG. 1).

In touch panel device 1 illustrated in FIG. 3 according to Embodiment 1, the electrode (the drive electrode and the detection electrode) of touch panel 100 which is not selected is connected to the ground to prevent noises generated by LCD 107 from affecting the selected electrode. However, while the electrodes around the selected electrode are connected to the ground, stray capacitances Cs1, Cs2, Cs4, and Cs5 (FIG. 5A) between the selected electrode and the surrounding electrodes increase, hence decreases cutoff frequency fc on the transmission path from AC signal source 110 to detection circuit 114. As a result, the loss of the AC signal input from AC signal source 110 increases, and detection sensitivity of touch panel 100 to deteriorate.

In touch panel device 1005 according to Embodiment 5, control circuit 115 controls drive electrode switch 112 and detection electrode switch 113 such that only the electrode which is adjacent to the selected electrode and which has the largest stray capacitance with the selected electrode is disconnected from the ground, AC signal source 110, and detection circuit 114 to be open, and the electrodes other than the selected electrode and the adjacent electrode are connected to the ground. For example, as illustrated in FIG. 21, while certain drive electrode X3 and certain detection electrode Y3 are selected, control circuit 115 controls drive electrode switch 112 and detection electrode switch 113 such that drive electrodes X2 and X4 which are adjacent to certain drive electrode X3 and detection electrodes Y2 and Y4 which are adjacent to certain detection electrode Y3 are disconnected from the ground to open, and drive electrodes X1, X5, and X6 and detection electrodes Y1, Y5, and Y6 are connected to the ground.

This control can prevent cutoff frequency fc from decreasing, as well as can shield the noise from LCD 107, thereby providing touch panel device 1005 with high detection sensitivity. Since the electrode close to the selected electrode is disconnected from the ground, the intensity of the electromagnetic field emitted from the selected electrode increases, hence allowing the object located far away to be detected.

Not both the drive electrode and detection electrode are necessarily disconnected from the ground. The disconnected electrode may be at least one of the drive electrode and the detection electrode. Similarly to touch panel devices 1000 and 1000A illustrated in FIGS. 20A and 20C according to Embodiment 4, control circuit 115 may connect the electrodes other than the selected electrode to the ground during noise period Tn, and may disconnect the electrodes adjacent to the selected electrode from the ground during some or all periods other than noise period Tn. The electrode disconnected from the ground may not necessarily be the adjacent electrodes. The electrode apart from the selected electrode may be disconnected from the ground.

Exemplary Embodiment 6

Touch panel device 6 according to Exemplary Embodiment 6 will be described with reference to FIGS. 22 to 24B. The touch panel devices according to Embodiments 1 to 5 are mutual-capacitive type touch panel devices. On the other hand, the touch panel device according to Embodiment 6 is a self-capacitive type touch panel device.

An operation of the self-capacitive type touch panel device will be described below. The mutual-capacitive type detects a change in mutual capacitance on a crossing point of a drive electrode and a detection electrode which are arranged in a grid form. In the self-capacitive type, one electrode functions as the drive electrode and the detection electrode, and the change in capacitance (self-capacitance) between the electrode and the ground is detected.

Figure 22:
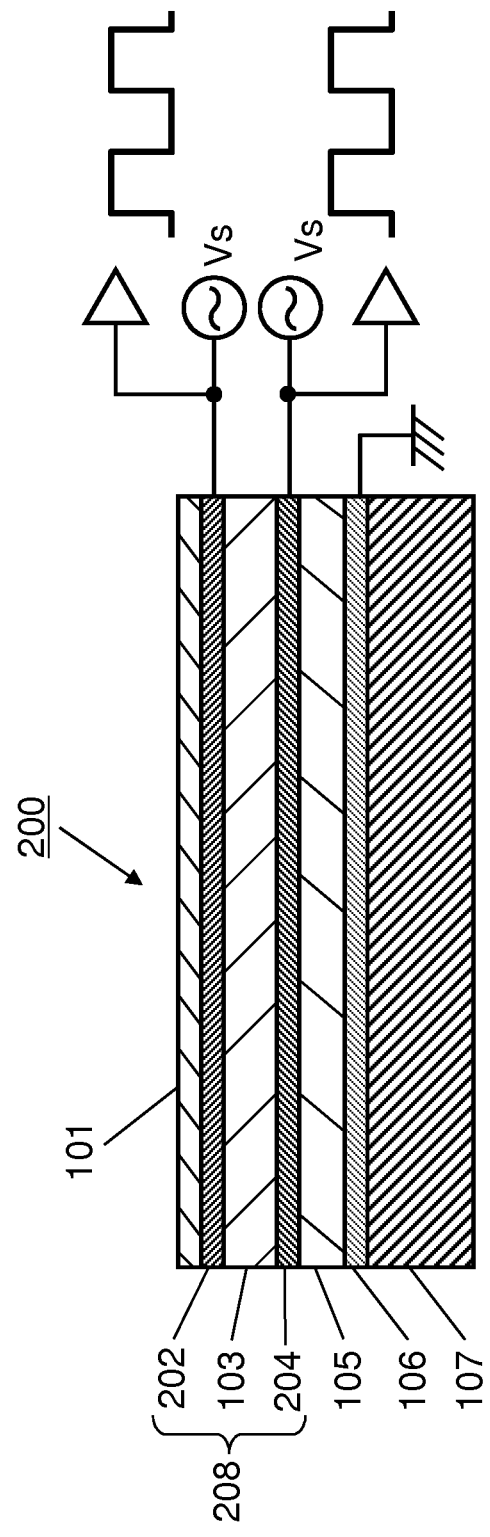
FIG. 22 is a schematic cross-sectional view of a touch panel device according to Exemplary Embodiment 6.

FIG. 22 is a schematic cross-sectional view of touch panel 200 mounted on touch panel device 6 according to Embodiment 6. In FIG. 22, components identical to those of touch panel 100 according to Embodiment 1 shown in FIG. 1 are denoted by the same reference numerals. Touch panel 200 is a self-capacitive type touch panel, and has almost the same structure as mutual-capacitive type touch panel 100. As illustrated in FIG. 22, touch panel 200 includes glass layer 103 functioning as an insulation layer, and Y-electrode 202 and X-electrode 204 which faces each other across glass layer 103. Glass layer 103, Y-electrode 202, and X-electrode 204 constitute electrode layer 208. Y-electrodes 202 and X-electrodes 204 are arranged like a grid to extend perpendicularly to each other. Drive voltage Vs serving as an AC signal is applied to each electrode from an AC signal source, and the change in self-capacitance of each electrode is detected as the change in the AC signal voltage. Y-electrode 202 is located closer to protection layer 101 than X-electrode 204 is. X-electrode 204 and Y-electrode 202 operate with the same principle. Therefore, Y-electrode 202 closer to protection layer 101, i.e., closer to the surface, will mainly be described below.

Figure 23A:
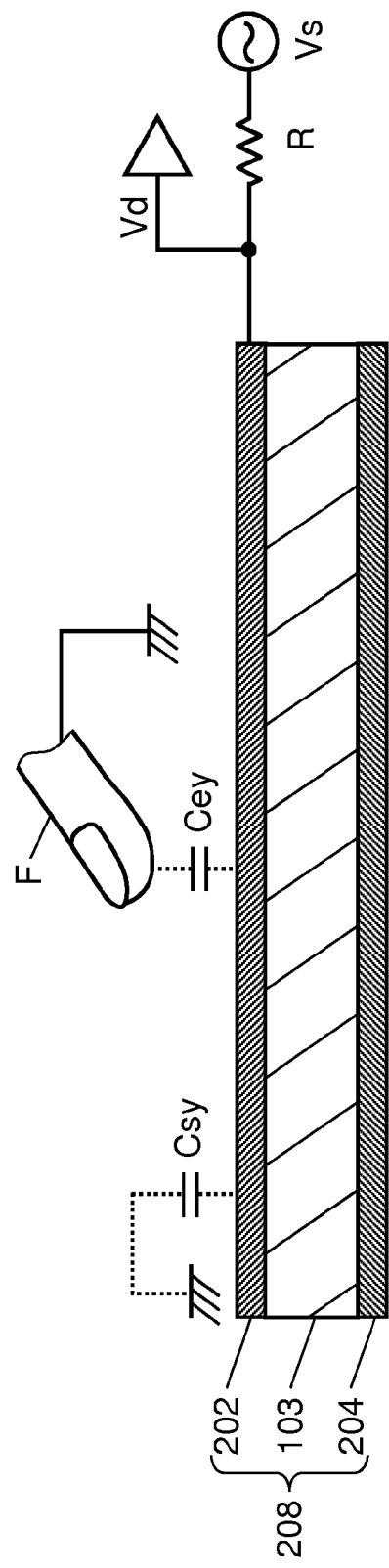
FIG. 23A is a schematic cross-sectional view of a self-capacitive type touch panel device for describing an operation of the self-capacitive type touch panel device.
Figure 23C:
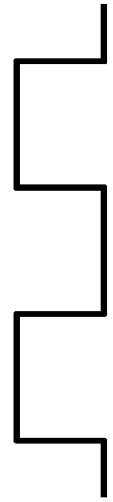
FIG. 23C illustrates a voltage waveform of an electrode of the touch panel device illustrated in FIG. 23A.
Figure 23D:
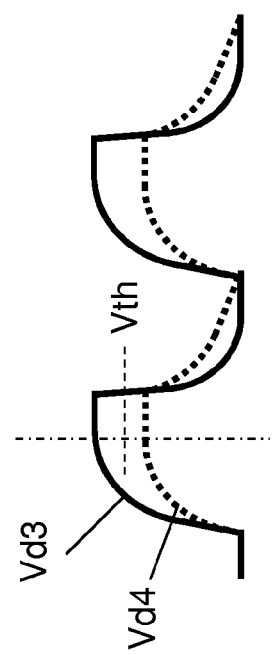
FIG. 23D illustrates a voltage waveform of an electrode of the touch panel device illustrated in FIG. 23A.
Figure 23B:
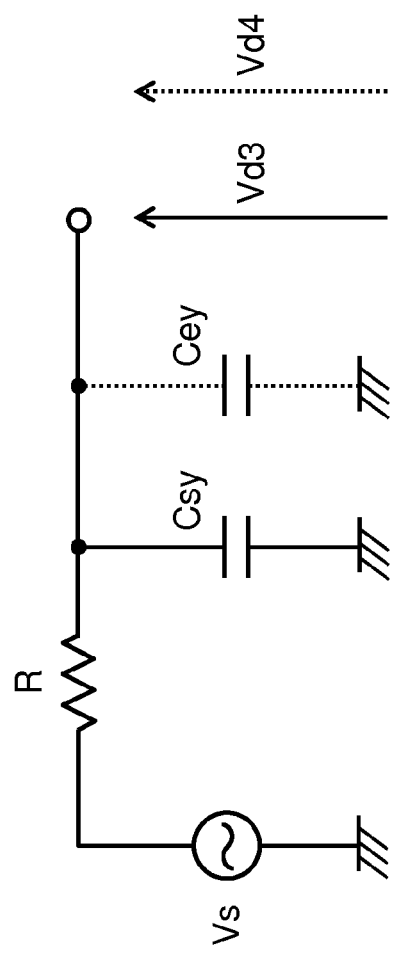
FIG. 23B is an equivalent circuit diagram of the touch panel device illustrated in FIG. 23A.

FIGS. 23A to 23D are schematic views of self-capacitive type touch panel device 6 for describing an operation of self-capacitive type touch panel device 6. FIG. 23A is a schematic cross-sectional view of electrode layer 208 of touch panel 200 of touch panel device 6. FIG. 23B is an equivalent circuit diagram of touch panel 200 illustrated in FIG. 23A. FIG. 23C illustrates a waveform of drive voltage Vs applied to Y-electrode 202. FIG. 23D illustrates a waveform of detection voltage Vd3 when object F, such as finger of an operator, does not touch the touch panel and a waveform of detection voltage Vd4 provided when object F does not touch it.

Stray capacitance Csy exists between Y-electrode 202 and the ground. When object F touches a surface of touch panel 200, capacitance Cey is generated between Y-electrode 202 and object F. Since capacitance Cey releases some charges stored in stray capacitance Csy to the ground via the finger, detection voltage Vd4 decreases to be smaller than detection voltage Vd3 in the case where object F does not touch it. Therefore, the touch on touch panel 200 can be detected by comparing detection voltage Vd with predetermined threshold voltage Vth. X-electrode 204 operates similarly to Y-electrode 202.

Figure 24A:
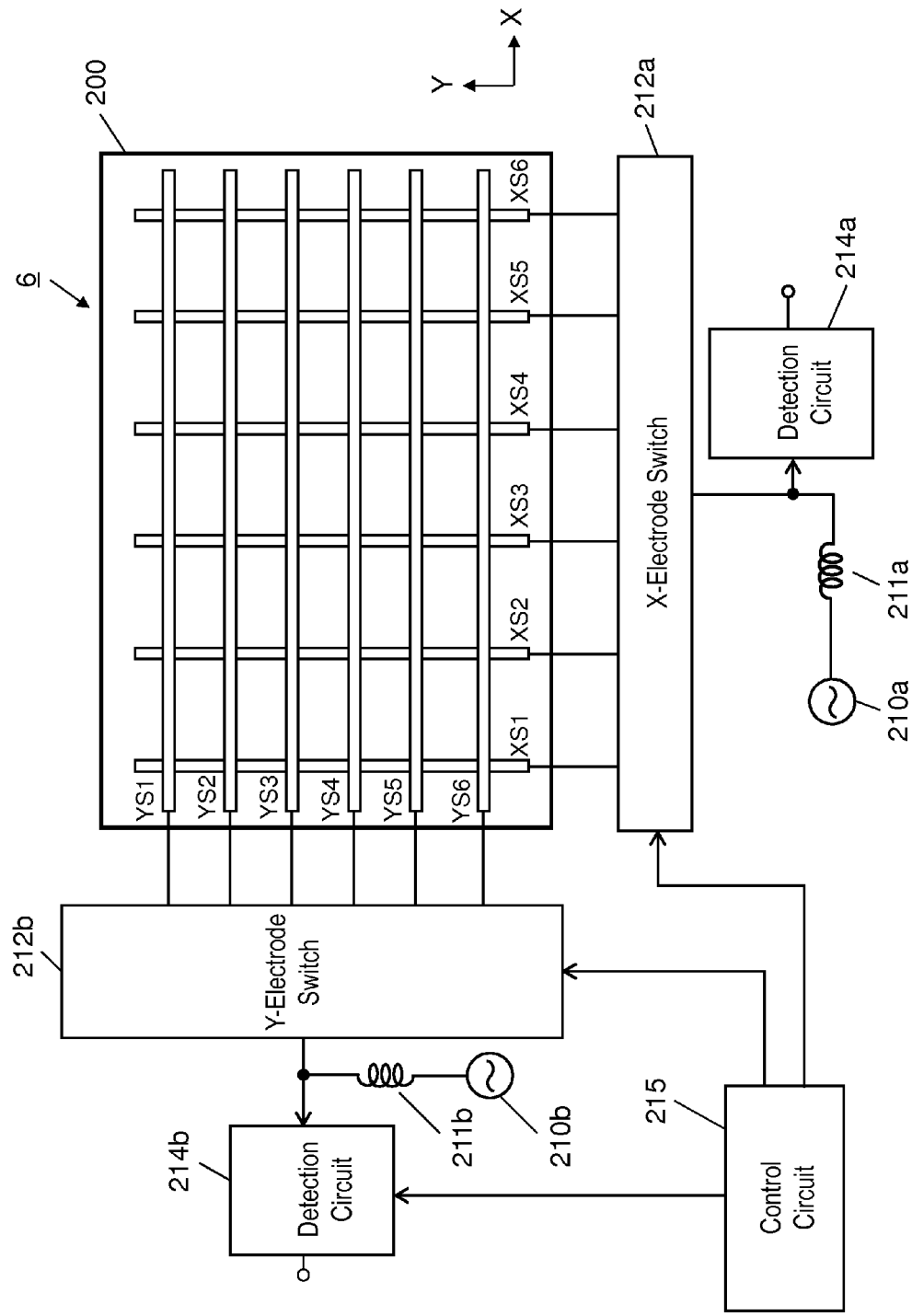
FIG. 24A is a schematic view of a touch panel device according to Embodiment 6.

FIG. 24A is a schematic view of touch panel device 6 according to Embodiment 6. As illustrated in FIG. 24A, touch panel device 6 includes touch panel 200, AC signal sources 210a and 210b, X-electrode switch 212a, Y-electrode switch 212b, detection circuits 214a and 214b, and control circuit 215.

In FIG. 24A, a longitudinal direction of touch panel 200 is defined as an X axis, while a direction orthogonal to the X axis is defined as a Y axis. Touch panel 200 includes X-electrodes 204 (first electrodes) and Y-electrodes 202 (second electrodes). X-electrodes 204 are arranged at almost regular intervals in a direction of the X-axis (first direction), and elongate in a direction of the Y-axis (second direction). Y-electrodes 202 are arranged at almost regular intervals in a direction of the Y-axis, and elongate in a direction of the X-axis. For simplifying the description, it is supposed that X-electrode 204 includes six X-electrodes XS1 to XS6, while Y-electrode 202 includes six Y-electrodes YS1 to YS6 according to this embodiment. X-electrodes XS1 to XS6 extend perpendicularly to Y-electrodes YS1 to YS6, and face Y-electrodes YS1 to YS6 across glass layer 105 to form a grid shape.

AC signal source 210a is connected to X-electrode switch 212a (first electrode switch) and detection circuit 214a via inductive element 211a. X-electrode switch 212a is connected to X-electrodes XS1 to XS6. AC signal source 210b is connected to Y-electrode switch 212b (second electrode switch) and detection circuit 214b via inductive element 211b. Y-electrode switch 212b is connected to Y-electrodes YS1 to YS6.

X-electrode switch 212a and Y-electrode switch 212b are controlled by control circuit 215. The structure and operation of X-electrode switch 212a and Y-electrode switch 212b are the same as those of drive electrode switch 112 and detection electrode switch 113 according to Embodiment 1.

In touch panel device 6, stray capacitance Csx exists between the ground and each of X-electrodes XS1 to XS6. Resonance frequency fresx of a series resonance circuit on a transmission path from AC signal source 210a to detection circuit 214a is determined by inductance La of inductive element 211a and stray capacitance Csx, and is represented by Formula (3).

$$fresx = \frac{1}{2\pi\sqrt{La \times Csx}} \quad (3)$$

Therefore, the AC signal voltage with frequency fresx applied from AC signal source 210a allows a resonance current to flow, thereby enhancing the detection sensitivity of touch panel device 6, similarly to touch panel device 1 according to Embodiment 1.

Cutoff frequency fcx on the transmission path from AC signal source 210a to detection circuit 214a is proportional to the reciprocal of time constant (Rx×Csx), the product of stray capacitance Csx and resistance Rx of each of X-electrodes XS1 to XS6. Cutoff frequency fcx is represented by Formula (4).

$$fcx \propto \frac{1}{Rx \times Csx} \quad (4)$$

In order to increase cutoff frequency fcx on the transmission path including X-electrodes XS1 to XS6, at least one of resistance Rx and stray capacitance Csx decreases.

Similarly, stray capacitance Csy exists between the ground and each of Y-electrodes YS1 to YS6. Resonance frequency fresy of a series resonance circuit on a transmission path from AC signal source 210b to detection circuit 214b is determined by inductance Lb of inductive element 211b and stray capacitance Csy, and is represented by Formula (5).

$$fresy = \frac{1}{2\pi\sqrt{Lb \times Csy}} \quad (5)$$

The AC signal voltage with frequency fresy applied from AC signal source 210b allows a resonance current to flow, thereby enhancing the detection sensitivity of touch panel device 6, similarly to touch panel device 1 according to Embodiment 1.

Cutoff frequency fcy on the transmission path from AC signal source 210b to detection circuit 214b is proportional to the reciprocal of time constant (Ry×Csy), the product of stray capacitance Csy and resistance Ry of each of Y-electrodes YS1 to YS6. Specifically, cutoff frequency fcy is represented by Formula (6).

$$fcy \propto \frac{1}{Ry \times Csy} \quad (6)$$

In order to increase cutoff frequency fcy on the transmission path including Y-electrodes YS1 to YS6, at least one of resistance Ry and stray capacitance Csy decreases.

As described above, according to Embodiment 6, even in self-capacitive type touch panel device 6, the resonance circuit is formed by connecting the inductive element between the AC signal source and the electrodes, and the resonance current flows through the electrodes, and increases the intensity of the electric field around the electrodes increased, hence enhancing the detection sensitivity.

The self-capacitive type touch panel device performs a detection operation different from that of the mutual-capacitive type touch panel device as described above. However, the determining of the resonance frequency of the transmission path, the determining of the cutoff frequency, and the influence of the noise from the LCD are the same as those of the mutual-capacitive type touch panel device. Therefore, the technique of the touch panel devices according to Embodiments 1 to 5 is similarly applicable to touch panel device 6 according to Embodiment 6 with the same effects.

Figure 24B:
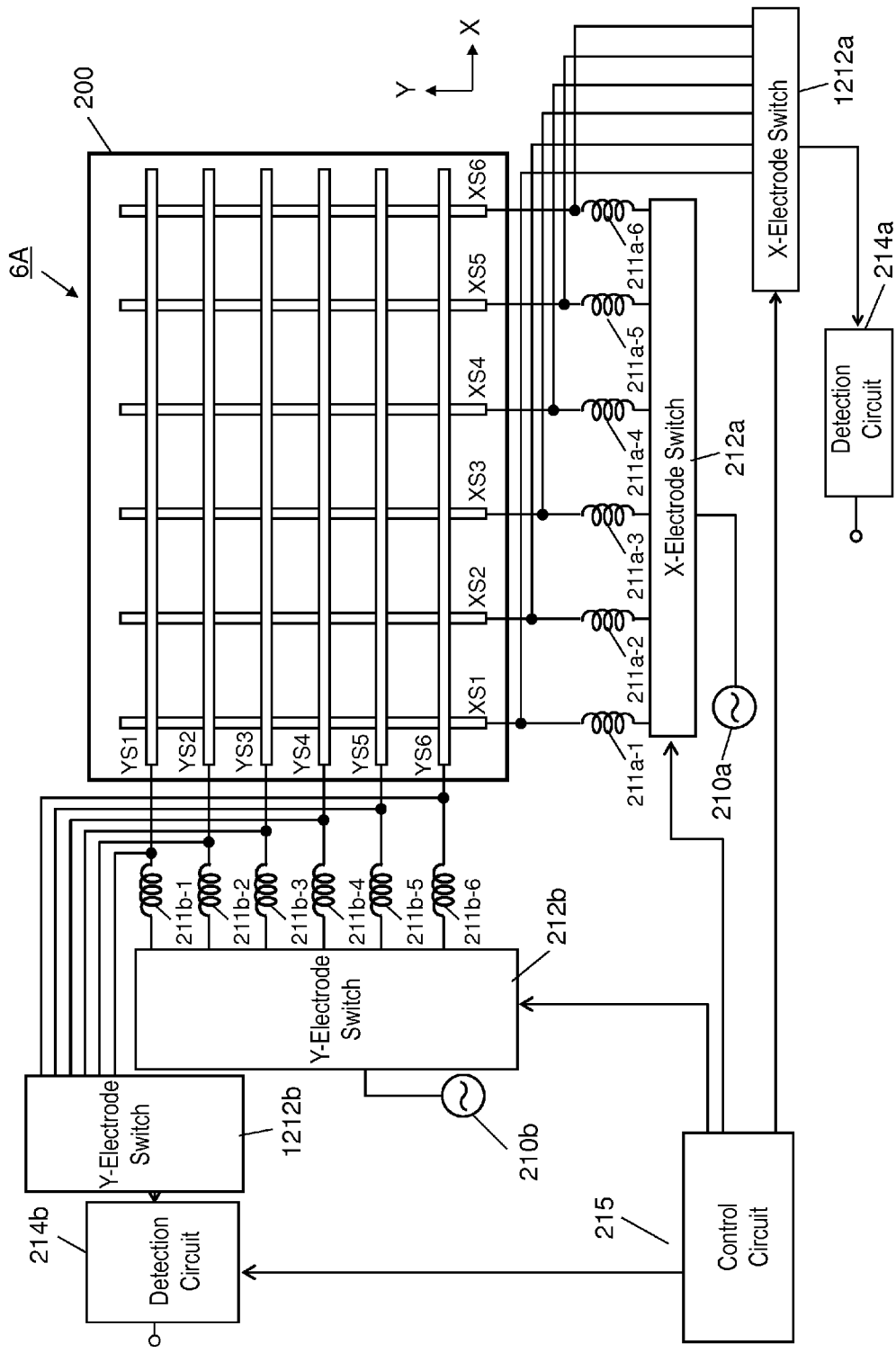
FIG. 24B is a schematic view of another touch panel device according to Embodiment 6.

FIG. 24B is a schematic view of another touch panel device 6A according to Embodiment 6. In FIG. 24B, components identical to those of touch panel device 6 in FIG. 24A are denoted by the same reference numerals. Touch panel device 6A includes inductive elements 211a-1 to 211a-6 and 211b-1 to 211b-6, instead of inductive elements 211a and 211b of touch panel device 6 illustrated in FIG. 24A. Touch panel device 6A further includes X-electrode switch 1212a and Y-electrode switch 1212b. Similarly to touch panel device 1004 illustrated in FIG. 8 according to Embodiment 1, inductive elements 211a-1 to 211a-6 are connected in series between X-electrode switch 1212a and X-electrodes XS1 to XS6 to which the AC signal is input, respectively. Inductive elements 211b-1 to 211b-6 are connected in series between Y-electrode switch 1212b and Y-electrodes YS1 to YS6 to which the AC signal is input, respectively. X-electrode switch 1212a sequentially connects X-electrodes XS1 to XS6 to detection circuit 214a similarly to X-electrode switch 212a, while Y-electrode switch 1212b sequentially connects Y-electrodes YS1 to YS6 to detection circuit 214b, similarly to Y-electrode switch 212b. More specifically, when X-electrode switch 212a connects inductive element 211a-m ($1 \leq m \leq 6$) to AC signal source 210a, X-electrode switch 1212a connects X-electrode XSm to detection circuit 214a. When Y-electrode switch 212b connects inductive element 211b-n ($1 \leq n \leq 6$) to AC signal source 210b, Y-electrode switch 1212b connects Y-electrode YSn to detection circuit 214b. This operation constitutes the circuit identical to that of touch panel device 6 illustrated in FIG. 24A for X-electrodes XS1 to XS6 and Y-electrodes YS1 to YS6, hence detecting the position on touch panel 200 touched by object F accurately with high sensitivity.

Exemplary Embodiment 7

Figure 25A:
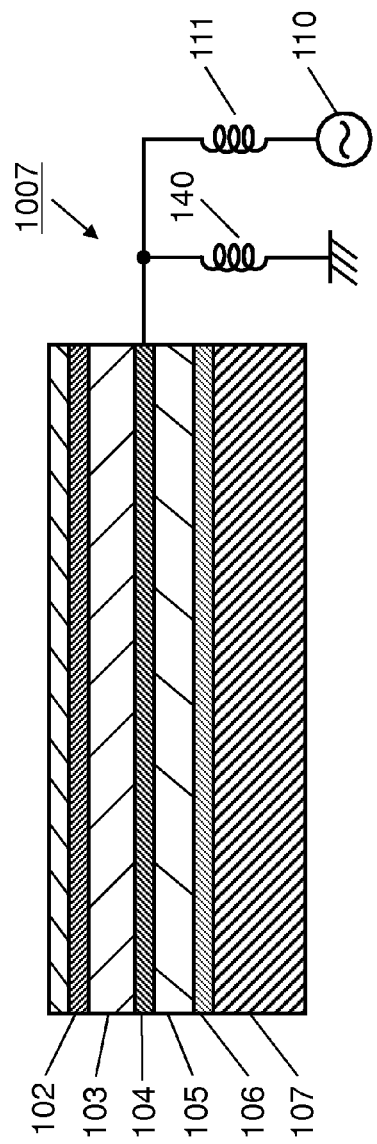
FIG. 25A is a schematic cross-sectional view of a touch panel device according to Exemplary Embodiment 7.

FIG. 25A is a schematic cross-sectional view of touch panel device 1007 according to Exemplary Embodiment 7. In FIG. 25A, components identical to those of touch panel device 1 according to Embodiment 1 shown in FIG. 1 are denoted by the same reference numerals. Touch panel device 1007 illustrated in FIG. 25A further includes inductive element 140 connected in series between a ground and an input port of drive electrode 104 of touch panel device 1 according to Embodiment 1. Specifically, inductive element 140 is connected in series between the ground and one end of drive electrode 104 electrically connected to inductive element 111. The inductance of inductive element 140 is selected to allow inductive element 140 and stray capacitance Csd of drive electrode 104 to resonate at the frequency of the AC signal from AC signal source 110, accordingly reducing stray capacitance Csd apparently. This increases the cutoff frequency of the drive electrode, accordingly allowing the inductance of inductive element 111 to be reduced. This reduces the resistance loss on inductive element 111, hence enhancing the sensitivity of touch panel device 1007.

Figure 25B:
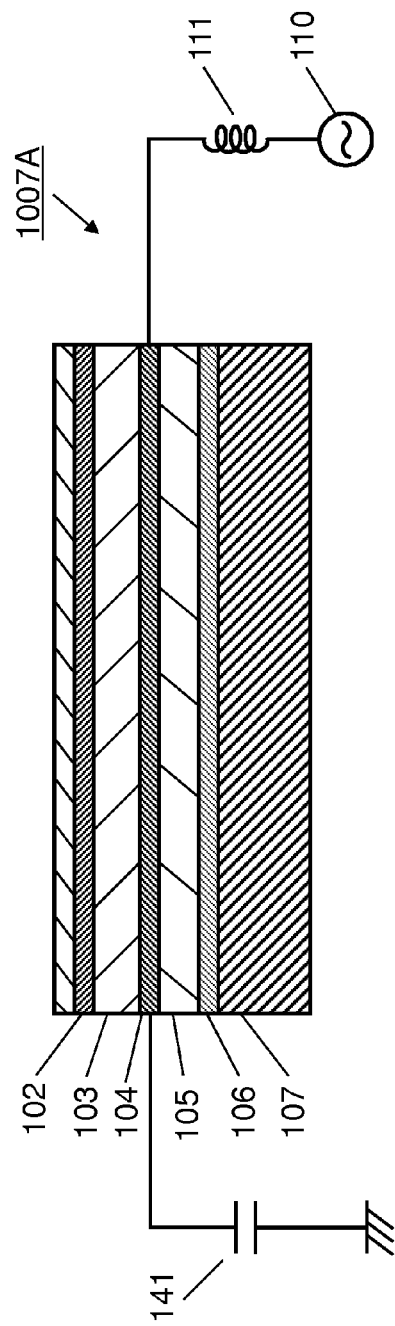
FIG. 25B is a schematic cross-sectional view of another touch panel device according to Embodiment 7.

FIG. 25B is a schematic cross-sectional view of another touch panel device 1007A according to Embodiment 7. In FIG. 25B, components identical to those of touch panel device 1 according to Embodiment 1 shown in FIG. 1 are denoted by the same reference numerals. Touch panel device 1007A illustrated in FIG. 25B further includes shunt capacitor 141 connected in series between a ground and an output port of drive electrode 104 in touch panel device 1 according to Embodiment 1. Specifically, capacitor 141 is connected in series between the ground and at least one end of drive electrode 104 in the direction in which the drive electrode 104 electrically connected to inductive element 111 extends. This structure can reduce the resonance frequency of drive electrode 104, and decreases the inductance of inductive element 111. This reduces the resistance loss on inductive element 111 accordingly, and enhances the sensitivity of touch panel device 1007A.

Exemplary Embodiment 8

Figure 26:
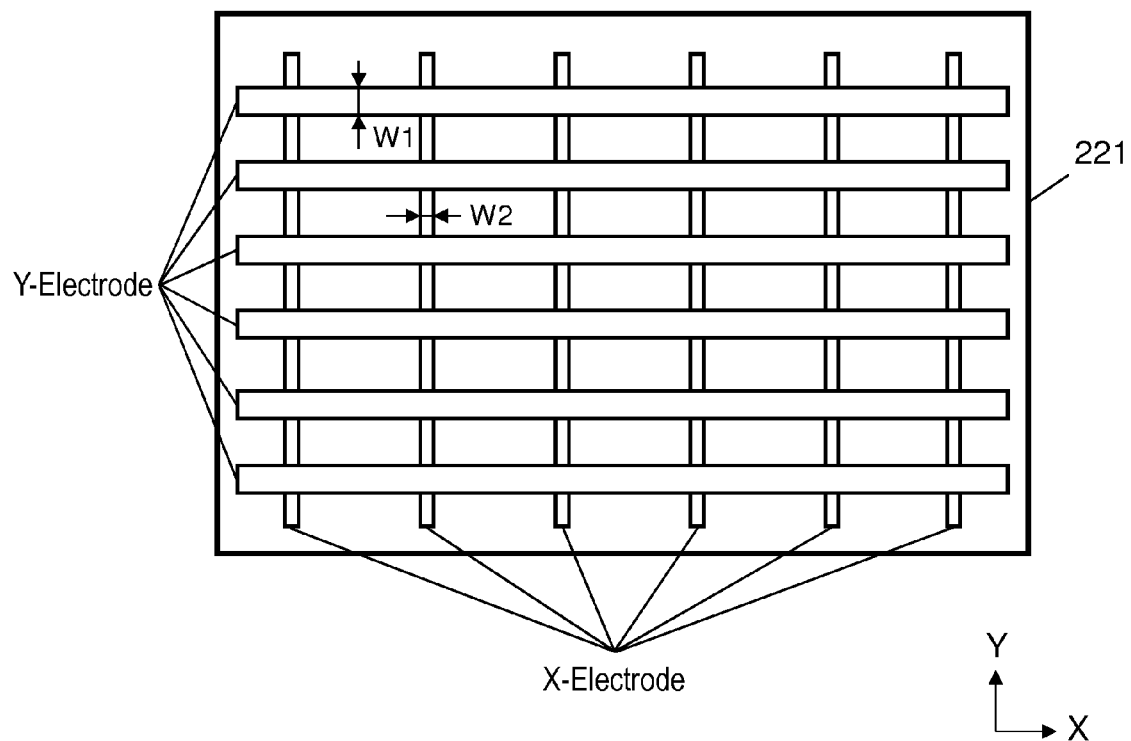
FIG. 26 is a schematic view of a touch panel of a touch panel device according to Exemplary Embodiment 8.

FIG. 26 is a schematic view of touch panel 221 of a touch panel device according to Exemplary Embodiment 8. In FIG. 26, components identical to those of touch panel 200 in touch panel device 6 shown in FIG. 24A according to Embodiment 6 are denoted by the same reference numerals. In general, a longer electrode (Y-electrode shown in FIG. 26) has larger resistance than a shorter electrode (X-electrode shown in FIG. 26). In touch panel 221 illustrated in FIG. 26, width W1 in the direction perpendicular to the X-axis direction in which the longer electrode extends is larger than width W2 in the direction perpendicular to Y-axis direction in which the shorter electrode extends. This structure increases the cutoff frequency of the transmission path from the AC signal source to the detection device.

Figure 27:
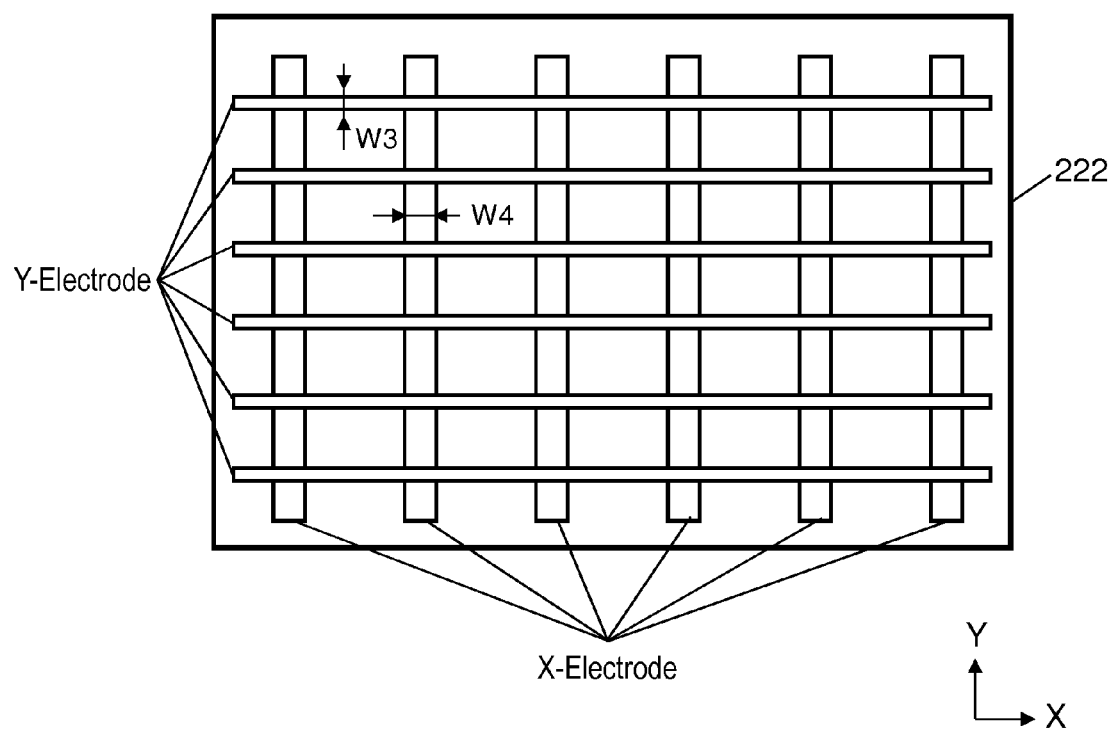
FIG. 27 is a schematic view of a touch panel of another touch panel device according to Embodiment 8.

FIG. 27 is a schematic view of touch panel 222 in another touch panel device according to Embodiment 8. In FIG. 26, components identical to those of touch panel 200 of touch panel device 6 shown in FIGS. 22 and 24A according to Embodiment 6 are dented by the same reference numerals. In general, the electrode (X-electrode in FIG. 27) closer to shield layer 106 has larger stray capacitance with shield layer 106 than the electrode (Y-electrode in FIG. 27) farther from shield layer 106. In touch panel 222 illustrated in FIG. 27 according to Embodiment 8, width W4 in the direction perpendicular to the Y-axis direction in which X-electrode closer to shield layer 106 extends may be preferably larger than width W3 in the direction perpendicular to X-axis direction in which Y-electrode farther from shield layer 106 extends. This structure can reduce the resistance of X-electrode closer to shield layer 106, thereby increases the cutoff frequency of the transmission path from the AC signal source to the detection device.

The configurations of the touch panel devices illustrated in FIGS. 25A to 27 according to Embodiments 7 and 8 are applicable to all touch panel devices according to Embodiments 1 to 6 with similar effects.

Exemplary Embodiment 9

Figure 28:
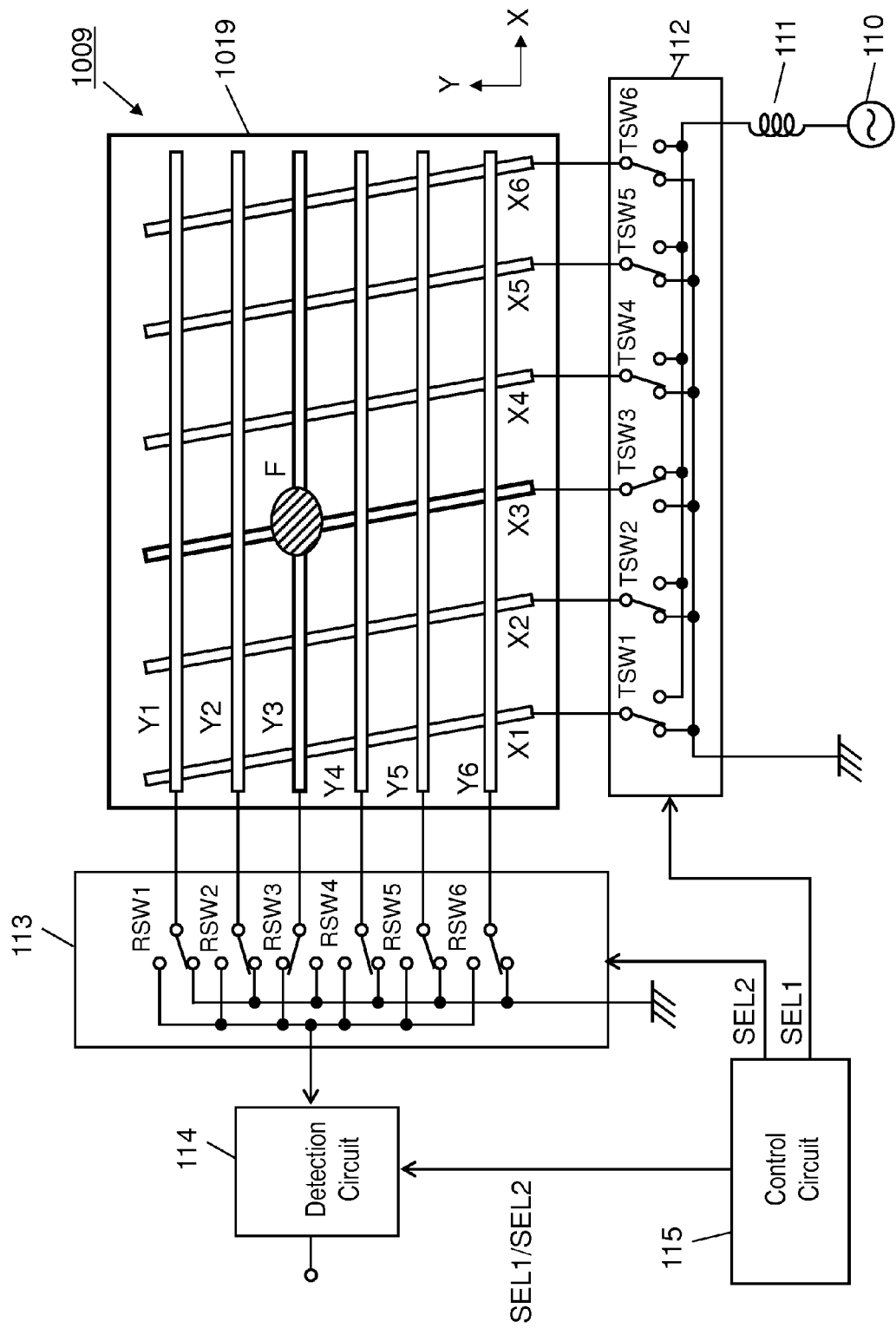
FIG. 28 is a schematic view of a touch panel device according to Exemplary Embodiment 9.

FIG. 28 is a schematic view of a touch panel device according to Exemplary Embodiment 9. In FIG. 28, components identical to those of touch panel device 1 according to Embodiment 1 shown in FIG. 1 are denoted by the same reference numerals. Touch panel device 1009 illustrated in FIG. 28 includes touch panel 1019 instead of touch panel 100 according to Embodiment 1. In touch panel 1019, the direction in which drive electrodes X1 to X6 extend is not perpendicular to the direction in which detection electrodes Y1 to Y6 extend. However, similarly to touch panel device 1 according to Embodiment 1, the crossing point on which object F touches out of crossing points where drive electrodes X1 to X6 face detection electrodes Y1 to Y6 can be detected with high sensitivity.

In touch panel device 1 according to Embodiment 1 illustrated in FIG. 1, touch panel 100 may include only one drive electrode X1 and only one detection electrode Y1 facing drive electrode X1. This touch panel device can be used as a touch sensor detecting that touch panel 100 is touched with an object at high sensitivity, and can provide the same effect as touch panel device 1 according to Embodiment 1.

The configuration of the touch panel device according to Embodiment 9 is applicable to all touch panel devices according to Embodiments 1 to 8 with similar effects.

As described above, the touch panel devices according to Embodiments 1 to 8 can enhance accuracy of the detected position and detection sensitivity with a simple structure.

In the embodiments described above, LCD 107 is mounted onto touch panels 100 and 200. LCD 107 is not an inevitable component for the purpose of detecting a touch without displaying an image on a surface of a touch panel.

In the above embodiments, drive electrodes 104, detection electrodes 102, X-electrodes 204, and Y-electrodes 202 are arranged at almost regular intervals. However, they are not necessarily arranged at regular intervals. They may be arranged with different intervals depending upon a position. For example, when a region on touch panel 100 which is frequently touched with a finger is specified, a space between electrodes 102 and 104 on this region may be smaller than spaces between electrodes 102 and 104 on other regions. This configuration enhances the resolution for the touched position.

In the embodiments described above, control circuits 115 and 215 sequentially switch drive electrode switch 112, detection electrode switch 113, X-electrode switch 212*a*, and Y-electrode switch 212*b*. However, switching the electrode is not necessarily executed sequentially. Switching may be performed every one or more electrodes.

Control circuits 115 and 215 may switch electrode switches 112, 113, 212*a*, and 212*b* in order to simultaneously select plural electrodes.

For example, in touch panel device 1 illustrated in FIG. 3, control circuit 115 may control drive electrode switch 112 to simultaneously connect inductive element 111 to plural drive electrodes X1 and X2 out of plural drive electrodes X1 to X6 adjacent to each other, to disconnect drive electrode X1 from inductive element 111, and simultaneously connect inductive element 111 to drive electrodes X2 and X3 adjacent to each other. This operation enhances the sensitivity of touch panel device 1. Touch panel device 1004 illustrated in FIG. 8 may be operated in this way.

In touch panel device 6 illustrated in FIG. 24A, the control circuit may control electrode switches 212*a* and 212*b* as described below. Specifically, plural X-electrodes XS1 and XS2 out of plural X-electrodes XS1 to XS6 adjacent to each other are simultaneously connected to inductive element 211*a*, and plural Y-electrodes YS1 and YS2 out of plural Y-electrodes YS1 to YS6 adjacent to each other are simultaneously connected to inductive element 211*b*. Then, electrodes XS1 and YS1 are disconnected from inductive elements 211*a* and 211*b*, and then, plural X-electrodes XS2 and XS3 adjacent to each other are simultaneously connected to inductive element 211*a*, and plural Y-electrodes YS2 and YS3 adjacent to each other are simultaneously connected to inductive element 211*b*. This operation enhances the sensitivity of touch panel device 6. Touch panel device 6A illustrated in FIG. 24B may be operated in the same way.

In this case, the plural electrodes simultaneously selected may not necessarily be adjacent to each other.

In the above embodiments, detection circuits 114 and 214 detect the change in the capacitance between electrodes or between the electrode and the ground by inputting the AC signal from detection electrode 102 and Y-electrode 202. However, the AC signal is not necessarily used. A direct-current (DC) signal or other signals may be used.

According to Embodiment 2, each of drive electrode 104 and detection electrode 102 is divided substantially at the center part thereof in the direction in which each electrode extends. However, each electrode is not necessarily divided at the center part. Each electrode may be divided at an arbitrary position other than the center part in the direction in which each electrode extends. Each electrode may be divided at different position, considering the used state of the touch panel. When the drive electrode is divided, for example, the amount of energy loss caused on the drive electrode upon transmitting the AC signal through the drive electrode can be maximally reduced, thereby providing the touch panel device with high sensitivity. In the above embodiments, each electrode is divided into two. However, each electrode may be divided into more than two, providing similar effects.

In the touch panel devices according to all the above embodiments, the AC signal may be a rectangular wave. The resonance frequency of each electrode may have a variation. In the case that a sine wave is used as the AC signal, the frequency of the AC signal may be significantly different from the resonance frequency of each electrode, and a certain electrode may have low sensitivity. In view of this, the rectangular wave having a frequency bandwidth wider than that of a sine wave is used as the AC signal. This operation can prevent the frequency of the AC signal from being significantly different from the resonance frequency of each electrode even if the resonance frequency of each electrode has a variation.

The touch panel device including the mutual-capacitive type touch panel according to the embodiments includes touch panel 100 including drive electrode (first electrode) 104 and detection electrode (second electrode) 102, AC signal source 110 inputting an AC signal with a predetermined frequency to drive electrode 104, inductive element 111 electrically connected in series between AC signal source 110 and drive electrode 104, and detection circuit 114. Detection circuit 114 may detect the change in the capacitance between drive electrode 104 and detection electrode 102 upon the touch of an object on the surface of touch panel 100 based on a change in the signal output from detection electrode 102. Drive electrode 104 and detection electrode 102 are arranged to be isolated from each other not to transmit a DC component.

For example, in the touch panel devices according to Embodiments 1 to 5, drive electrodes 104 are arranged substantially at regular intervals in a direction of the X-axis (first direction), and extend in a direction of the Y-axis (second direction) perpendicular to the X-axis, while detection electrodes 102 (second electrodes) are arranged substantially at regular intervals in the direction of the Y-axis, and extend in the direction of the X-axis. However, the configurations of drive electrode 104 and detection electrode 102 are not necessarily limited thereto. Drive electrode 104 and detection electrode 102 may be arranged to extend in any direction. The effect of the touch panel devices according to the first to fifth embodiments can be obtained in the same manner even if drive electrode 104 and detection electrode 102 are arranged to extend in any direction. The configuration in which drive electrode 104 and detection electrode 102 are arranged to extend in any direction includes the case that drive electrode 104 and detection electrode 102 are configured by single electrodes, as well as the case that drive electrode 104 and detection electrode 102 are configured by plural electrodes.

In the case that drive electrode 104 and detection electrode 102 are arranged to extend in any direction, drive electrode 104 (first electrode) and detection electrode 102 (second electrode) may be formed on a single layer of touch panel 100. For example, when the arrangement direction and extending direction of drive electrode 104 and detection electrode 102 are determined in order that drive electrode 104 and detection electrode 102 do not cross each other, they are not mutually connected even if drive electrode 104 and detection electrode 102 are both formed on the same layer of touch panel 100. Drive electrode 104 and detection electrode 102 are both formed on the same layer of touch panel 100 provide touch panel 100 with a low profile, and simplifies the production process of touch panel 100.

The touch panel device employing the mutual-capacitive type touch panel according to the embodiments includes touch panel 100, AC signal source 110, inductive element 111, and detection circuit 114. Touch panel 100 includes drive electrodes 104 (first electrodes) arranged at any intervals in a first direction and extending in a second direction different from the first direction, and detection electrodes 102 (second electrodes) arranged at any intervals in a third direction and extending in a fourth direction different from the third direction. Detection electrodes 102 crosses the second direction, and face drive electrode 104 across the insulation layer. AC signal source 110 inputs an AC signal with a predetermined frequency to drive electrode 104. Inductive element 111 is electrically connected in series between AC signal source 110 and drive electrode 104. Detection circuit 114 detects the change in the capacitance of the crossing point between drive electrode 104 and detection electrode 102 upon the touch of an object on the surface of touch panel 100 based on a change in the signal output from detection electrode 102. For example, in the touch panel devices according to Embodiments 1 to 5, drive electrodes 104 are arranged substantially at regular intervals in the direction of the X-axis (first direction), and extend in the direction of the Y-axis (second direction) perpendicular to the X-axis, while detection electrodes 102 (second electrodes) are arranged substantially at regular intervals in the direction of the Y-axis, and extend in the direction of the X-axis. However, the configurations of drive electrode 104 and detection electrode 102 are not limited thereto. Specifically, the first, second, third, and fourth directions can be arbitrarily selected as long as the touch panel device satisfies the condition that the extending direction (second direction) of the drive electrode 104 crosses the extending direction (fourth direction) of the detection electrode 102 three-dimensionally, the first direction is different from the second direction, and the third direction is different from the fourth direction. For example, the first direction may be identical to the third direction, the first direction may be identical to the fourth direction, or the second direction may be identical to the third direction. The first, second, third, and fourth directions satisfying the above condition provide effects of the touch panel devices according to Embodiments 1 to 5.

In the touch panel device employing the mutual-capacitive type touch panel according to the above embodiments, each of drive electrode 104 (first electrode) and detection electrode 102 (second electrode) may include plural electrodes. Such touch panel device may include drive electrode switch 112 (first electrode switch) for selecting the electrode out of plural drive electrodes 104 to which the AC signal is input, detection electrode switch 113 (second electrode switch) for selecting the electrode out of plural detection electrodes 102 having the output signal detected by detection circuit 114, and control circuit 115 for controlling drive electrode switch 112 and detection electrode switch 113. Specifically, the touch panel device employing the mutual-capacitive type touch panel according to the above embodiments can provide the effect described above as long as drive electrode switch 112 has a function of selecting the electrode out of plural drive electrodes 104 to which the AC signal is input, and detection electrode switch 113 has a function of selecting the electrode out of plural detection electrodes 102 having the output signal detected by detection circuit 114.

The touch panel device employing the self-capacitive type touch panel according to the above embodiments includes touch panel 200 having X-electrode 204 (first electrode) and Y-electrode 202 (second electrode), AC signal sources 210a and 210b inputting an AC signal with a predetermined frequency to X-electrode 204 and Y-electrode 202, inductive element 211a electrically connected in series between AC signal source 210a and X-electrode 204, and detection circuits 114a and 114b. Detection circuits 114a and 114b detect the change in capacitance between X-electrode 204 and the ground or between Y-electrode 202 and the ground upon the touch of an object on the surface of touch panel 200 based on a change in the signals output from X-electrode 204 and Y-electrode 202. For example, in touch panel device 6 according to Embodiment 6, X-electrodes 204 are arranged substantially at regular intervals in the direction of the X-axis (first direction), and extend in the direction of the Y-axis (second direction) perpendicular to the direction of the X-axis, while Y-electrodes 202 (second electrodes) are arranged substantially at regular intervals in the direction of the Y-axis, and extend in the direction of the X-axis. However, the configurations of X-electrode 204 and Y-electrode 202 are not limited thereto, and X-electrode 204 and Y-electrode 202 may be arranged to extend in any direction. The effect of touch panel device 6 according to Embodiment 6 can be obtained in the same manner even if X-electrode 204 and Y-electrode 202 are arranged to extend in any direction. The configuration in which X-electrode 204 and Y-electrode 202 are arranged to extend in any direction includes the case where each of X-electrode 204 and Y-electrode 202 is configured by a single electrode, in addition to the case where X-electrode 204 and Y-electrode 202 are configured by plural electrodes. In this case, X-electrode switch 212a and Y-electrode switch 212b illustrated in FIG. 24A are unnecessary.

In the case that X-electrode 204 and Y-electrode 202 extend in any direction, as described above, X-electrode 204 (first electrode) and Y-electrode 202 (second electrode) may be formed on the same layer of touch panel 200. For example, when the arrangement direction and extending direction of X-electrode 204 and Y-electrode 202 are determined such that X-electrode 204 and Y-electrode 202 do not cross each other, and are not mutually connected even if X-electrode 204 and Y-electrode 202 are both formed on the same layer of touch panel 200. X-electrode 204 and Y-electrode 202 both formed on the same layer of touch panel 200 provides touch panel 200 with a low profile and simplifies the production process.

The touch panel device employing the self-capacitive type touch panel according to the embodiments includes touch panel 200, AC signal sources 210a and 210b, inductive elements 211a and 211b, and detection circuits 214a and 214b. Touch panel 200 includes plural X-electrodes 204 (first electrodes) arranged at any intervals in a first direction and extending in a second direction different from the first direction, and plural Y-electrodes 202 (second electrodes) arranged at any intervals in a third direction and extending in a fourth direction different from the third direction and crossing the second direction. Y-electrodes 202 face X-electrode 204 across the insulation layer. AC signal sources 210a and 210b input an AC signal with a predetermined frequency to X-electrode 204 and Y-electrode 202. Inductive element 211a is electrically connected in series between AC signal source 210a and X-electrode 204. Inductive element 211b is electrically connected in series between AC signal source 210b and Y-electrode 202. Detection circuits 214a and 214b detect the change in capacitance between X-electrode 204 and the ground or between Y-electrode 202 and the ground upon the touch of an object on the surface of touch panel 200 based on a change in the signals output from X-electrode 204 and Y-electrode 202. For example, in the touch panel device according to Embodiment 6, X-electrodes 204 are arranged substantially at regular intervals in the direction of the X-axis (first direction) and extend in the direction of the Y-axis (second direction) perpendicular to the X-axis, while Y-electrodes 202 (second electrodes) are arranged substantially at regular intervals in the direction of the Y-axis and extend in the direction of the X-axis. However, the configurations of X-electrode 204 and Y-electrode 202 are not limited thereto. Specifically, the first, second, third, and fourth directions can be selected arbitrarily as long as the touch panel device satisfies the condition that the extending direction (second direction) of X-electrode 204 crosses the extending direction (fourth direction) of Y-electrode 202, the first direction is different from the second direction, and the third direction is different from the fourth direction. For example, the first direction may be identical to the third direction may be the same, the first direction and the fourth direction, or the second direction may be identical to the third direction. Even if the first, second, third, and fourth directions satisfy the above condition provides the effect of the touch panel device according to Embodiment 6.

In the touch panel device employing the self-capacitive type touch panel according to the above embodiments, X-electrode 204 and Y-electrode 202 may include plural electrodes. Such touch panel device may include X-electrode switch 212a for selecting the electrode out of plural X-electrodes 204 to which the AC signal is input, Y-electrode switch 212b for selecting the electrode out of plural Y-electrodes 202 to which the AC signal is input, and control circuit 215 for controlling X-electrode switch 212a and Y-electrode switch 212b. Specifically, the touch panel device employing the self-capacitive type touch panel according to the above embodiments can provide the effect described above as long as X-electrode switch 212a has a function of selecting the electrode out of plural X-electrodes 204 to which the AC signal is input, and Y-electrode switch 212b has a function of selecting the electrode out of plural Y-electrodes 202 outputting the output signal detected by detection circuit 214.

The first electrode (drive electrode 104 or X-electrode 204) is divided into the third electrode and the fourth electrode on arbitrary position in the touch panel device of the self-capacitive type touch panel or the mutual-capacitive type according to the above embodiments. The control circuit (115 or 215) is operable to control the first electrode switch (drive electrode switches 112a and 112b, or X-electrode switch 212a) to simultaneously or alternately input the AC signals with the same phase or inverse phase to the third electrode and the fourth electrode from AC signal source (110a, 110b, or 210a). For example, in the touch panel device illustrated in FIG. 14, drive electrode 104 is divided into third electrode Xn1 and fourth electrode Xn2 at a position on the Y axis. However, the divided position is not limited on the Y axis. For example, the effect of the touch panel device illustrated in FIG. 14 can be obtained even in the touch panel device in which drive electrode 104 extends in a direction other than the Y-axis direction. This configuration can be applied not only to the mutual-capacitive type touch panel but also to the self-capacitive type touch panel, providing the same effect. Specifically, in the embodiment employing the self-capacitive type touch panel illustrated in FIG. 24A, X-electrode 204 is divided into the third electrode and the fourth electrode at arbitrary position in the Y-axis direction, and X-electrode switch 212a determines the electrical connection between each of the third electrode and the fourth electrode and each of AC signal source 210a and detection circuit 214a. Even this configuration provides the effect due to the divisional electrodes illustrated in FIG. 14.

The second electrode (detection electrode 102 or Y-electrode 202) may be divided into the fifth electrode and the sixth electrode at any position in the touch panel device of the self-capacitive type or the mutual-capacitive type according to the embodiments described above. In this case, the control circuit (115 or 215) may control the second electrode switch to input the signal output from the fifth electrode and the sixth electrode into the detection circuit. For example, in the touch panel device illustrated in FIG. 14, detection electrode 102 is divided into fifth electrode Yn1 and sixth electrode Yn2 at arbitrary position in the X axis direction. However, the divided position is not limited in the X axis direction. For example, the effect of the touch panel device illustrated in FIG. 14 can be obtained even in the touch panel device in which detection electrode 102 extends in a direction other than the X-axis direction. This configuration can be applied not only to the mutual-capacitive type touch panel but also to the self-capacitive type touch panel, providing the similar effect. Specifically, in the embodiment of the self-capacitive type touch panel illustrated in FIG. 24, Y-electrode 202 may be divided into the fifth electrode and the sixth electrode at an arbitrary position in the X-axis direction. Specifically, in this case, Y-electrode switch 212b determines the electrical connection between each of the fifth electrode and the sixth electrode, and each of AC signal source 210b and detection circuit 214b. Even this configuration provides the effect due to the divisional electrodes illustrated in FIG. 14.

In the touch panel devices according to the embodiments, each electrode has a rectangular shape just for illustration. However, the shape of each electrode is not limited to it. The similar effect can be obtained by an electrode having another shape, such as a diamond shape or backgammon shape employed in an existing touch panel device.

The case that "the change of the capacitance between the ground and one of the first electrode (X-electrode) and the second electrode (Y-electrode) upon the touch of the object on the surface of the touch panel is detected based on the change of the signals output from the first electrode and the second electrode" includes the case that the detection circuit detects the change of the capacitance between the first electrode and the ground or the change of the capacitance between the second electrode and the ground only based on the change of the signal output from the first electrode, the case that the detection circuit detects the change of the capacitance only based on the change of the signal output from the second electrode, and the case that the detection circuit detects the change of the capacitance from the change of the signals output from both the first electrode and the second electrode. For example, in touch panel device 6 illustrated in FIG. 24A, when the AC signal is input to X-electrode 204 (first electrode) from AC signal source 210*a*, detection circuit 214*a* may detect the change of the capacitance between X-electrode 204 and the ground based on the change of the signal output from X-electrode 204. Detection circuit 214*b* may detect the change of the capacitance between Y-electrode 202 and the ground based on the change of the signal output from Y-electrode 202. The change of the capacitance between X-electrode 204 and the ground and the change of the capacitance between Y-electrode 202 and the ground may be detected by detection circuit 214*a* and detection circuit 214*b*, respectively. The same is applied to the case that the AC signal is input to Y-electrode 202 (second electrode) from AC signal source 210*b*.

The inductive element according to the embodiments indicates, e.g. a chip component having an inductance component in the frequency of the AC signal, and does not indicate the transmission path from AC signal source 110 to detection circuit 114.

INDUSTRIAL APPLICABILITY

A touch panel device according to the present invention is widely applicable to a touch panel device used in, e.g. mobile terminals, personal computers, and ATM terminals.

REFERENCE NUMERALS

1, 2, 3, 6 Touch Panel Device
100, 120, 121, 200, 221, 222 Touch Panel
102 Detection Electrode (Second Electrode)
103 Glass Layer (Insulation Layer)
104 Drive Electrode (First Electrode)
106 Shield Layer
107 Liquid Crystal Display Element (Image Display Element)
110, 110*a*, 110*b*, 210*a*, 210*b* AC Signal Source
111, 111*b*, 111-1 to 111-6, 140, 211*a*, 211*b* Inductive Element
112, 112*a*, 112*b* Drive Electrode Switch (First Electrode Switch)
113, 113*a*, 113*b* Detection Electrode Switch (Second Electrode Switch)
114, 114*a*, 114*b*, 214*a*, 214*b* Detection Circuit
115, 215 Control Circuit
141 Capacitor
202 Y-Electrode (Second Electrode)
204 X-Electrode (First Electrode)
212*a* X-Electrode Switch (First Electrode Switch)
212*b* Y-Electrode Switch (Second Electrode Switch)
901 Environment Sensor
X1 to X6 Drive Electrode (First Electrode)
Y1 to Y6 Detection Electrode (Second Electrode)
Xm1 ($1 \leq m \leq 6$) Drive Electrode (Third Electrode)
Xm2 ($1 \leq m \leq 6$) Drive Electrode (Fourth Electrode)
Yn1 ($1 \leq m \leq 6$) Detection Electrode (Third Electrode, Fifth Electrode)
Yn2 ($1 \leq n \leq 6$) Detection Electrode (Fourth Electrode, Sixth Electrode)
XS1 to XS6 X-Electrode (First Electrode)
YS1 to YS6 Y-Electrode (Second Electrode)

The invention claimed is:

1. A touch panel device comprising:
a touch panel including:
a plurality of first electrodes arranged apart from one another in a first direction and extending in a second direction different from the first direction,
an insulation layer, and
a plurality of second electrodes arranged apart from one another in a third direction and extending in a fourth direction different from the second direction and the third direction, the plurality of second electrodes facing the plurality of first electrodes across the insulation layer and apart from the plurality of first electrodes at a plurality of crossing points;
an alternating-current (AC) signal source configured to input an AC signal into the plurality of first electrodes;
an inductive element electrically connected in series between the AC signal source and each of the plurality of first electrodes;
a detection circuit configured to detect a change of a capacitance at each of the plurality of crossing points between respective one of the plurality of first electrodes and respective one of the plurality of second electrodes upon a touch of an object on the touch panel, based on a change of signals output from the plurality of second electrodes;
a first electrode switch configured to change a connection status of connecting and disconnecting between the inductive element and each of the plurality of first electrodes;
a second electrode switch configured to change a connection status of connecting and disconnecting between the detection circuit and each of the plurality of second electrodes;
a control circuit configured to control the first electrode switch and the second electrode switch; and
an image display element facing the touch panel,
wherein the image display element is configured to generate a larger noise during a noise period larger than during a further period other than the noise period, and
wherein the control circuit is configured to control the first electrode switch to:
connect, to a ground during the noise period, a first electrode out of the plurality of first electrodes which is disconnected from the AC signal source, and
disconnect, from the ground during at least a part of the further period, the first electrode which is disconnected from the AC signal source.

2. The touch panel device according to claim 1, wherein the second direction is perpendicular to the fourth direction.

3. The touch panel device according to claim 1, wherein, when connecting between the inductive element and a certain first electrode out of the plurality of first electrodes, the control circuit controls the first electrode switch to:
disconnect and open another first electrode out of the plurality of first electrodes which is adjacent to the certain first electrode from a ground and the AC signal source; and
connect, to the ground, a further first electrode out of the plurality of first electrodes other than the certain first electrode and the another first electrode.

4. The touch panel device according to claim 1, wherein the control circuit is configured to control the first electrode switch to:

connect simultaneously between the inductive element and each of a plurality of certain first electrodes out of the plurality of first electrodes; and disconnect between the inductive element and another first electrode out of the plurality of first electrodes different from the plurality of certain first electrodes.

5. The touch panel device according to claim 1, wherein the control circuit is configured to control the first electrode switch to connect, to a ground, a first electrode whose connection status with the AC signal source is in the open status out of the plurality of first electrodes.

6. The touch panel device according to claim 1, wherein the control circuit is configured to control the second electrode switch to connect, to a ground, a second electrode out of the plurality of second electrodes which is connected to the detection circuit.

7. The touch panel device according to claim 1,
wherein the first electrode switch is configured to select a first electrode out of the plurality of first electrodes which is to have the AC signal input thereto, and
wherein the second electrode switch is configured to select a second electrode out of the plurality of second electrodes which outputs an output signal to be detected by the detection circuit.

8. The touch panel device according to claim 7, wherein the control circuit is configured to control the first electrode switch to connect, to a ground, a further first electrode out of the plurality of first electrodes other than the selected first electrode.

9. The touch panel device according to claim 7, wherein the control circuit is configured to control the first electrode switch to simultaneously select a plurality of certain first electrodes out of the plurality of first electrodes.

10. The touch panel device according to claim 1, wherein the control circuit is configured to control the second electrode switch to connect, to a ground, a further second electrode out of the plurality of second electrodes other than the selected second electrode.

11. The touch panel device according to claim 7,
wherein each of the plurality of first electrodes includes a third electrode and a fourth electrode separate from each other, and
wherein the control circuit is configured to control the first electrode switch to input the AC voltage to the third electrode of each of the plurality of first electrodes.

12. The touch panel device according to claim 11, wherein the control circuit is configured to control the first electrode switch to input the AC voltage to the fourth electrode of each of the plurality of first electrodes.

13. The touch panel device according to claim 12, wherein the control circuit is configured to control the first electrode switch to input the AC voltage alternately to the third electrode of each of the plurality of first electrodes and the fourth electrode of each of the plurality of first electrodes.

14. The touch panel device according to claim 11, wherein the control circuit is configured to control the first electrode switch to input, to the fourth electrode, an AC voltage having a phase opposite to a phase of the AC voltage input to the third electrode.

15. The touch panel device according to claim 14, wherein the control circuit is configured to control the first electrode switch to input the AC voltage to the third electrode of each of the plurality of first electrodes, and input, to the fourth electrode, an AC voltage having a phase opposite to a phase of the AC voltage input to the third electrode simultaneously to inputting of the AC voltage to the third electrode.

16. The touch panel device according to claim 11, further comprising
a differential amplifier having an inverting input terminal and a non-inverting input terminal, and being configured to output a signal of a difference between a signal input to the inverting input terminal and a signal input to the non-inverting terminal,
wherein the non-inverting input terminal of the differential amplifier is connected to a certain second electrode out of the plurality of second electrodes which faces the third electrode of each of the plurality of first electrodes,
the inverting input terminal of the differential amplifier is connected to a further second electrode out of the plurality of second electrodes which faces the fourth electrode of each of the plurality of first electrodes, and
wherein the detection circuit is configured to determine whether the object touches the touch panel or not based on the signal output from the differential amplifier.

17. The touch panel device according to claim 11, wherein lengths of the plurality of first electrodes in the second direction is larger than lengths of the plurality of second electrodes in the fourth direction.

18. The touch panel device according to claim 11,
wherein each of the plurality of second electrodes includes fifth electrode and sixth electrode separate from each other, and
wherein the control circuit is configured to control the second electrode switch to input signals output from the fifth electrode and the sixth electrode to the detection circuit.

19. The touch panel device according to claim 18, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a fifth electrode of one second electrode out of the plurality of second electrodes,
wherein the non-inverting input terminal is connected to a sixth electrode of one second electrode out of the plurality of second electrodes, and
wherein the detection circuit is configured to determine whether the object touches the touch panel or not based on the signal output from the differential amplifier.

20. The touch panel device according to claim 7,
wherein each of the plurality of second electrodes includes a third electrode and a fourth electrode separate from each other, and
wherein the control circuit is configured to control the second electrode switch to input signals output from the third electrode and the fourth electrode to the detection circuit.

21. The touch panel device according to claim 20, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a third electrode of a second electrode out of the plurality of second electrodes,
wherein the non-inverting input terminal is connected to the fourth electrode of a second electrode out of the plurality of second electrodes, and wherein the detection circuit is configured to determine whether the object touches the touch panel or not based on the signal output from the differential amplifier.

22. The touch panel device according to claim 20, wherein lengths of the plurality of second electrodes in the fourth direction is larger than lengths of the plurality of first electrodes in the second direction.

23. The touch panel device according to claim 7, further comprising:
a shield layer provided between the image display element and each of the plurality of first electrodes and the plurality of second electrodes; and
a grounding switch configured to switch between a status of connecting the shield layer to the ground and a status of disconnecting the shield layer from the ground,
wherein the control circuit is configured to control the ground switch to:
connect the shield layer to the ground during the noise period; and
disconnect the shield layer from the ground during at least a part of the further period.

24. The touch panel device according to claim 23,
wherein one electrode of each of the plurality of first electrodes and each of the plurality of second electrodes is more apart from the shield layer than another electrode of each of the plurality of first electrodes and each of the plurality of second electrodes, and
wherein a width of the another electrode of each of the plurality of first electrodes and each of the plurality of second electrodes is larger than a width of the one electrode of each of the plurality of first electrodes and each of the plurality of second electrodes.

25. The touch panel device according to claim 1, wherein no inductive element is electrically connected between the detection circuit and each of the plurality of second electrodes.

26. The touch panel device according to claim 1,
wherein each of the plurality of first electrodes includes a third electrode and a fourth electrode separate from each other, and
wherein the control circuit is configured to control the first electrode switch to input the AC voltage to the third electrode of each of the plurality of first electrodes.

27. The touch panel device according to claim 26, wherein the control circuit is configured to control the first electrode switch to input the AC voltage to the fourth electrode of each of the plurality of first electrodes.

28. The touch panel device according to claim 27, wherein the control circuit is configured to control the first electrode switch to input the AC voltage alternately to the third electrode of each of the plurality of first electrodes and the fourth electrode of each of the plurality of first electrodes.

29. The touch panel device according to claim 26, wherein the control circuit is configured to control the first electrode switch to input, to the fourth electrode, an AC voltage having a phase opposite to a phase of the AC voltage input to the third electrode.

30. The touch panel device according to claim 29, wherein the control circuit is configured to control the first electrode switch to input the AC voltage to the third electrode of each of the plurality of first electrodes, and input, to the fourth electrode, an AC voltage having a phase opposite to a phase of the AC voltage input to the third electrode simultaneously to inputting of the AC voltage to the third electrode.

31. The touch panel device according to claim 26, further comprising
a differential amplifier having an inverting input terminal and a non-inverting input terminal, and being configured to output a signal of a difference between a signal input to the inverting input terminal and a signal input to the non-inverting terminal,
wherein the non-inverting input terminal of the differential amplifier is connected to a certain second electrode out of the plurality of second electrodes which faces the third electrode of each of the plurality of first electrodes,
wherein the inverting input terminal of the differential amplifier is connected to a further second electrode out of the plurality of second electrodes which faces the fourth electrode of each of the plurality of first electrodes, and
wherein the detection circuit is configured to determine whether the object touches the touch panel or not based on the signal output from the differential amplifier.

32. The touch panel device according to claim 26, wherein lengths of the plurality of first electrodes in the second direction is larger than lengths of the plurality of second electrodes in the fourth direction.

33. The touch panel device according to claim 26,
wherein each of the plurality of second electrodes includes fifth electrode and sixth electrode separate from each other, and
wherein the control circuit is configured to control the second electrode switch to input signals output from the fifth electrode and the sixth electrode to the detection circuit.

34. The touch panel device according to claim 33, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a fifth electrode of one second electrode out of the plurality of second electrodes,
wherein the non-inverting input terminal is connected to a sixth electrode of one second electrode out of the plurality of second electrodes, and
wherein the detection circuit is configured to determine whether the object touches the touch panel or not based on the signal output from the differential amplifier.

35. The touch panel device according to claim 1,
wherein each of the plurality of second electrodes includes a third electrode and a fourth electrode separate from each other, and
wherein the control circuit is configured to control the second electrode switch to input signals output from the third electrode and the fourth electrode to the detection circuit.

36. The touch panel device according to claim 35, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a third electrode of a second electrode out of the plurality of second electrodes, wherein the non-inverting input terminal is connected to the fourth electrode of a second electrode out of the plurality of second electrodes, and wherein the detection circuit is configured to determine whether the object touches the touch panel or not based on the signal output from the differential amplifier.

37. The touch panel device according to claim 35, wherein lengths of the plurality of second electrodes in the fourth direction is larger than lengths of the plurality of first electrodes in the second direction.

38. The touch panel device according to claim 1,
wherein the inductive element has a first end and a second end, the first end of the inductive element being electrically connected to the AC signal source, the second end of the inductive element being electrically connected to the first electrode,
the touch panel device further comprising an additional inductive element electrically connected between the second end of the inductive element and a ground.

39. The touch panel device according to claim 1, further comprising a plurality of capacitors each connected between a ground and respective one of ends of the plurality of first electrodes in the second direction.

40. The touch panel device according to claim 1,
wherein each of the plurality of first electrodes has two ends opposite to each other in the second direction, and
wherein the two ends of each of the plurality of first electrodes are electrically short-circuited.

41. The touch panel device according to claim 1,
wherein each of the plurality of second electrodes has two ends opposite to each other in the fourth direction, and
wherein the two ends of each of the plurality of second electrodes are electrically short-circuited.

42. The touch panel device according claim 1, further comprising:
a shield layer provided between the image display element and each of the plurality of first electrodes and the plurality of second electrodes; and
a grounding switch configured to switch between a status of connecting the shield layer to the ground and a status of disconnecting the shield layer from the ground,
wherein the control circuit is configured to control the ground switch to:
connect the shield layer to the ground during the noise period; and
disconnect the shield layer from the ground during at least a part of the further period.

43. The touch panel device according to claim 42,
wherein one electrode of each of the plurality of first electrodes and each of the plurality of second electrodes is more apart from the shield layer than another electrode of each of the plurality of first electrodes and each of the plurality of second electrodes, and
wherein a width of the another electrode of each of the plurality of first electrodes and each of the plurality of second electrodes is larger than a width of the one electrode of each of the plurality of first electrodes and each of the plurality of second electrodes.

44. The touch panel device according to claim 1,
wherein one electrode of each of the plurality of first electrodes and each of the plurality of second electrodes is longer than another electrode of each of the plurality of first electrodes and each of the plurality of second electrodes, and
a width of the one electrode of each of the plurality of first electrodes and each of the plurality of second electrodes is larger than a width of the another electrode of each of the plurality of first electrodes and each of the plurality of second electrodes.

45. The touch panel device according to claim 1, wherein the AC signal is a rectangular wave signal.

46. A touch panel device comprising:
a touch panel including:
a plurality of first electrodes arranged apart from one another in a first direction and extending in a second direction different from the first direction,
an insulation layer, and
a plurality of second electrodes arranged apart from one another in a third direction and extending in a fourth direction different from the second direction and the third direction, the plurality of second electrodes facing the plurality of first electrodes across the insulation layer and apart from the plurality of first electrodes at a plurality of crossing points;
an alternating-current (AC) signal source configured to input an AC signal into the plurality of first electrodes;
an inductive element electrically connected in series between the AC signal source and each of the plurality of first electrodes;
a detection circuit configured to detect a change of a capacitance at each of the plurality of crossing points between respective one of the plurality of first electrodes and respective one of the plurality of second electrodes upon a touch of an object on the touch panel, based on a change of signals output from the plurality of second electrodes;
a first electrode switch configured to change a connection status of connecting and disconnecting between the inductive element and each of the plurality of first electrodes;
a second electrode switch configured to change a connection status of connecting and disconnecting between the detection circuit and each of the plurality of second electrodes;
a control circuit configured to control the first electrode switch and the second electrode switch; and
an image display element facing the touch panel,
wherein the image display element is configured to generate a larger noise during a noise period than during a further period other than the noise period, and
wherein the control circuit is configured to control the second electrode switch to:
connect, to a ground during the noise period, a second electrode out of the plurality of second electrodes which is disconnected from the detection circuit, and
disconnect, from the ground during at least a part of the further period, the second electrode out of the plurality of second electrodes which is disconnected from the detection circuit.

47. A touch panel device comprising:
a touch panel including:
a plurality of first electrodes arranged apart from one another in a first direction and extending in a second direction different from the first direction;
an insulation layer; and
a plurality of second electrodes arranged apart from one another in a third direction and extending in a fourth direction different from the second direction and the third direction, the plurality of second electrodes facing the plurality of first electrodes across the insulation layer and apart from the plurality of first electrodes at a plurality of crossing points;

an alternating-current (AC) signal source configured to input an AC signal into the plurality of first electrodes;
an inductive element electrically connected in series between the AC signal source and each of the plurality of first electrodes; and
a detection circuit configured to detect a change of a capacitance at each of the plurality of crossing points between respective one of the plurality of first electrodes and respective one of the plurality of second electrodes upon a touch of an object on the touch panel, based on a change of signals output from the plurality of second electrodes,
wherein a resonance frequency of each of the plurality of second electrodes is different from a frequency of the AC signal.

48. A touch panel device comprising:
a touch panel including:
    a plurality of first electrodes arranged apart from one another in a first direction and extending in a second direction different from the first direction,
    an insulation layer, and
    a plurality of second electrodes arranged apart from one another in a third direction and extending in a fourth direction different from the second direction and the third direction, the plurality of second electrodes facing the plurality of first electrodes across the insulation layer at plurality of crossing points;
an alternating-current (AC) signal source configured to input an AC signal into the plurality of first electrodes and the plurality of second electrodes;
an inductive element electrically connected in series between the AC signal source and each of the plurality of first electrodes;
a detection circuit configured to detect a change of a capacitance between a ground and each of the plurality of first electrodes or a change of a capacitance between the ground and each of the plurality of second electrodes upon a touch of an object on the touch panel, based on a change of signals output from the plurality of first electrodes and the plurality of second electrodes;
a first electrode switch configured to changes a connection status of connecting and disconnecting between the inductive element and each of the plurality of first electrodes;
a second electrode switch configured to change a connection status of connecting and disconnecting the detection circuit and each of the plurality of second electrodes;
a control circuit configured to control the first electrode switch and the second electrode switch; and
an image display element facing the touch panel,
wherein the image display element is configured to generate a larger noise during a noise period than during a further period other than the noise period, and
wherein the control circuit is configured to control the first electrode switch to:
    connect, to a ground during the noise period, a first electrode out of the plurality of first electrodes which is disconnected from the AC signal source, and
    disconnect, from the ground during at least a part of the further period, the first electrode out of the plurality of first electrodes which is disconnected from the AC signal source.

49. The touch panel device according to claim 48, wherein the second direction is perpendicular to the fourth direction.

50. The touch panel device according to claim 48, wherein, when connecting between the inductive element and a certain first electrode out of the plurality of first electrodes, the control circuit controls the first electrode switch to
    disconnect and open, from a ground and the AC signal source, another first electrode out of the plurality of first electrodes which is adjacent to the certain first electrode, and
    connect, to the ground, a further first electrode out of the plurality of first electrodes other than the certain first electrode and the another first electrode.

51. The touch panel device according to claim 48, wherein the control circuit is configured to control the first electrode switch to
    connect simultaneously between the inductive element and each of a plurality of certain first electrodes out of the plurality of first electrodes, and
    disconnect between the inductive element and a further first electrode out of the plurality of first electrodes other than the plurality of certain first electrodes.

52. The touch panel device according to claim 48, wherein the control circuit is configured to control the first electrode switch to connect, to a ground, a first electrode out of the plurality of first electrodes which is disconnected from the AC signal source.

53. The touch panel device according to claim 48, wherein the control circuit is configured to control the second electrode switch to connect, to a ground, a second electrode out of the plurality of second electrodes which is disconnected from the detection circuit.

54. The touch panel device according to claim 48, wherein the control circuit is configured to control the second electrode switch to;
    disconnect, from a ground and the detection circuit, another second electrode out of the plurality of second electrodes which is adjacent to a certain second electrode out of the plurality of second electrodes which is connected to the detection circuit; and
    connect, to the ground, a further second electrode out of the plurality of second electrodes other than the certain second electrode and the another second electrode.

55. The touch panel device according to claim 48,
wherein the first electrode switch is configured to select a first electrode out of the plurality of first electrodes which is to have the AC signal input thereto, and
wherein the second electrode switch is configured to select a second electrode out of the plurality of second electrodes which is to have the AC signal input thereto.

56. The touch panel device according to claim 55, wherein the control circuit is configured to control the first electrode switch to connect, to a ground, a further first electrode out of the plurality of first electrodes other than the selected first electrode.

57. The touch panel device according to claim 55, wherein the control circuit is configured to control the second electrode switch to connect, to a ground, a further second electrode out of the plurality of second electrodes other than the selected second electrode.

58. The touch panel device according to claim 55, wherein the control circuit is configured to control the first electrode switch to simultaneously select a plurality of certain first electrodes out of the plurality of first electrodes.

59. The touch panel device according to claim 58, wherein the control circuit is configured to control the second electrode switch to simultaneously select a plurality of certain second electrodes out of the plurality of second electrodes.

60. The touch panel device according to claim 55, wherein the control circuit is configured to control the second electrode switch to simultaneously select a plurality of certain second electrodes out of the plurality of second electrodes.

61. The touch panel device according to claim 55,
wherein each of the plurality of first electrodes includes a third electrode and a fourth electrode separate from each other, and
wherein the control circuit is configured to control the first electrode switch to input the AC voltage to the third electrode of each of the plurality of first electrodes.

62. The touch panel device according to claim 61, wherein the control circuit is configured to control the first electrode switch to input the AC voltage to the fourth electrode of each of the plurality of first electrodes.

63. The touch panel device according to claim 62, wherein the control circuit is configured to control the first electrode switch to input the AC voltage alternately to the third electrode of each of the plurality of first electrodes and the fourth electrode of each of the plurality of first electrodes.

64. The touch panel device according to claim 61, wherein the control circuit is configured to control the first electrode switch to input, to the fourth electrode, an AC voltage having a phase opposite to a phase of the AC voltage input to the third electrode.

65. The touch panel device according to claim 64, wherein the control circuit is configured to control the first electrode switch to input the AC voltage to the third electrode of each of the plurality of first electrodes, and input, to the fourth electrode, an AC voltage having a phase opposite to a phase of the AC voltage input to the third electrode simultaneously to inputting of the AC voltage to the third electrode.

66. The touch panel device according to claim 61, further comprising
a differential amplifier having an inverting input terminal and a non-inverting input terminal, and being configured to output a signal of a difference between a signal input to the inverting input terminal and a signal input to the non-inverting terminal,
wherein the non-inverting input terminal of the differential amplifier is connected to a certain second electrode out of the plurality of second electrodes which faces the third electrode of each of the plurality of first electrodes,
wherein the inverting input terminal of the differential amplifier is connected to a further second electrode out of the plurality of second electrodes which faces the fourth electrode of each of the plurality of first electrodes, and
wherein the detection circuit is configured to determine whether the object touches the touch panel or not based on the signal output from the differential amplifier.

67. The touch panel device according to claim 61, wherein lengths of the plurality of first electrodes in the second direction is larger than lengths of the plurality of second electrodes in the fourth direction.

68. The touch panel device according to claim 61,
wherein each of the plurality of second electrodes includes fifth electrode and sixth electrode separate from each other, and
wherein the control circuit is configured to control the second electrode switch to input signals output from the fifth electrode and the sixth electrode to the detection circuit.

69. The touch panel device according to claim 68, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a fifth electrode of one second electrode out of the plurality of second electrodes,
wherein the non-inverting input terminal is connected to a sixth electrode of one second electrode out of the plurality of second electrodes, and
wherein the detection circuit is configured to determine whether the object touches the touch panel or not based on the signal output from the differential amplifier.

70. The touch panel device according to claim 55,
wherein each of the plurality of second electrodes includes a third electrode and a fourth electrode separate from each other, and
wherein the control circuit is configured to control the second electrode switch to input signals output from the third electrode and the fourth electrode to the detection circuit.

71. The touch panel device according to claim 70, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a third electrode of a second electrode out of the plurality of second electrodes,
wherein the non-inverting input terminal is connected to the fourth electrode of a second electrode out of the plurality of second electrodes, and
wherein the detection circuit is configured to determine whether the object touches the touch panel or not based on the signal output from the differential amplifier.

72. The touch panel device according to claim 70, wherein lengths of the plurality of second electrodes in the fourth direction is larger than lengths of the plurality of first electrodes in the second direction.

73. The touch panel device according to claim 55, further comprising:
a shield layer provided between the image display element and each of the plurality of first electrodes and the plurality of second electrodes; and
a grounding switch configured to switch between a status of connecting the shield layer to the ground and a status of disconnecting the shield layer from the ground,
wherein the control circuit is configured to control the ground switch to:
connect the shield layer to the ground during the noise period; and
disconnect the shield layer from the ground during at least a part of the further period.

74. The touch panel device according to claim 73,
wherein one electrode of each of the plurality of first electrodes and each of the plurality of second electrodes is more apart from the shield layer than another electrode of each of the plurality of first electrodes and each of the plurality of second electrodes, and
wherein a width of the another electrode of each of the plurality of first electrodes and each of the plurality of second electrodes is larger than a width of the one electrode of each of the plurality of first electrodes and each of the plurality of second electrodes.

75. The touch panel device according to claim 48,
wherein each of the plurality of first electrodes includes a third electrode and a fourth electrode separate from each other, and
wherein the control circuit is configured to control the first electrode switch to input the AC voltage to the third electrode of each of the plurality of first electrodes.

76. The touch panel device according to claim 75, wherein the control circuit is configured to control the first electrode switch to input the AC voltage to the fourth electrode of each of the plurality of first electrodes.

77. The touch panel device according to claim 76, wherein the control circuit is configured to control the first electrode switch to input the AC voltage alternately to the third electrode of each of the plurality of first electrodes and the fourth electrode of each of the plurality of first electrodes.

78. The touch panel device according to claim 75, wherein the control circuit is configured to control the first electrode switch to input, to the fourth electrode, an AC voltage having a phase opposite to a phase of the AC voltage input to the third electrode.

79. The touch panel device according to claim 78, wherein the control circuit is configured to control the first electrode switch to input the AC voltage to the third electrode of each of the plurality of first electrodes, and input, to the fourth electrode, an AC voltage having a phase opposite to a phase of the AC voltage input to the third electrode simultaneously to inputting of the AC voltage to the third electrode.

80. The touch panel device according to claim 75, further comprising
a differential amplifier having an inverting input terminal and a non-inverting input terminal, and being configured to output a signal of a difference between a signal input to the inverting input terminal and a signal input to the non-inverting terminal,
wherein the non-inverting input terminal of the differential amplifier is connected to a certain second electrode out of the plurality of second electrodes which faces the third electrode of each of the plurality of first electrodes,
wherein the inverting input terminal of the differential amplifier is connected to a further second electrode out of the plurality of second electrodes which faces the fourth electrode of each of the plurality of first electrodes, and
wherein the detection circuit is configured to determine whether the object touches the touch panel or not based on the signal output from the differential amplifier.

81. The touch panel device according to claim 75, wherein lengths of the plurality of first electrodes in the second direction is larger than lengths of the plurality of second electrodes in the fourth direction.

82. The touch panel device according to claim 75,
wherein each of the plurality of second electrodes includes fifth electrode and sixth electrode separate from each other, and
wherein the control circuit is configured to control the second electrode switch to input signals output from the fifth electrode and the sixth electrode to the detection circuit.

83. The touch panel device according to claim 82, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a fifth electrode of one second electrode out of the plurality of second electrodes,
wherein the non-inverting input terminal is connected to a sixth electrode of one second electrode out of the plurality of second electrodes, and
wherein the detection circuit is configured to determine whether the object touches the touch panel or not based on the signal output from the differential amplifier.

84. The touch panel device according to claim 48,
wherein each of the plurality of second electrodes includes a third electrode and a fourth electrode separate from each other, and
wherein the control circuit is configured to control the second electrode switch to input signals output from the third electrode and the fourth electrode to the detection circuit.

85. The touch panel device according to claim 84, further comprising
a differential amplifier having an inverting input terminal and a non-inverting input terminal, and being configured to output a signal of a difference between a signal input to the inverting input terminal and a signal input to the non-inverting terminal,
wherein the inverting input terminal is connected to a third electrode of a second electrode out of the plurality of second electrodes,
wherein the non-inverting input terminal is connected to the fourth electrode of a second electrode out of the plurality of second electrodes, and
wherein the detection circuit is configured to determine whether the object touches the touch panel or not based on the signal output from the differential amplifier.

86. The touch panel device according to claim 84, wherein lengths of the plurality of second electrodes in the fourth direction is larger than lengths of the plurality of first electrodes in the second direction.

87. The touch panel device according to claim 48,
wherein the inductive element has a first end and a second end, the first end of the inductive element being electrically connected to the AC signal source, the second end of the inductive element being electrically connected to the first electrode,
the touch panel device further comprising an additional inductive element electrically connected between the second end of the inductive element and a ground.

88. The touch panel device according to claim 48, further comprising a plurality of capacitors each connected between a ground and respective one of ends of the plurality of first electrodes in the second direction.

89. The touch panel device according to claim 48,
wherein each of the plurality of first electrodes has two ends opposite to each other in the second direction, and
wherein the two ends of each of the plurality of first electrodes are electrically short-circuited.

90. The touch panel device according to claim 48,
wherein each of the plurality of second electrodes has two ends opposite to each other in the fourth direction, and
wherein the two ends of each of the plurality of second electrodes are electrically short-circuited.

91. The touch panel device according to claim 48, further comprising:
a shield layer provided between the image display element and each of the plurality of first electrodes and the plurality of second electrodes; and a grounding switch configured to switch between a status of connecting the shield layer to the ground and a status of disconnecting the shield layer from the ground, wherein the control circuit is configured to control the ground switch to:
- connect the shield layer to the ground during the noise period; and
- disconnect the shield layer from the ground during at least a part of the further period.

92. The touch panel device according to claim 91,
wherein one electrode of each of the plurality of first electrodes and each of the plurality of second electrodes is more apart from the shield layer than another electrode of each of the plurality of first electrodes and each of the plurality of second electrodes, and
wherein a width of the another electrode of each of the plurality of first electrodes and each of the plurality of second electrodes is larger than a width of the one electrode of each of the plurality of first electrodes and each of the plurality of second electrodes.

93. The touch panel device according to claim 48,
wherein one electrode of each of the plurality of first electrodes and each of the plurality of second electrodes is longer than another electrode of each of the plurality of first electrodes and each of the plurality of second electrodes, and
a width of the one electrode of each of the plurality of first electrodes and each of the plurality of second electrodes is larger than a width of the another electrode of each of the plurality of first electrodes and each of the plurality of second electrodes.

94. The touch panel device according to claim 48, wherein the AC signal is a rectangular wave signal.

95. A touch panel device comprising:
a touch panel including:
- a plurality of first electrodes arranged apart from one another in a first direction and extending in a second direction different from the first direction,
- an insulation layer, and
- a plurality of second electrodes arranged apart from one another in a third direction and extending in a fourth direction different from the second direction and the third direction, the plurality of second electrodes facing the plurality of first electrodes across the insulation layer at plurality of crossing points;

an alternating-current (AC) signal source configured to input an AC signal into the plurality of first electrodes and the plurality of second electrodes;

an inductive element electrically connected in series between the AC signal source and each of the plurality of first electrodes;

a detection circuit configured to detect a change of a capacitance between a ground and each of the plurality of first electrodes or a change of a capacitance between the ground and each of the plurality of second electrodes upon a touch of an object on the touch panel, based on a change of signals output from the plurality of first electrodes and the plurality of second electrodes;

a first electrode switch configured to changes a connection status of connecting and disconnecting between the inductive element and each of the plurality of first electrodes;

a second electrode switch configured to change a connection status of connecting and disconnecting the detection circuit and each of the plurality of second electrodes;

a control circuit configured to control the first electrode switch and the second electrode switch; and an image display element facing the touch panel, wherein the image display element is configured to generate a larger noise during a noise period than during a further period other than the noise period, and wherein the control circuit is configured to control the second electrode switch to:
- connect, to a ground during the noise period, a second electrode out of the plurality of second electrodes which is disconnected from the detection circuit; and
- disconnect, from the ground during at least a part of the further period, the second electrode out of the plurality of second electrodes which is disconnected from the detection circuit.

* * * * *